(12) United States Patent
Emerson et al.

(10) Patent No.: US 11,713,836 B2
(45) Date of Patent: *Aug. 1, 2023

(54) PENETRATION FITTING HAVING COMPRESSION SEALS AND METHODS OF INSTALLING AND USING THE SAME

(71) Applicant: S. BRAVO SYSTEMS, INC., Commerce, CA (US)

(72) Inventors: Eric Emerson, Downey, CA (US); Ricardo Burgos, Los Angeles, CA (US); Don Mukai, Pasadena, CA (US); Max Cohen, Studio City, CA (US); Adam Macias, Claremont, CA (US); Micah Nelson, Yuba City, CA (US)

(73) Assignee: S. Bravo Systems, Inc., Commerce, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,524

(22) Filed: Oct. 8, 2021

(65) Prior Publication Data
US 2022/0025994 A1    Jan. 27, 2022

Related U.S. Application Data

(63) Continuation of application No. 16/983,825, filed on Aug. 3, 2020, now Pat. No. 11,168,813.
(Continued)

(51) Int. Cl.
*F16L 5/08*    (2006.01)
*F16L 5/10*    (2006.01)
*F16L 5/06*    (2006.01)

(52) U.S. Cl.
CPC .................. *F16L 5/08* (2013.01); *F16L 5/06* (2013.01); *F16L 5/10* (2013.01)

(58) Field of Classification Search
CPC ....... F16L 5/08; F16L 5/06; F16L 5/10; F16L 5/02
See application file for complete search history.

(56) References Cited

U.S. PATENT DOCUMENTS

| 167,262 A | 8/1875 | Lewis |
| 456,756 A | 7/1891 | Bastian |
| (Continued) | | |

FOREIGN PATENT DOCUMENTS

| DE | 835239 | 3/1952 |
| FR | 720741 | 2/1932 |
| (Continued) | | |

OTHER PUBLICATIONS

Double wall containment catalog, 2011 (24 pages).
(Continued)

*Primary Examiner* — James M Hewitt, II
(74) *Attorney, Agent, or Firm* — Lewis Roca Rothgerber Christie LLP

(57) ABSTRACT

A penetration fitting assembly includes a pipe gasket having an annular portion defining a central opening and first and second stem portions extending in opposite directions from the annular portion, an inner ring assembly configured to surround the pipe gasket and including first and second inner ring halves, a ring gasket assembly configured to surround the inner ring assembly and including first and second ring gasket halves, a wall gasket, an outer ring assembly configured to surround the ring gasket assembly and including first and second outer ring halves, and a clamp configured to surround the outer ring assembly. When the penetration fitting assembly is installed, the outer ring assembly compresses the wall gasket against the wall of the sump, the clamp compresses the ring gasket assembly between the inner ring assembly and the outer ring assembly, and the (Continued)

clamp compresses the pipe gasket against the pipe or conduit.

17 Claims, 47 Drawing Sheets

Related U.S. Application Data

(60) Provisional application No. 62/909,103, filed on Oct. 1, 2019.

(56) References Cited

U.S. PATENT DOCUMENTS

| | | | |
|---|---|---|---|
| 1,015,180 A | 1/1912 | Heitman |
| 1,366,634 A | 1/1921 | Clark |
| 1,473,300 A | 11/1923 | Kruger et al. |
| 2,396,123 A | 3/1946 | Phillips |
| 2,458,714 A | 1/1949 | Mahoney |
| 2,464,332 A | 3/1949 | Maund et al. |
| 2,518,443 A | 8/1950 | Bagnard |
| 2,587,170 A | 2/1952 | Klinger et al. |
| 2,650,111 A | 8/1953 | Kaiser |
| 2,723,136 A | 11/1955 | Deubler |
| 2,745,682 A | 5/1956 | Chevallier |
| 2,944,839 A | 7/1960 | Anderson |
| 2,953,618 A | 9/1960 | Buono et al. |
| 2,985,291 A | 5/1961 | Schoepe et al. |
| 3,104,120 A | 9/1963 | Myers |
| 3,124,502 A | 3/1964 | Radke |
| 3,148,922 A | 9/1964 | Roessler, Jr. |
| 3,186,737 A | 6/1965 | Brundage |
| 3,275,347 A | 9/1966 | James |
| 3,435,128 A | 3/1969 | Dorwald |
| 3,484,853 A | 12/1969 | Nishi |
| 3,900,221 A | 8/1975 | Fouts |
| 3,922,008 A | 11/1975 | Stiner et al. |
| 3,998,515 A | 12/1976 | Panek |
| 4,110,947 A | 9/1978 | Murray et al. |
| 4,120,520 A | 10/1978 | Ahlstone |
| 4,211,423 A | 7/1980 | Resech |
| 4,260,183 A | 4/1981 | Krupp |
| 4,341,326 A | 7/1982 | Bravo |
| 4,345,617 A | 8/1982 | Bravo |
| 4,428,395 A | 1/1984 | Bravo |
| 4,480,860 A | 11/1984 | Foresta et al. |
| 4,482,163 A | 11/1984 | Depweg |
| 4,563,892 A | 1/1986 | D'Aoust |
| 4,635,945 A | 1/1987 | Beck |
| 4,696,186 A | 9/1987 | Sharp |
| 4,699,177 A | 10/1987 | Thomas |
| 4,708,015 A | 11/1987 | Sharp |
| 4,749,192 A | 6/1988 | Howeth |
| 4,796,676 A | 1/1989 | Hendershot et al. |
| 4,842,163 A | 6/1989 | Bravo |
| 4,916,939 A | 4/1990 | Mögel |
| 4,925,046 A | 5/1990 | Sharp |
| 4,932,257 A | 7/1990 | Webb |
| 4,942,903 A | 7/1990 | Jacobsen |
| 4,958,957 A | 9/1990 | Berg et al. |
| 4,971,225 A | 11/1990 | Bravo |
| 4,971,477 A | 11/1990 | Webb et al. |
| 4,983,784 A | 1/1991 | Whitlock |
| 5,027,665 A | 7/1991 | Hayward |
| 5,051,541 A | 9/1991 | Bawa et al. |
| 5,100,024 A | 3/1992 | Bravo |
| 5,129,684 A | 7/1992 | Lawrence et al. |
| 5,135,324 A | 8/1992 | Bravo |
| 5,226,681 A | 7/1993 | Smith et al. |
| 5,285,829 A | 2/1994 | Bravo |
| 5,295,760 A | 3/1994 | Rowe |
| 5,297,896 A | 3/1994 | Webb |
| 5,341,857 A | 8/1994 | Bravo |
| 5,366,318 A | 11/1994 | Brancher |
| 5,433,247 A | 7/1995 | Guertin |
| 5,441,082 A | 8/1995 | Eskew et al. |
| 5,501,472 A | 3/1996 | Brancher et al. |
| 5,529,098 A | 6/1996 | Bravo |
| 5,607,189 A | 3/1997 | Howeth |
| 5,664,951 A | 9/1997 | Clary et al. |
| 5,676,183 A | 10/1997 | Bravo |
| 5,810,400 A | 9/1998 | Youngs |
| 5,826,919 A | 10/1998 | Bravo et al. |
| 5,882,045 A | 3/1999 | Bravo |
| 5,944,361 A | 8/1999 | Bravo |
| 5,967,567 A | 10/1999 | Nordstrom |
| 5,988,698 A | 11/1999 | Bravo et al. |
| 6,053,539 A | 4/2000 | Bravo |
| 6,217,083 B1 | 4/2001 | Bravo |
| 6,224,115 B1 | 5/2001 | Blasch et al. |
| 6,823,886 B2 | 11/2004 | Bravo et al. |
| 7,114,752 B2 | 10/2006 | Voelker |
| 7,198,303 B2 | 4/2007 | Brophy, III et al. |
| 8,328,245 B2 | 12/2012 | Gayer et al. |
| RE47,234 E * | 2/2019 | Sandy ............... F16B 2/065 |
| 11,168,813 B2 * | 11/2021 | Emerson ............ F16L 5/06 |
| 2003/0084628 A1 | 5/2003 | Gilleran |
| 2005/0035558 A1 | 2/2005 | Dipzinski et al. |
| 2006/0208429 A1 | 9/2006 | Happel |
| 2010/0038856 A1 | 2/2010 | Jiao et al. |
| 2014/0265157 A1 | 9/2014 | Mukai et al. |
| 2019/0017701 A1 | 1/2019 | Aoki et al. |
| 2019/0113165 A1 | 4/2019 | Mukai et al. |
| 2019/0178421 A1 | 6/2019 | Treloar |

FOREIGN PATENT DOCUMENTS

| | | |
|---|---|---|
| FR | 1562838 | 4/1969 |
| FR | 2567239 A1 | 1/1986 |
| GB | 339678 | 12/1930 |
| GB | 887164 | 1/1962 |
| KR | 2011-0004028 A | 1/2011 |
| SE | 84956 | 11/1935 |

OTHER PUBLICATIONS

Singlewall UniFittings, 2011 (1 page).
https://www.franklinfueling.com/en/products/piping-containment/flexible-pipework-system/apt-fittings/split-test-boot/, last accessed Jan. 13, 2021, 2 pages.
https://www.opwglobal.com/products/us/retail-fueling-products/piping-containment-systems/sump-entry-fittings/the-ref-rigid-entry-fitting, OPW rigid entry fitting flyers, 2018, 6 pages.
https://www.franklinfueling.com/en/products/piping--containment/entry-bootsseals/mechanical-entry-seals/single-wall-rigid-entry-boot/#downloads/, Rigid Entry Boot Datasheet, Franklin Single and Double Wall Rigid Entry Boots Installation Guide, 40 pages.
Bravo catalog and B-18 fitting sheet, 2011, 25 pages.
http://www.dpm-co.com/rpms.asp, Archived online Jun. 12, 2019, 1 page.
Tennessee Underground Storage Tank Owner Compliance Manual, Department of Environment & Conservation, Oct. 2015, 68 pages.
Montana Underground Storage Tank Class B Operator Training Manual, Montana Department of Environmental Quality, Oct. 2015, 92 pages.
International Search Report and Written Opinion for Application No. PCT/US2020/053214, dated Dec. 3, 2020, 12 pages.

* cited by examiner

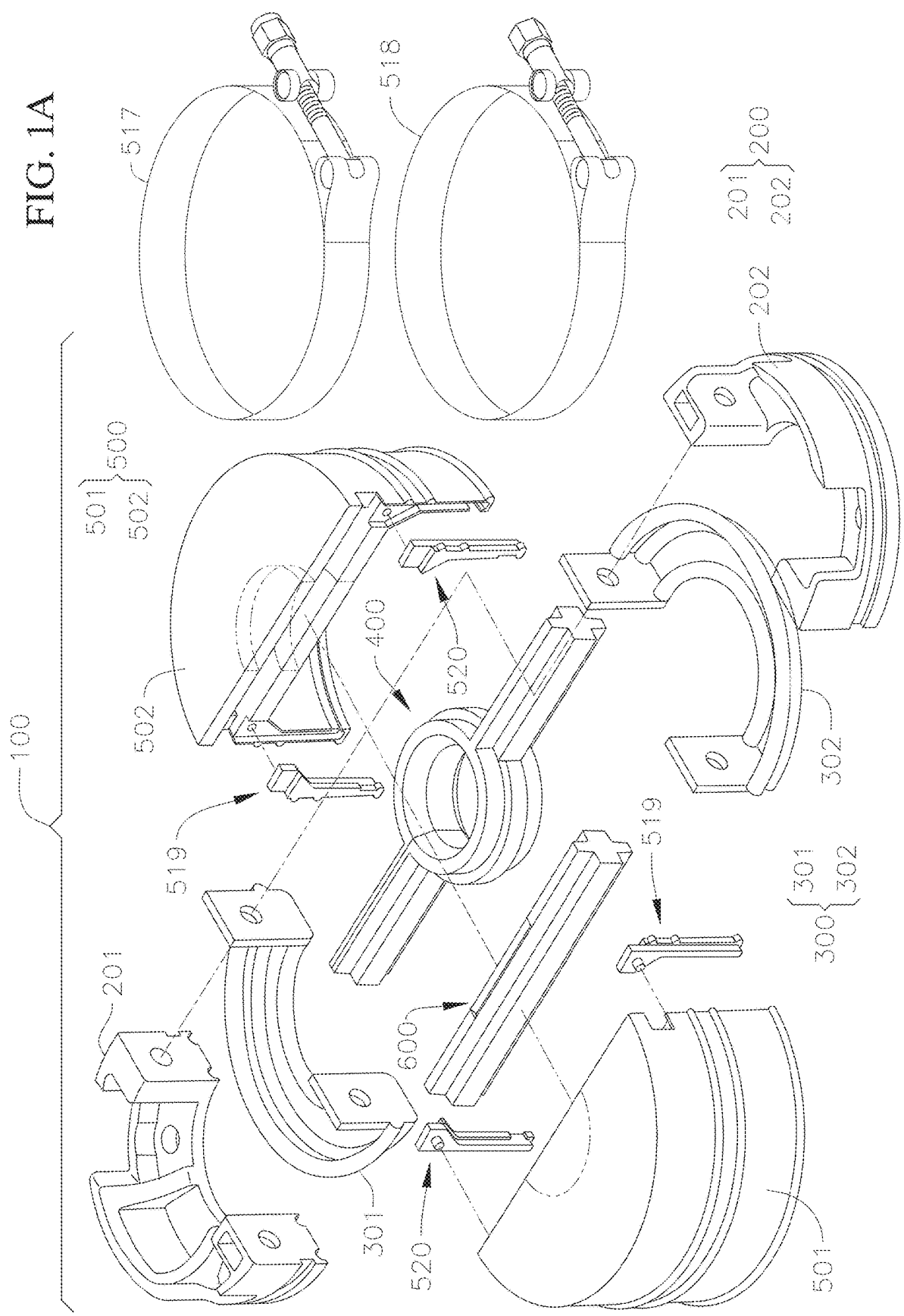

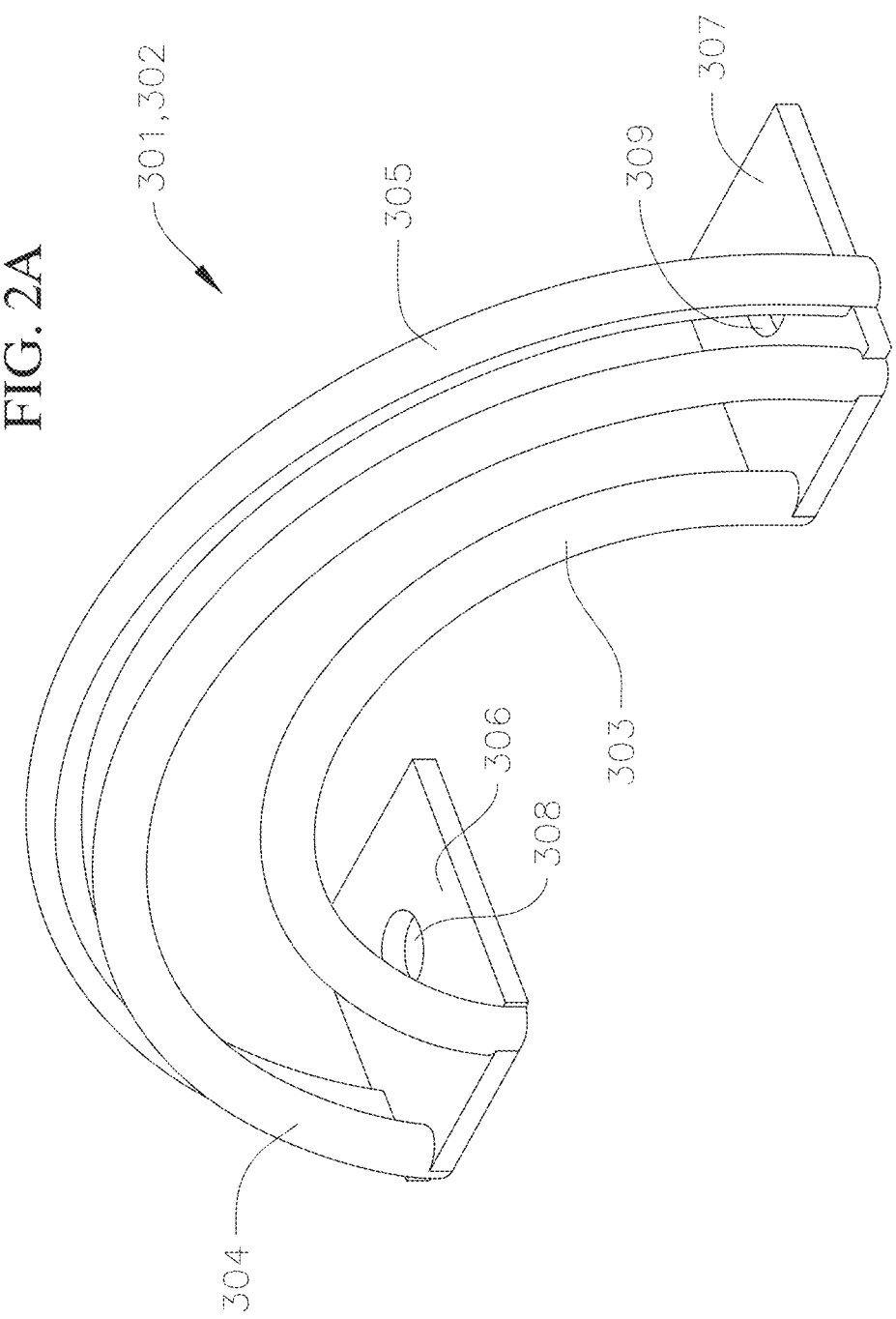

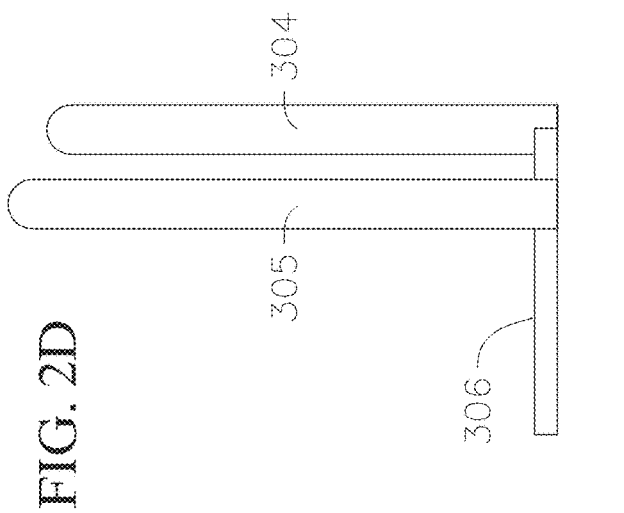
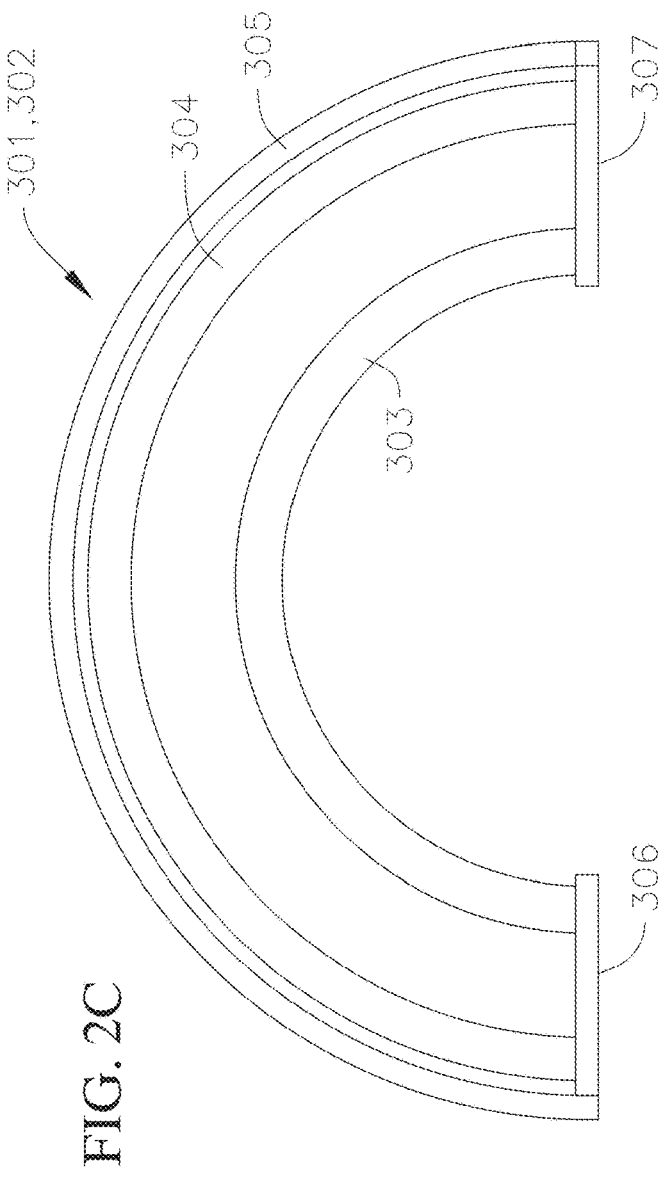
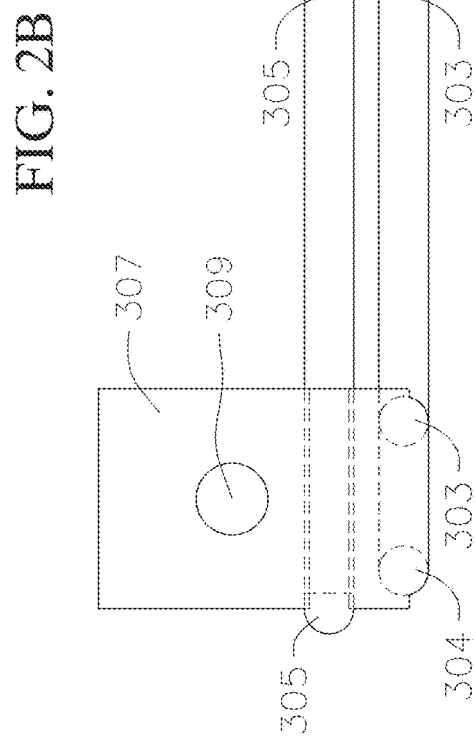

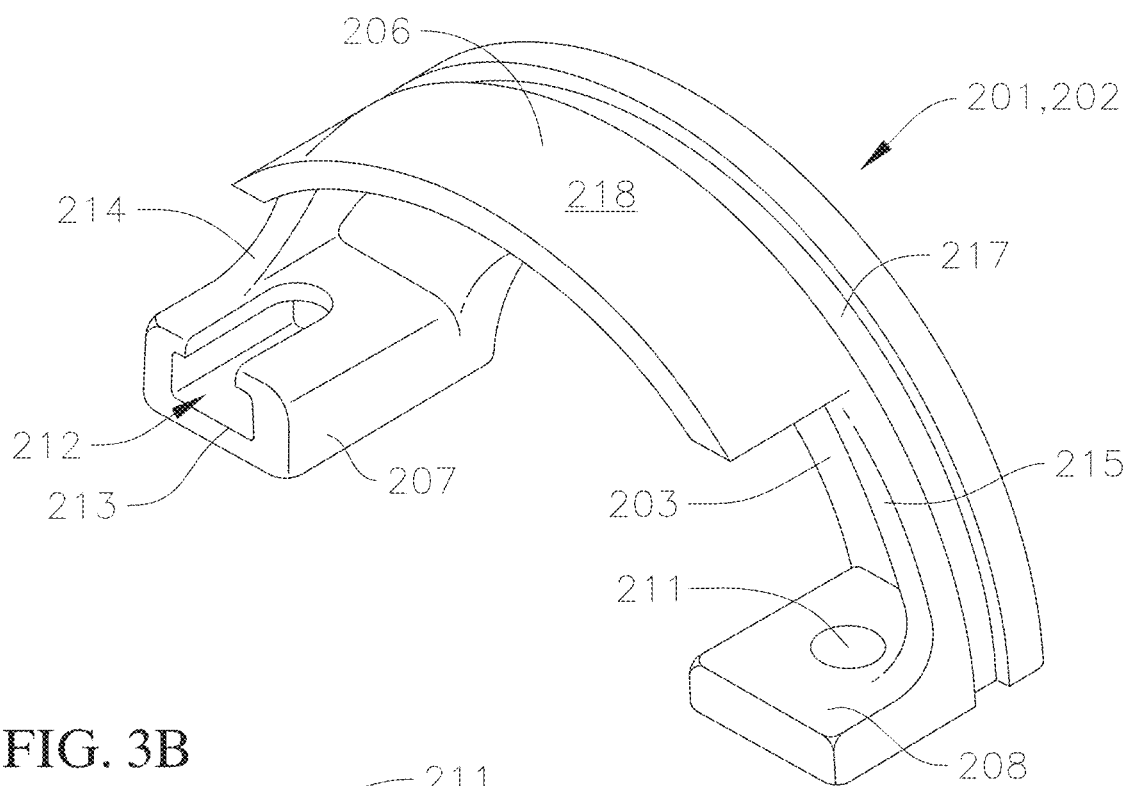
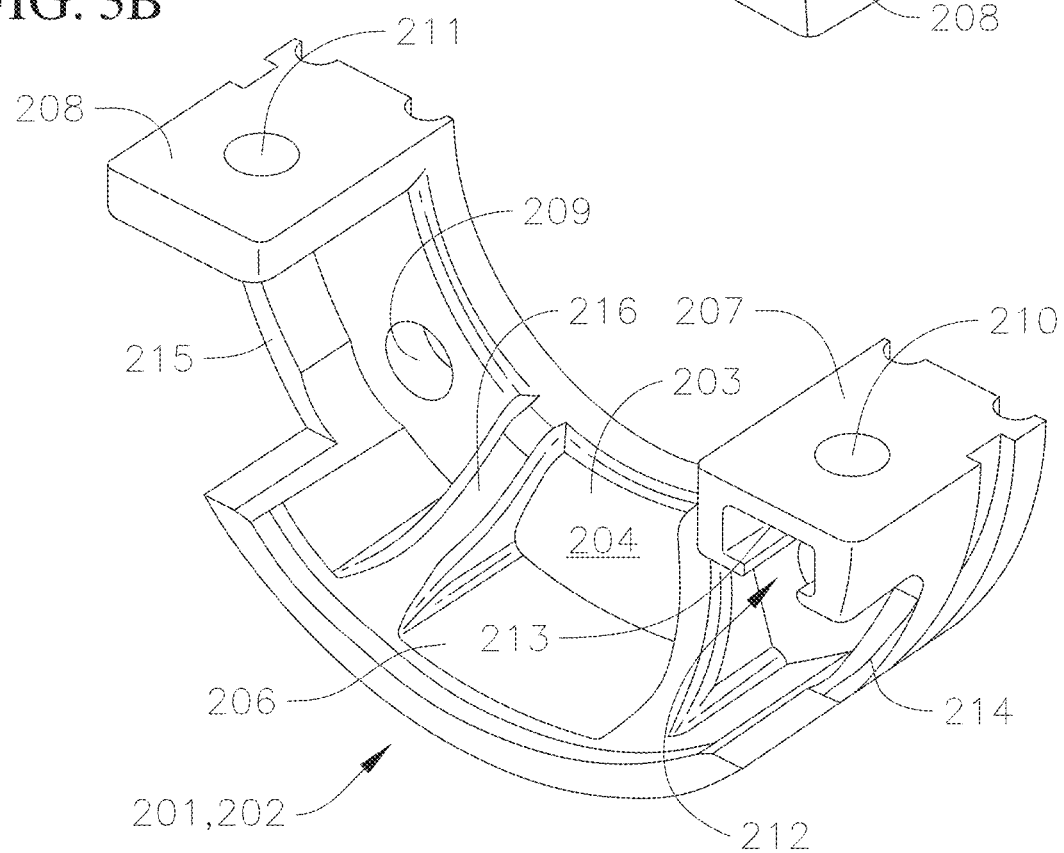

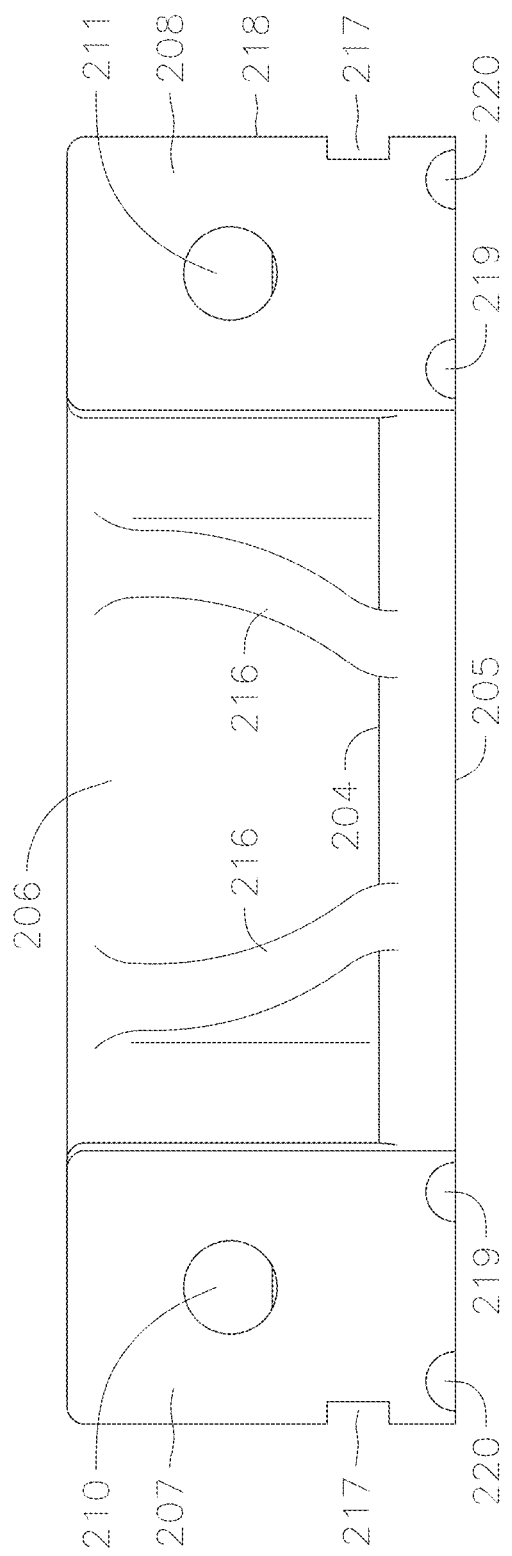

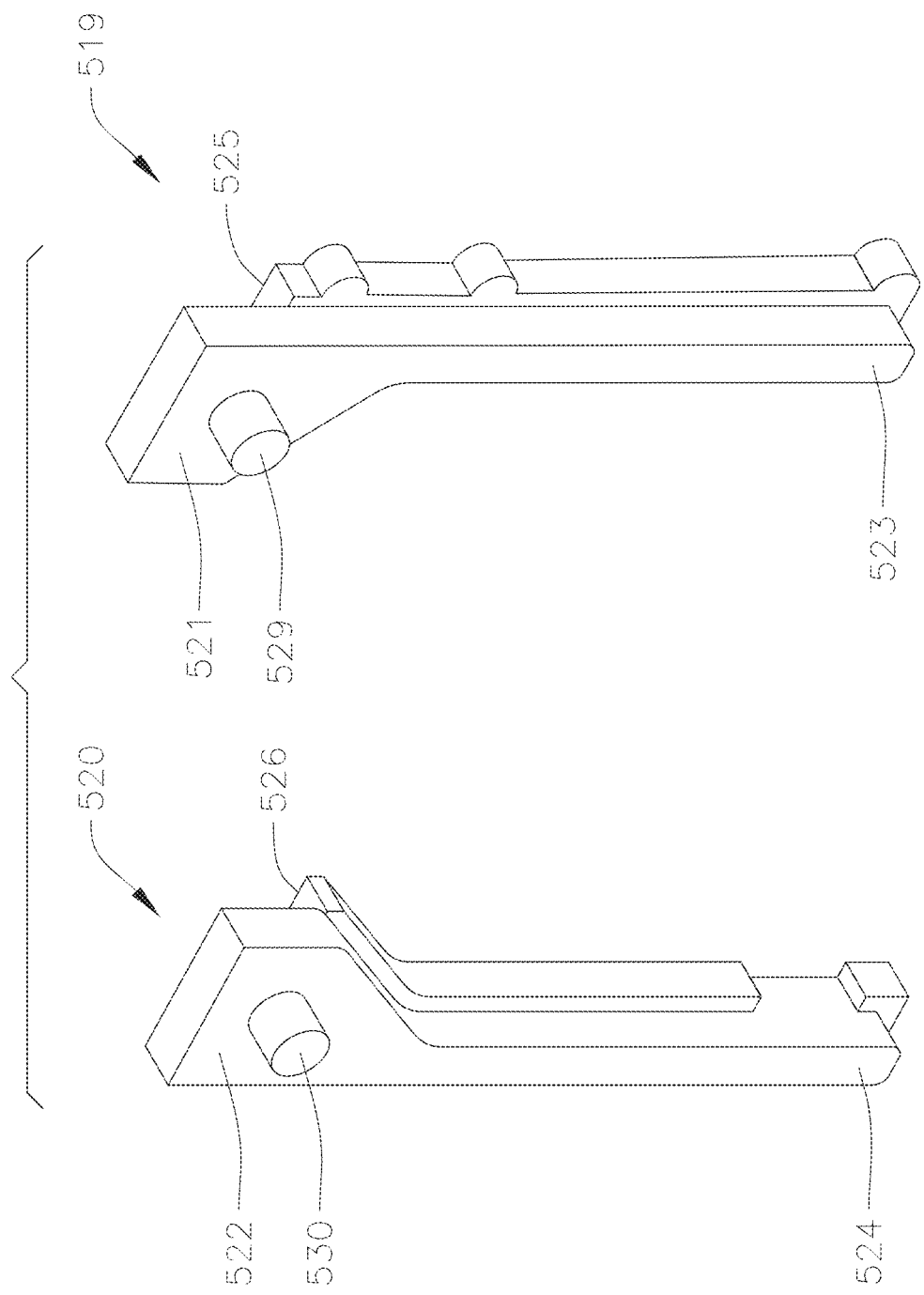

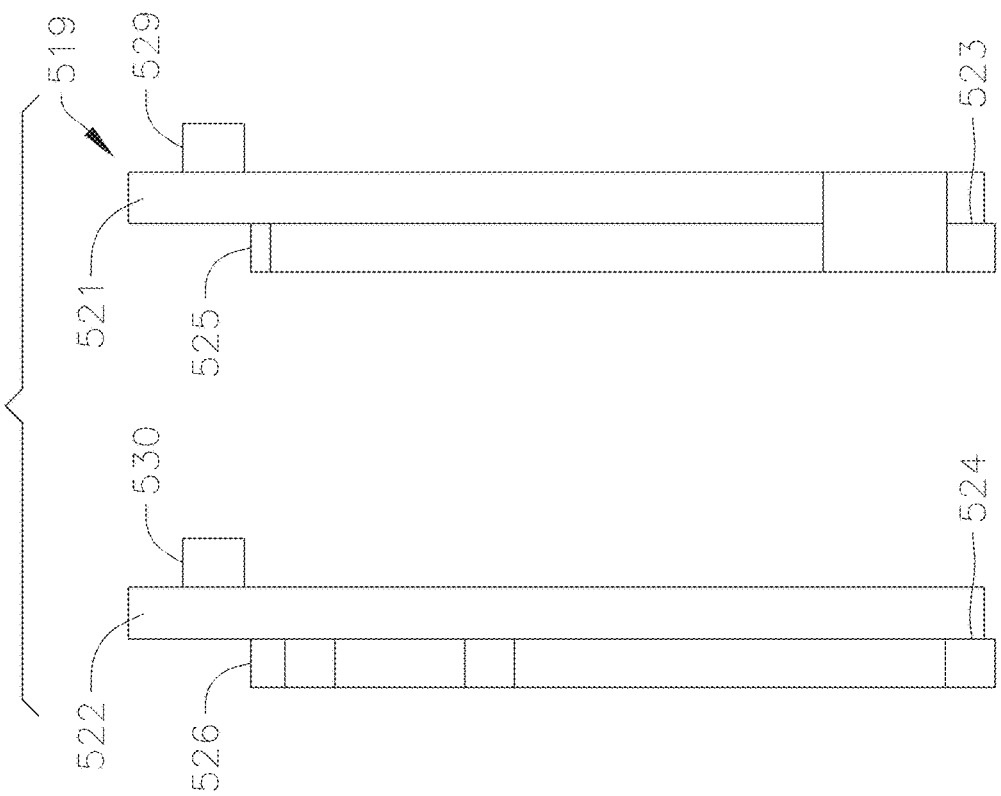
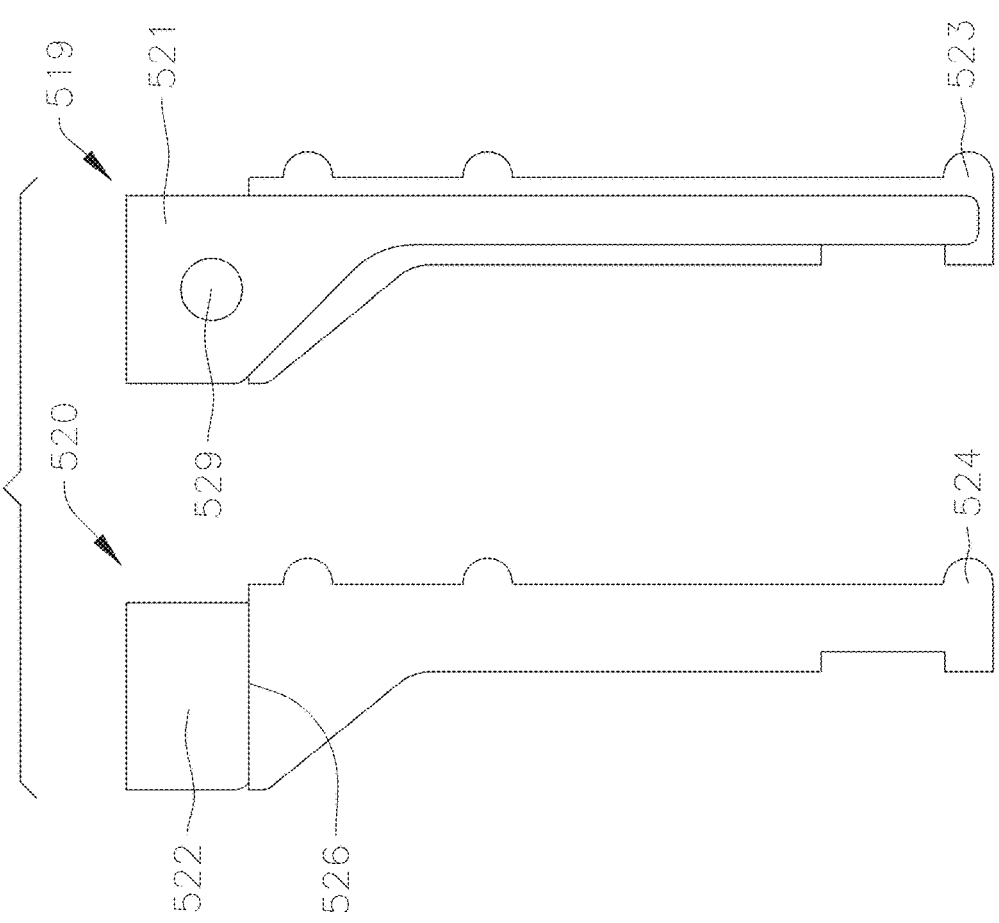

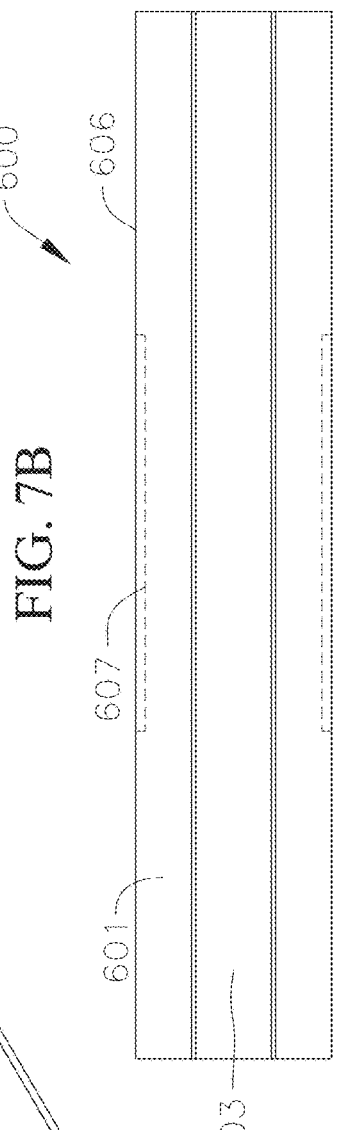
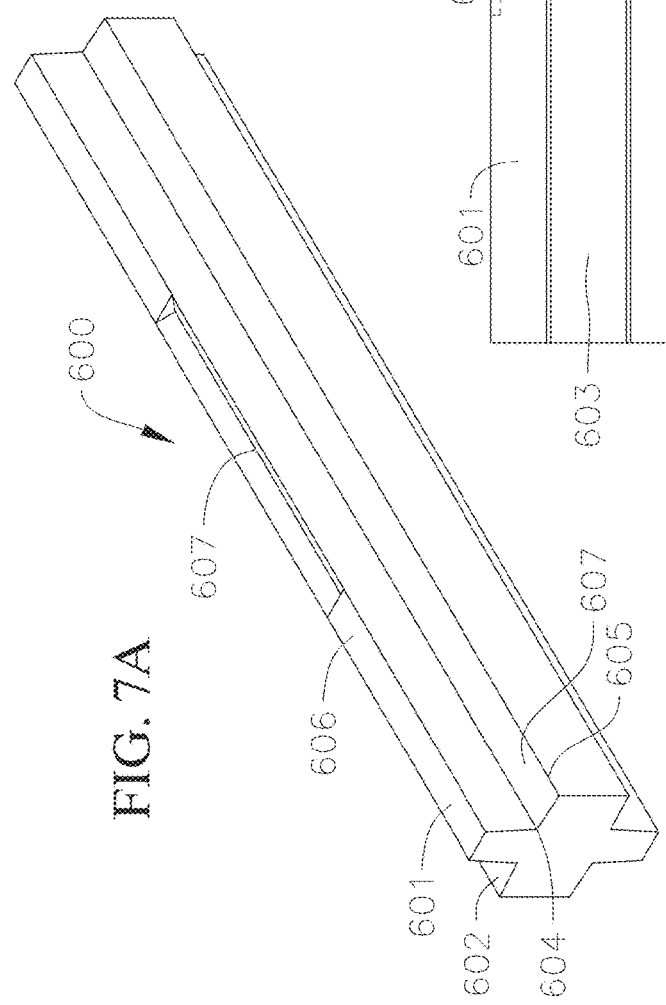
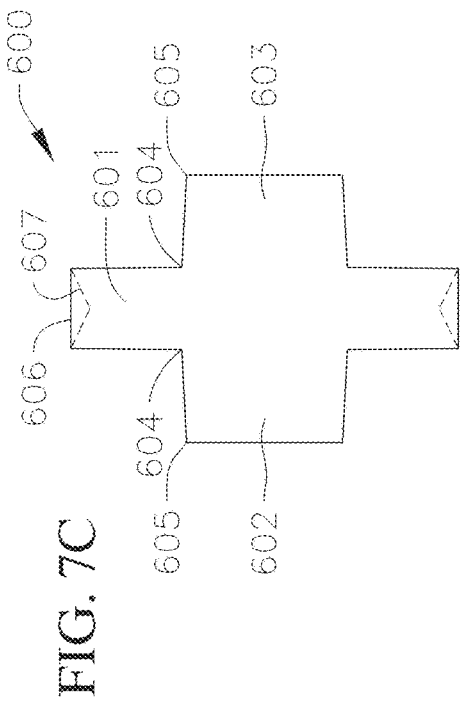

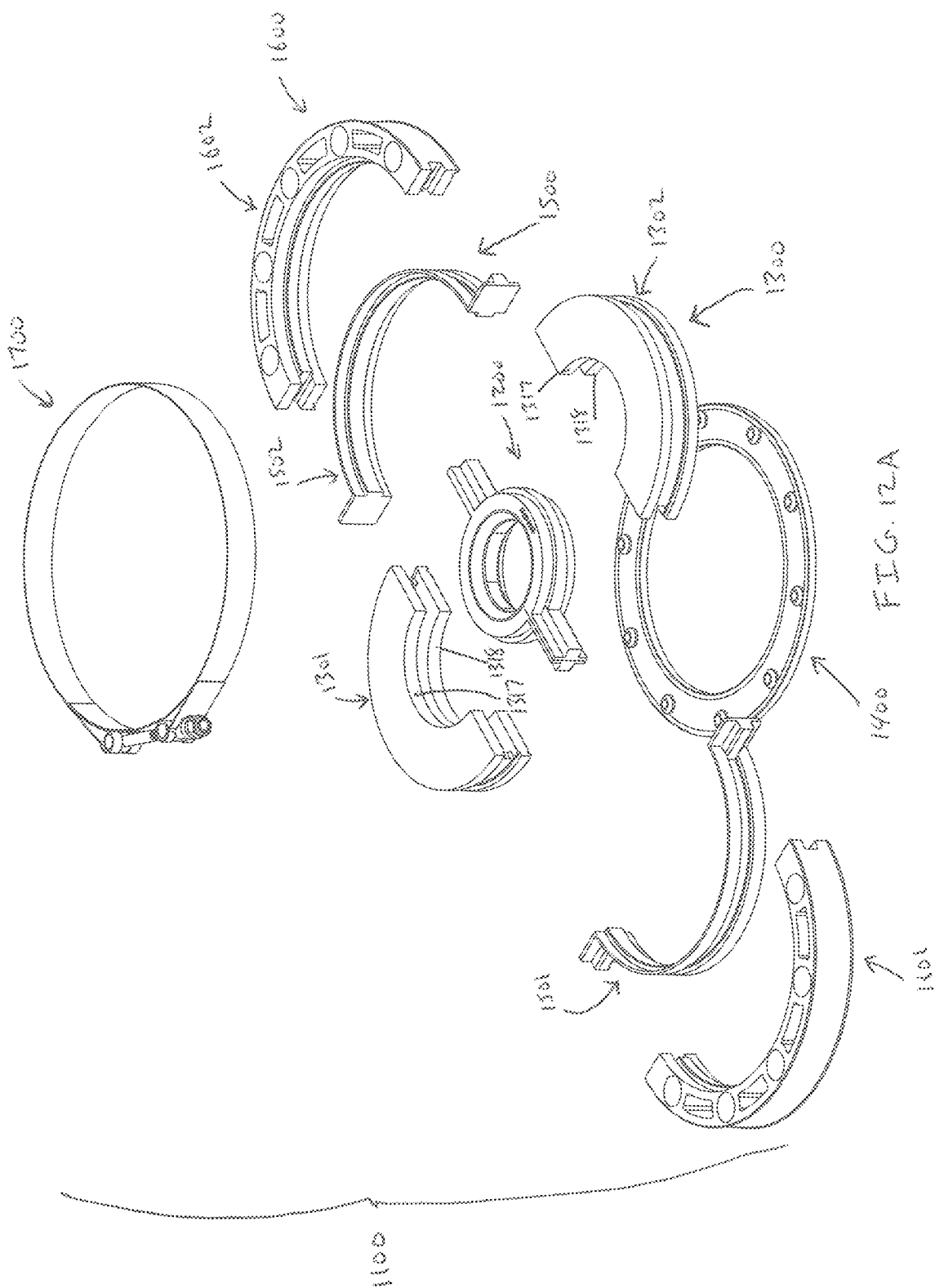

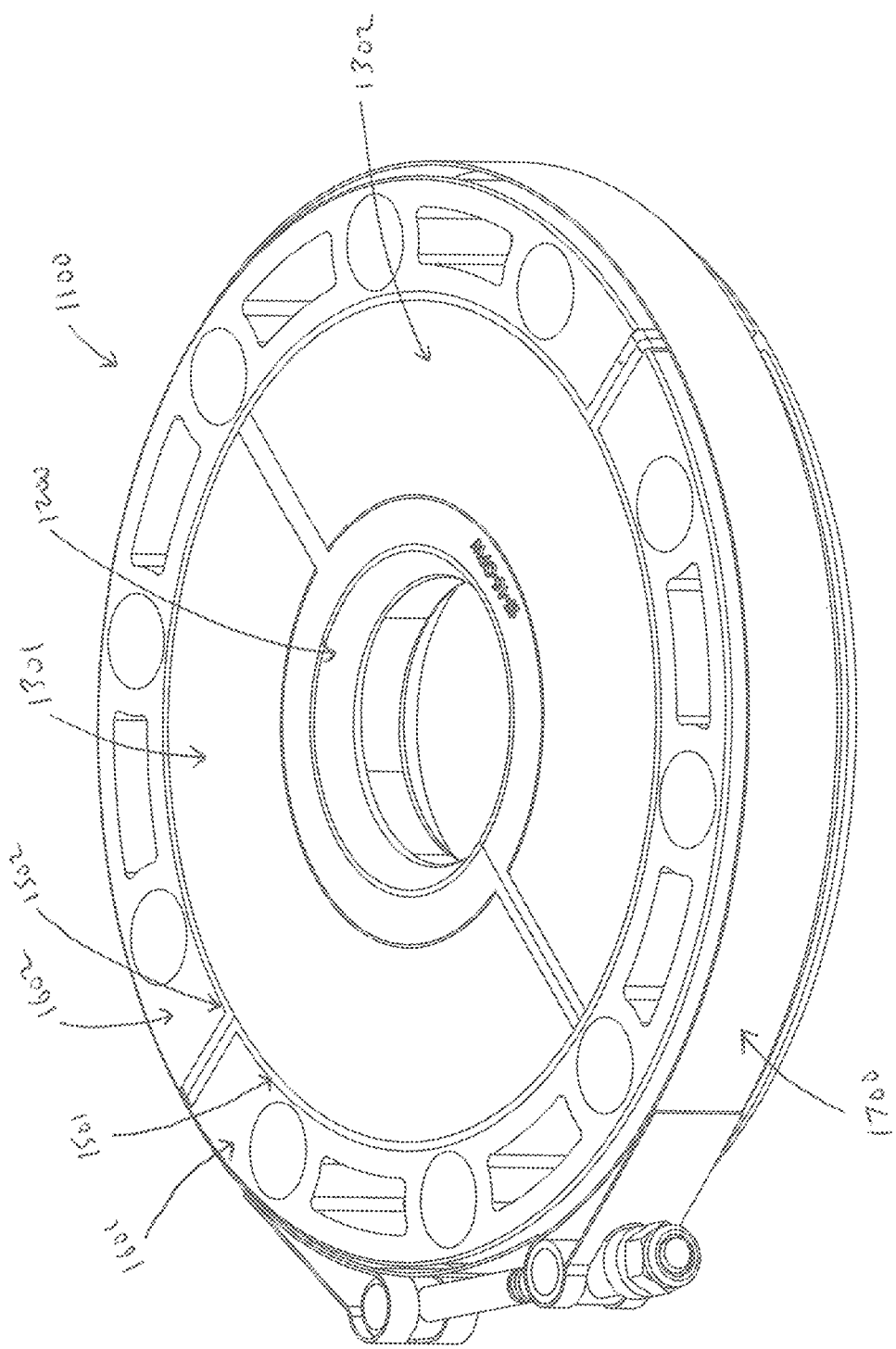

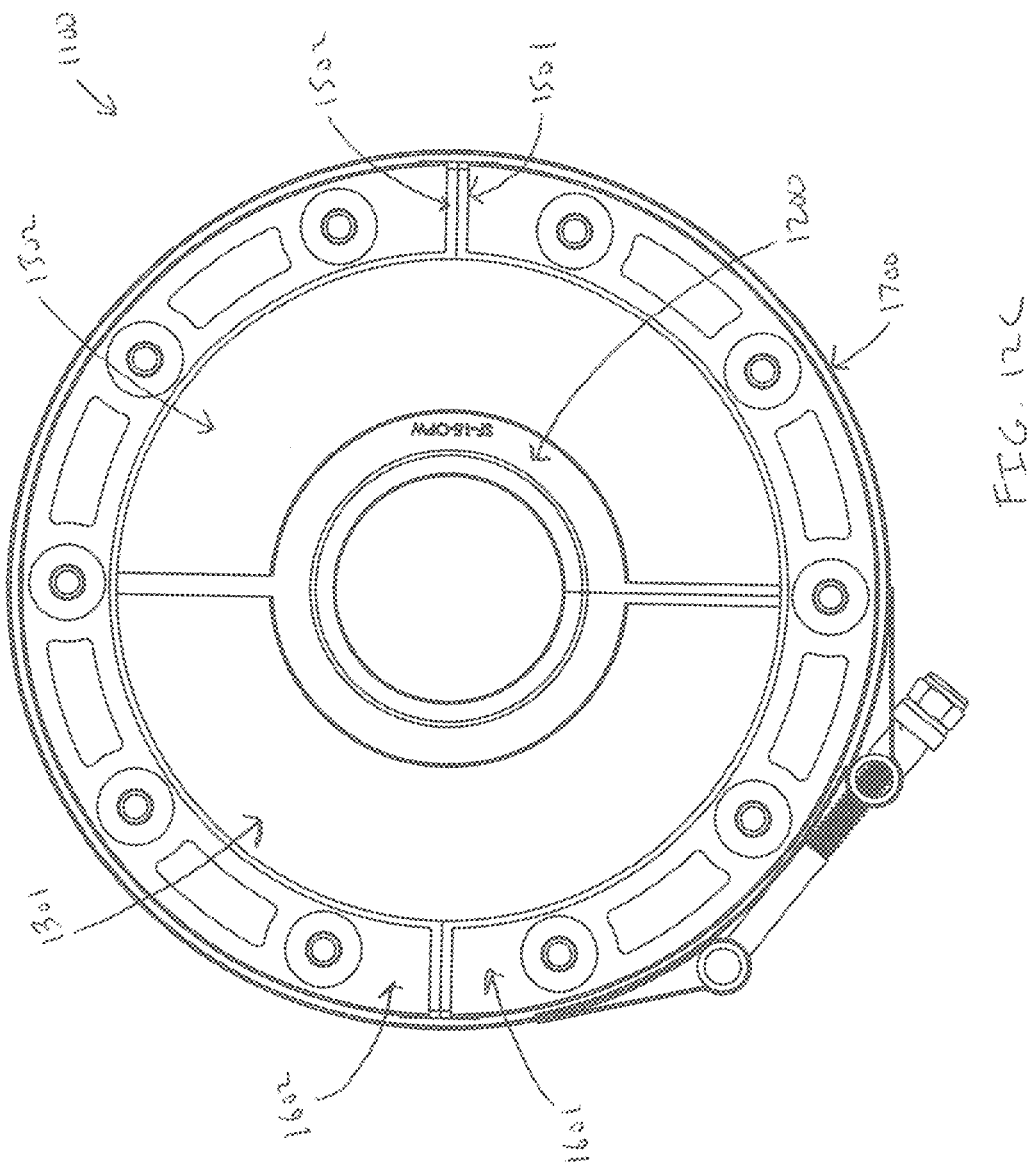

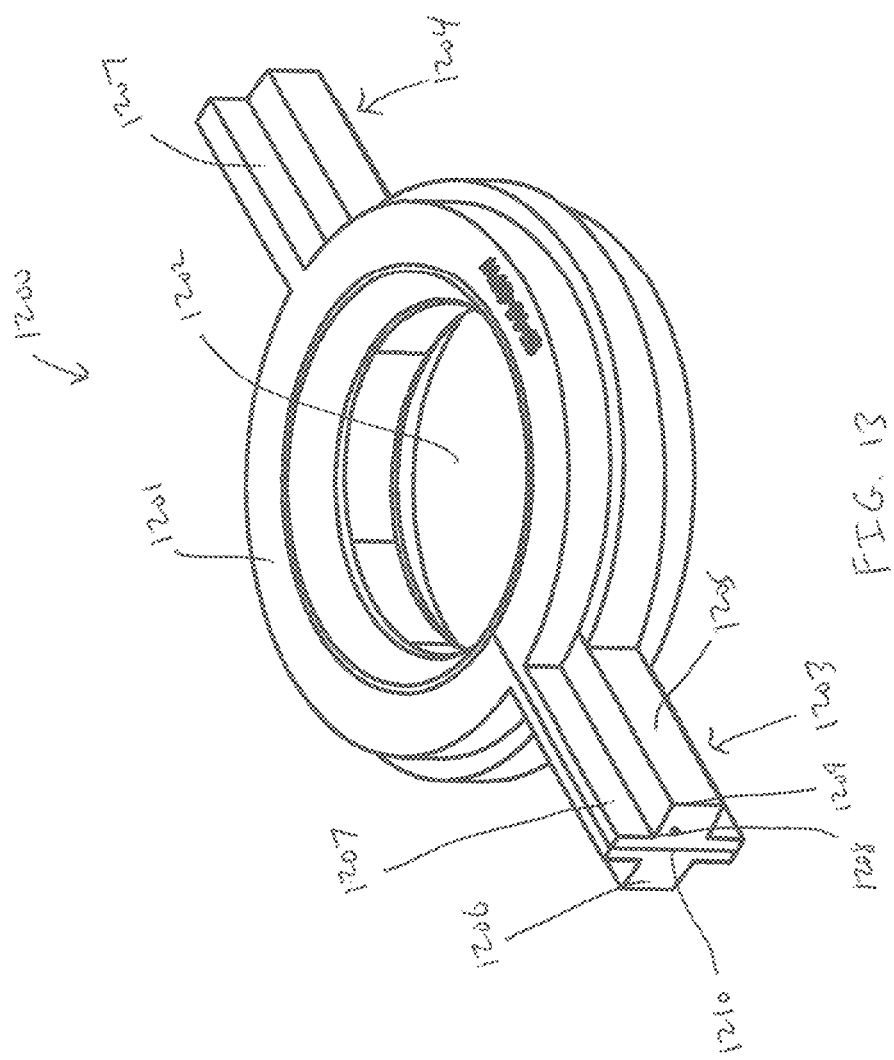

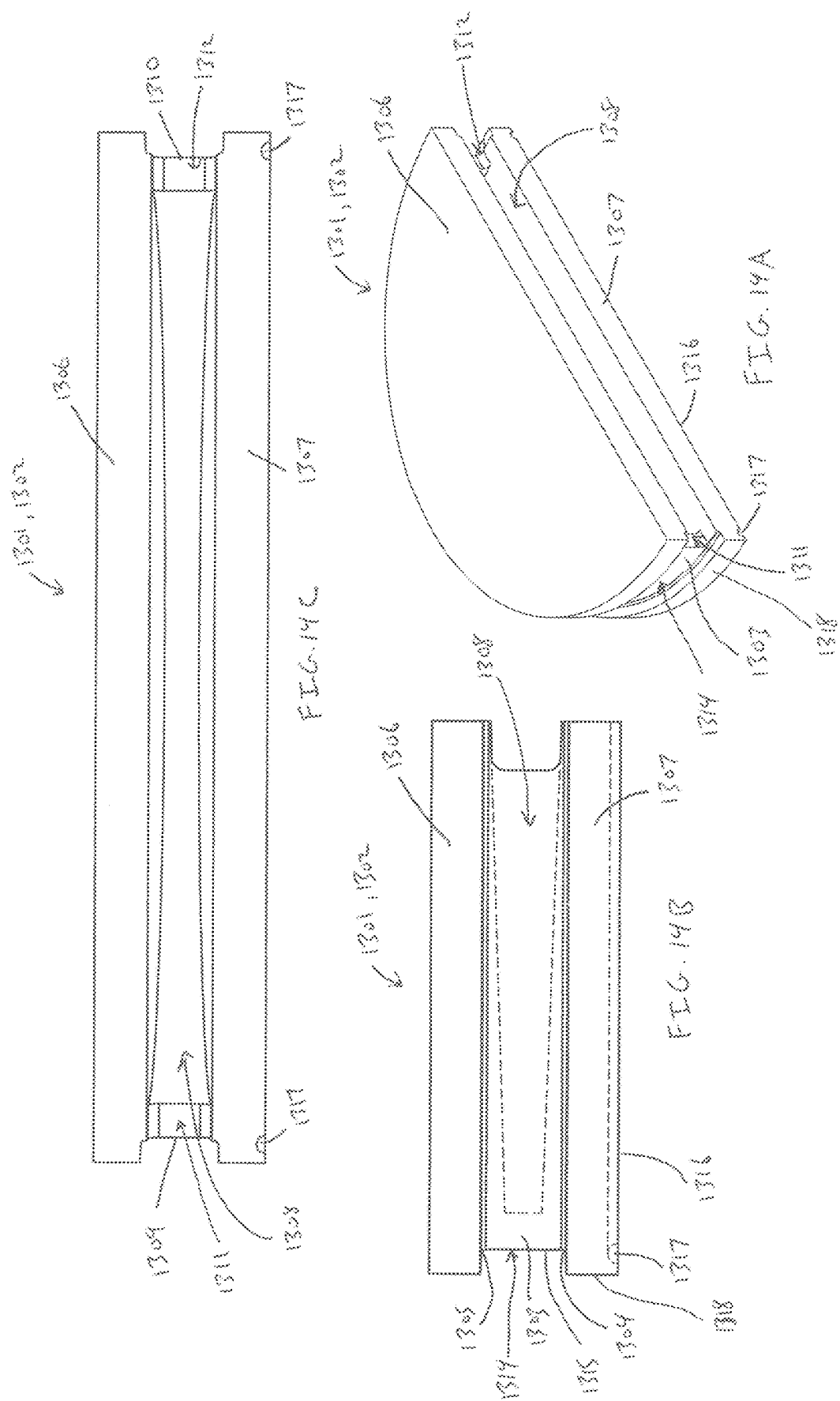

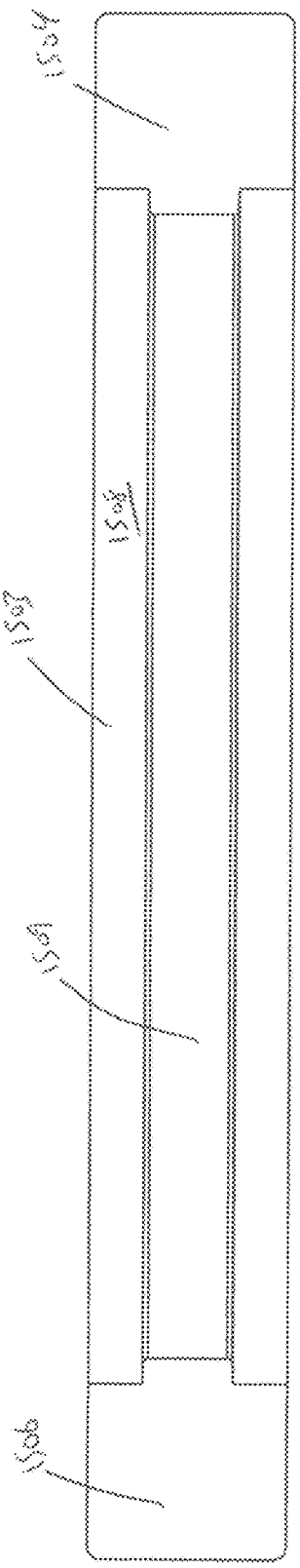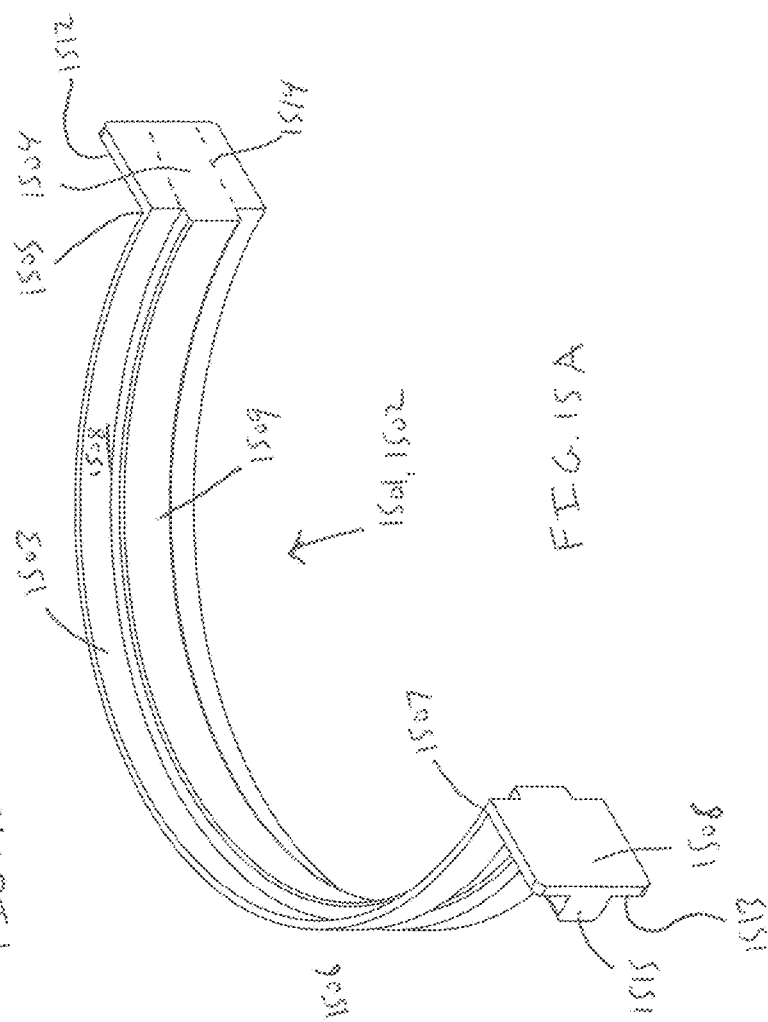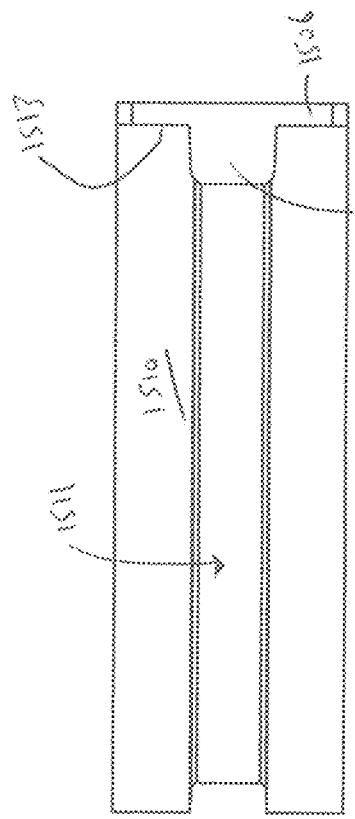

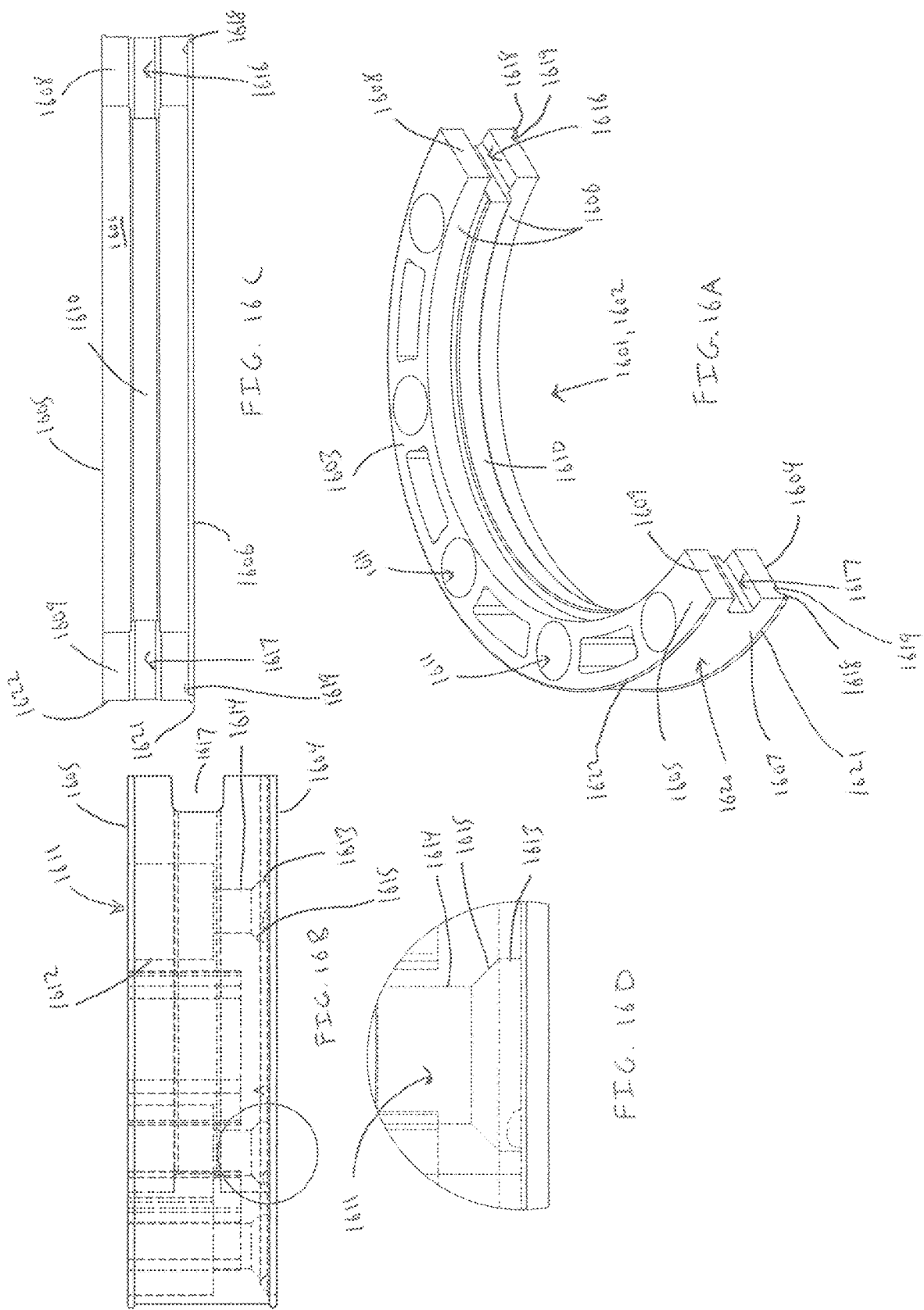

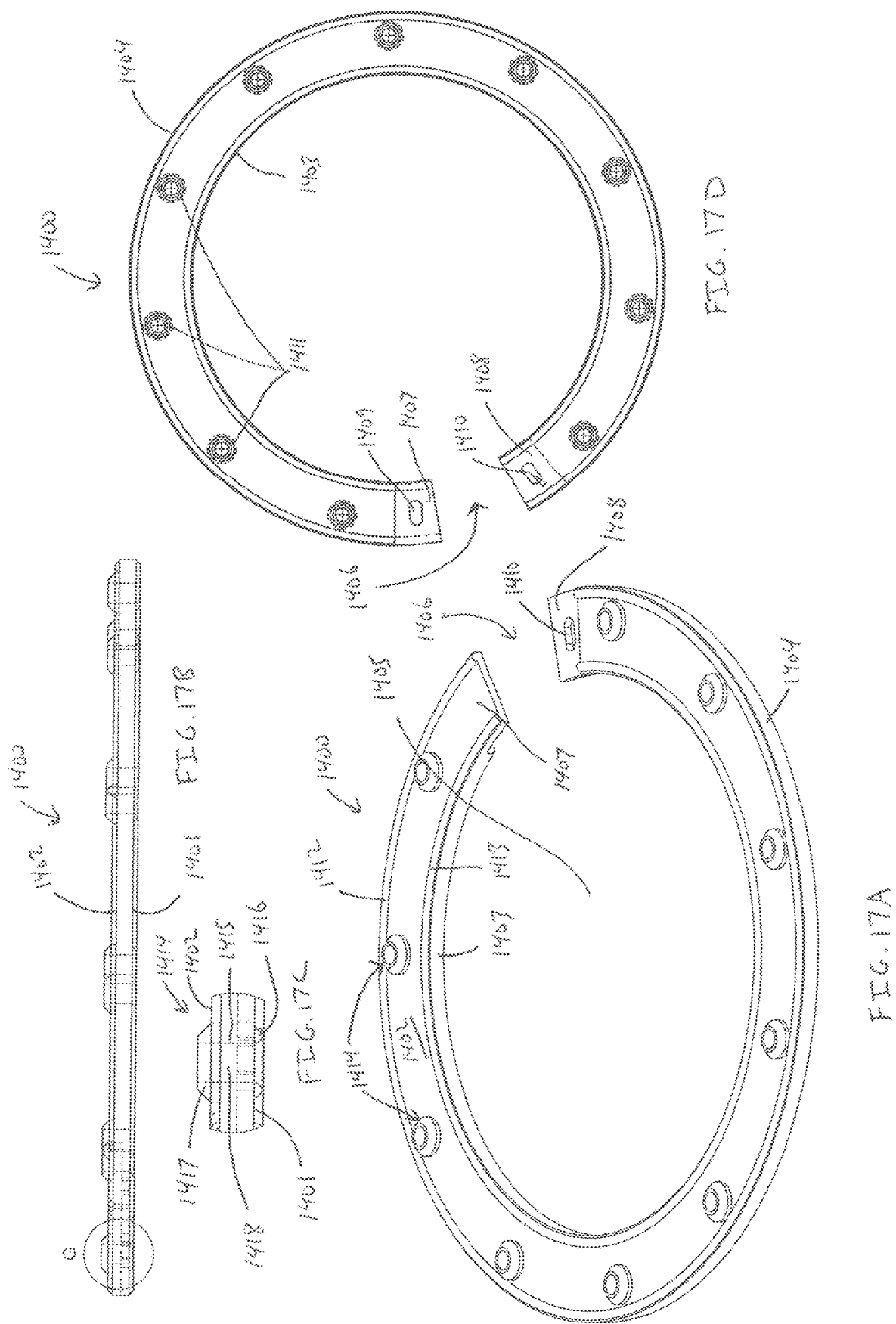

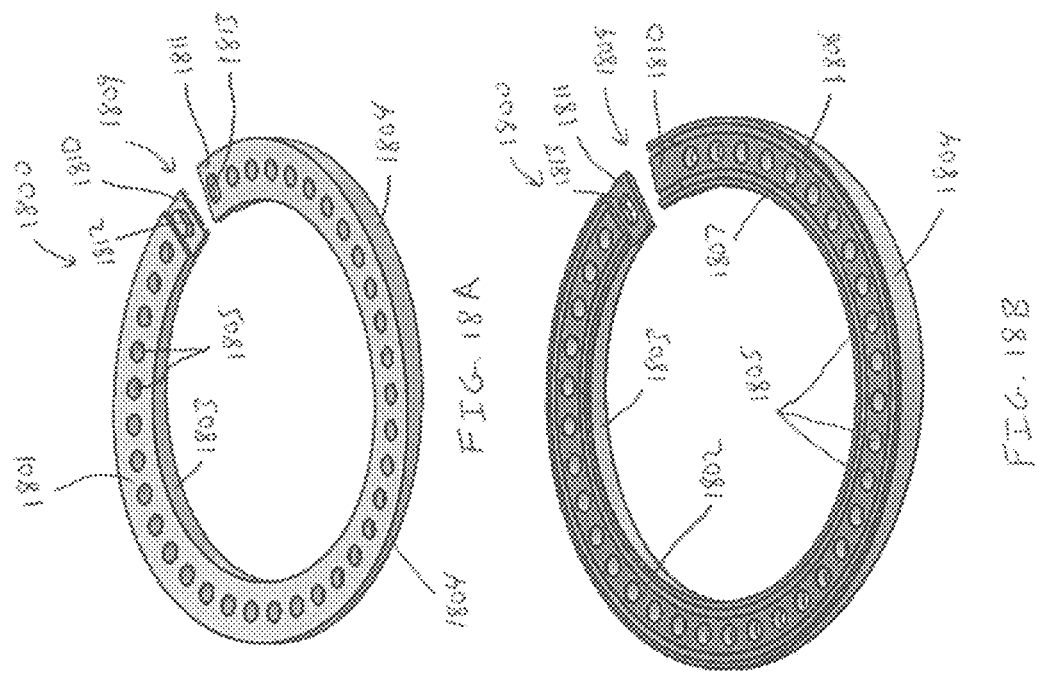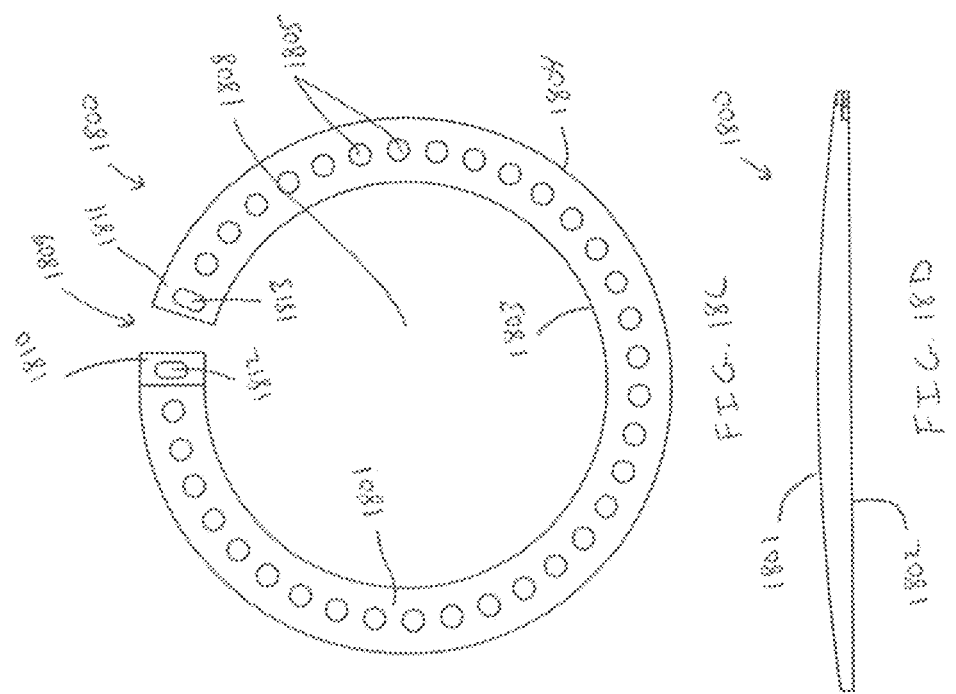

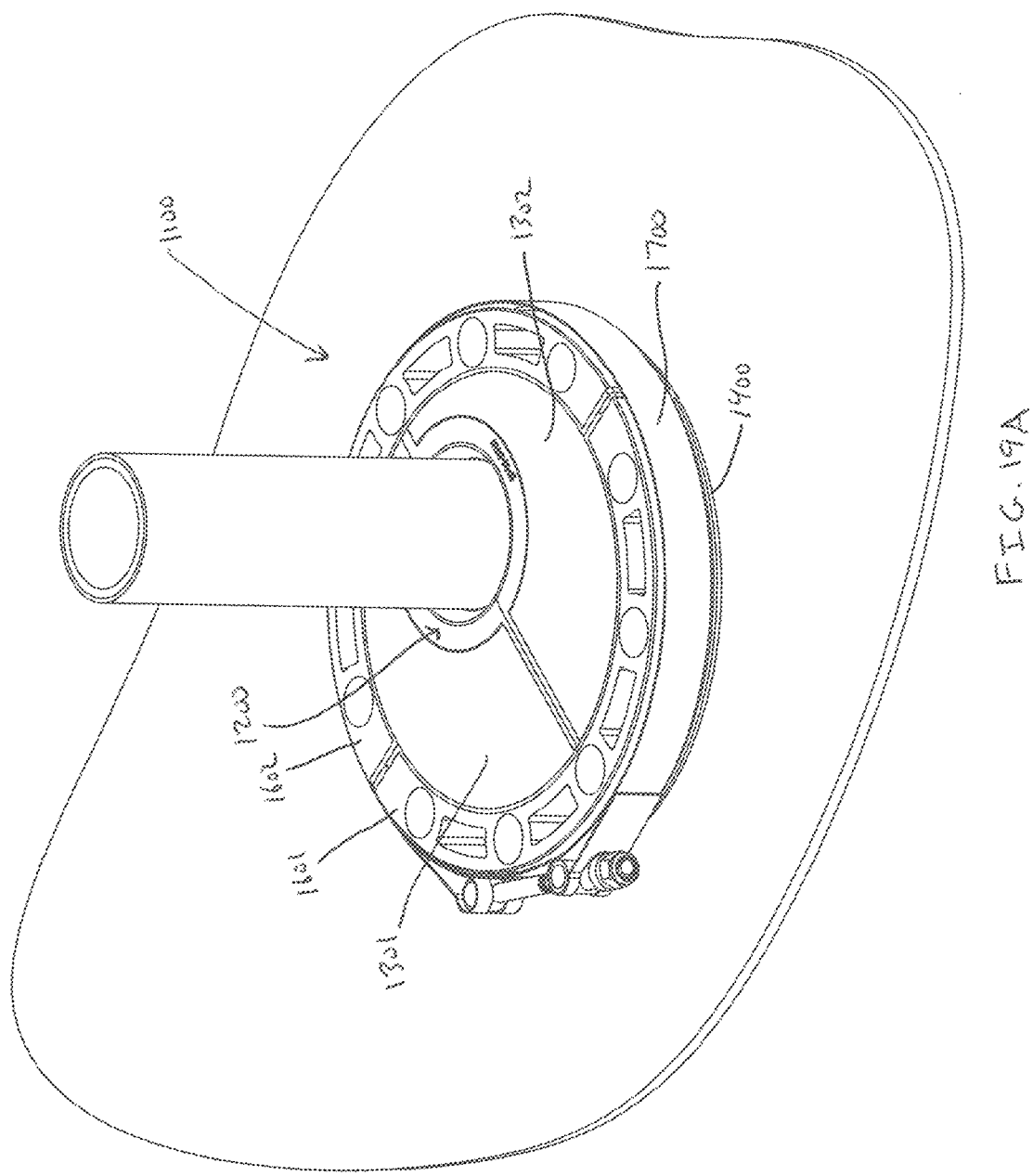

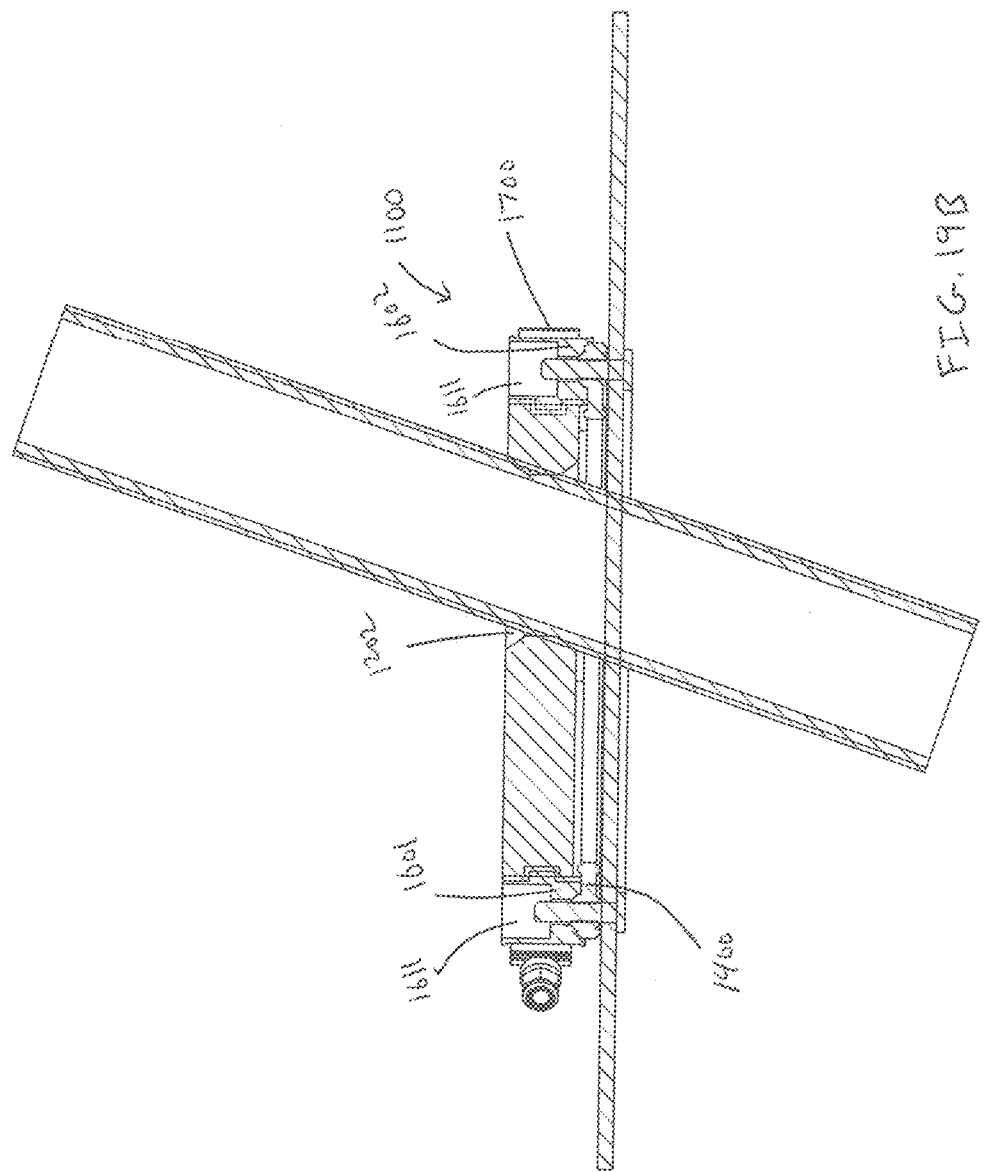

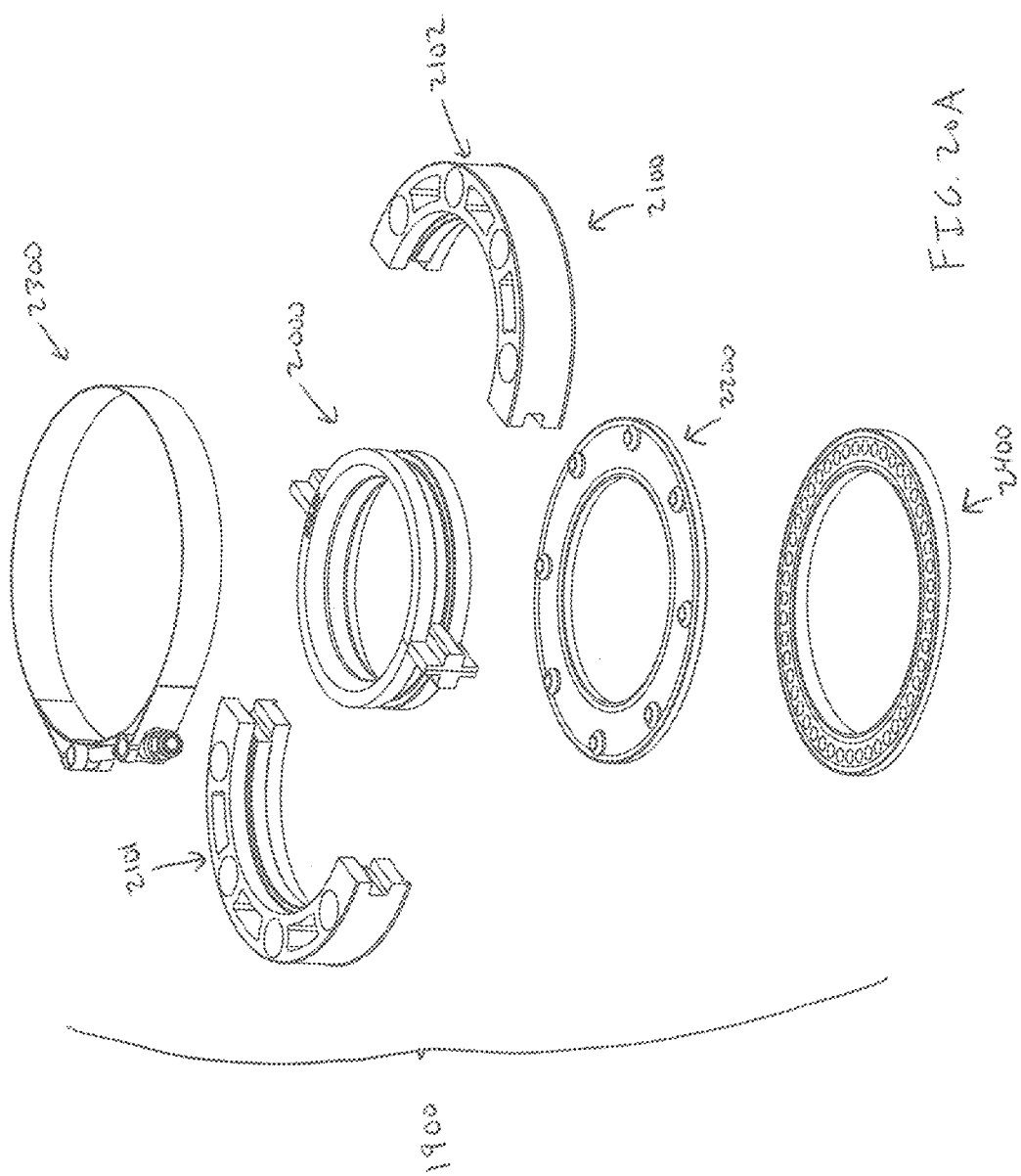

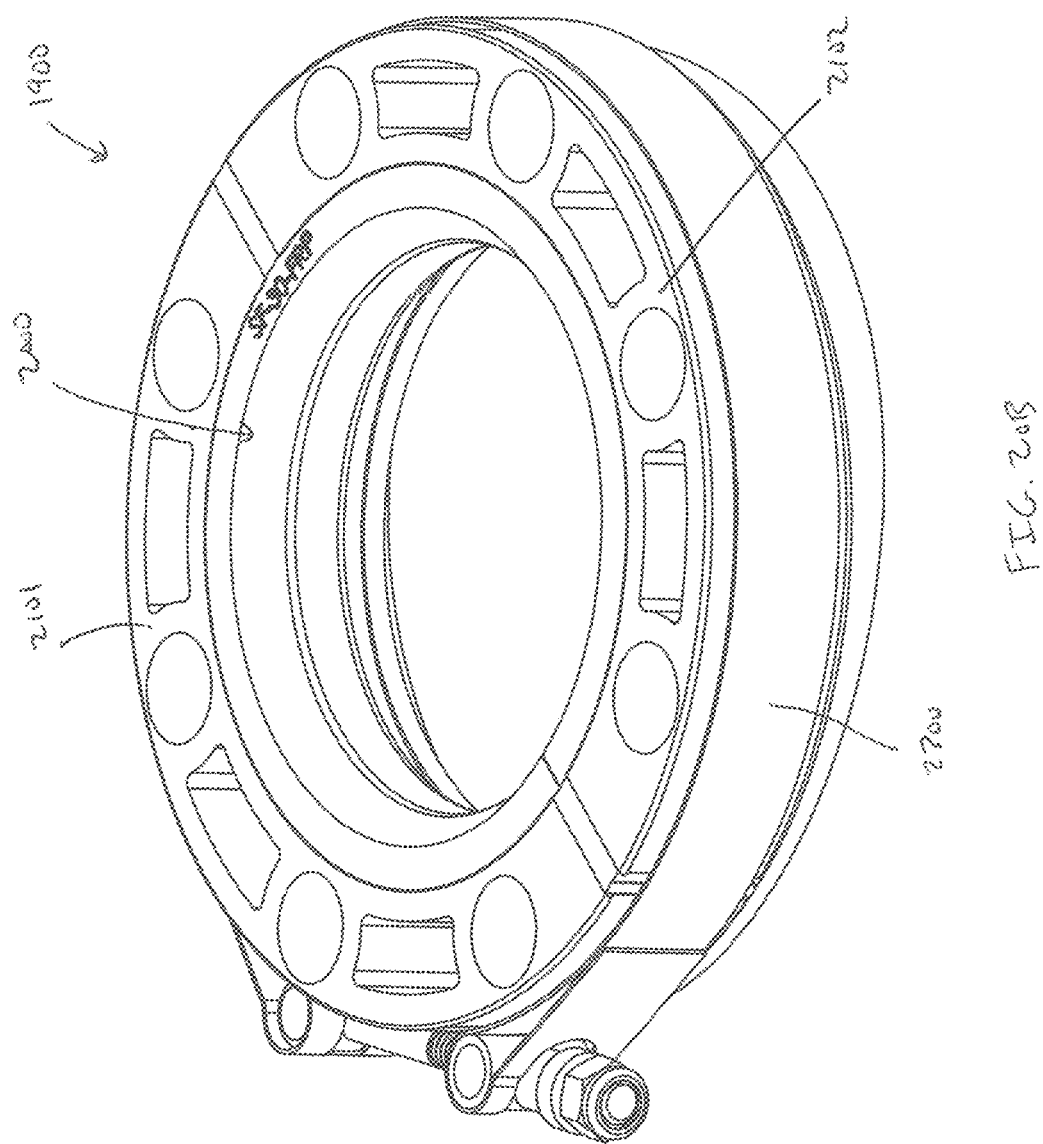

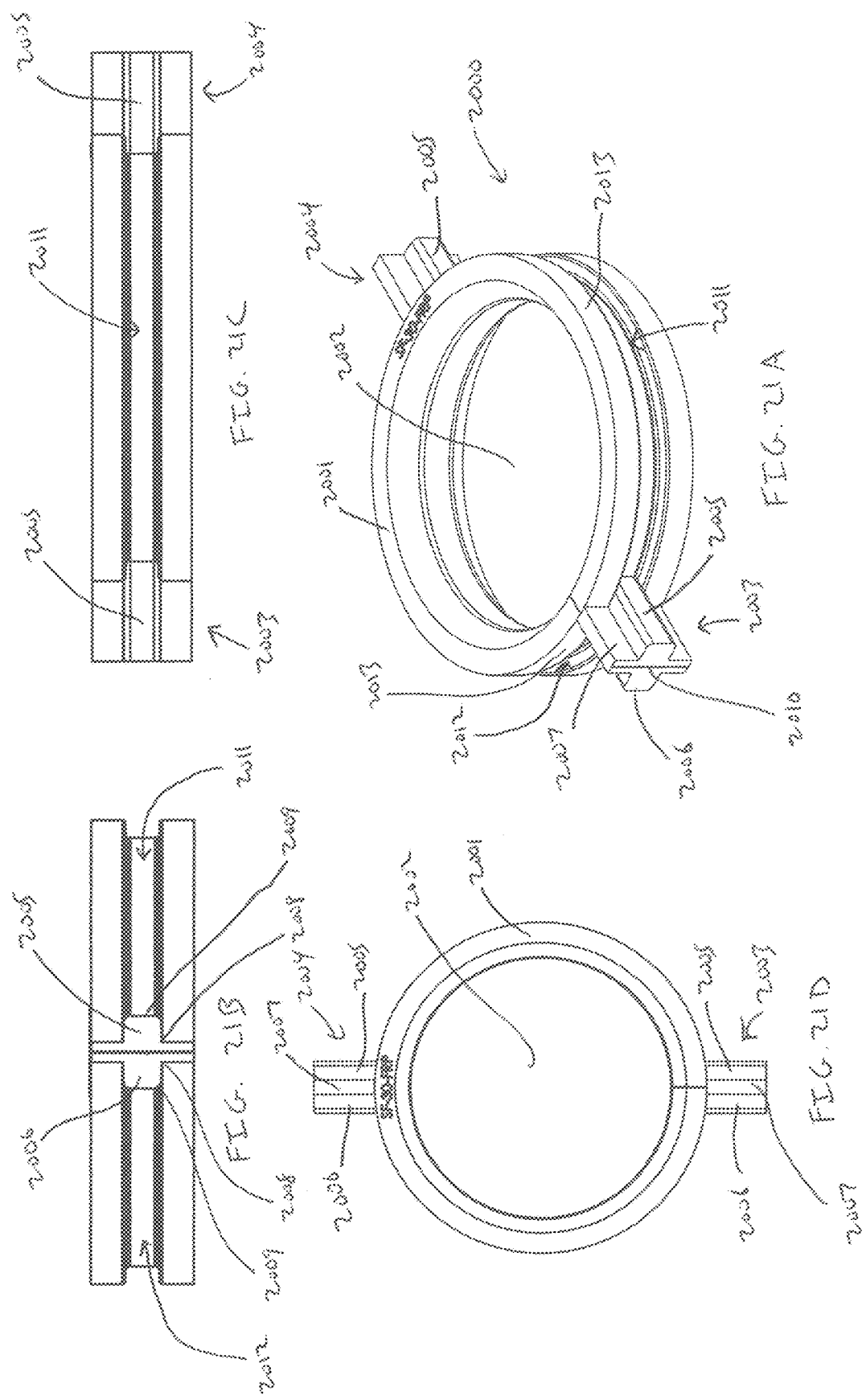

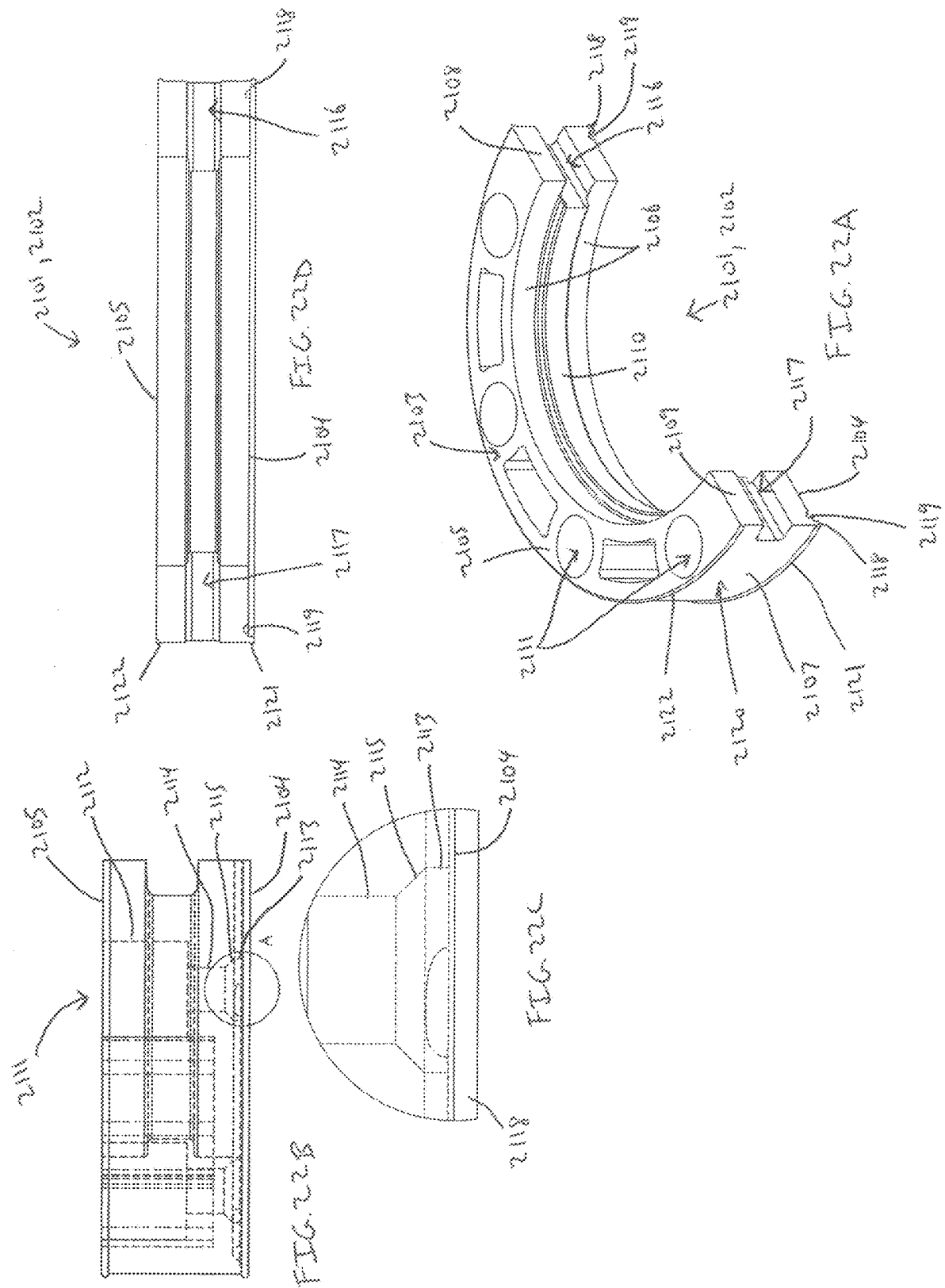

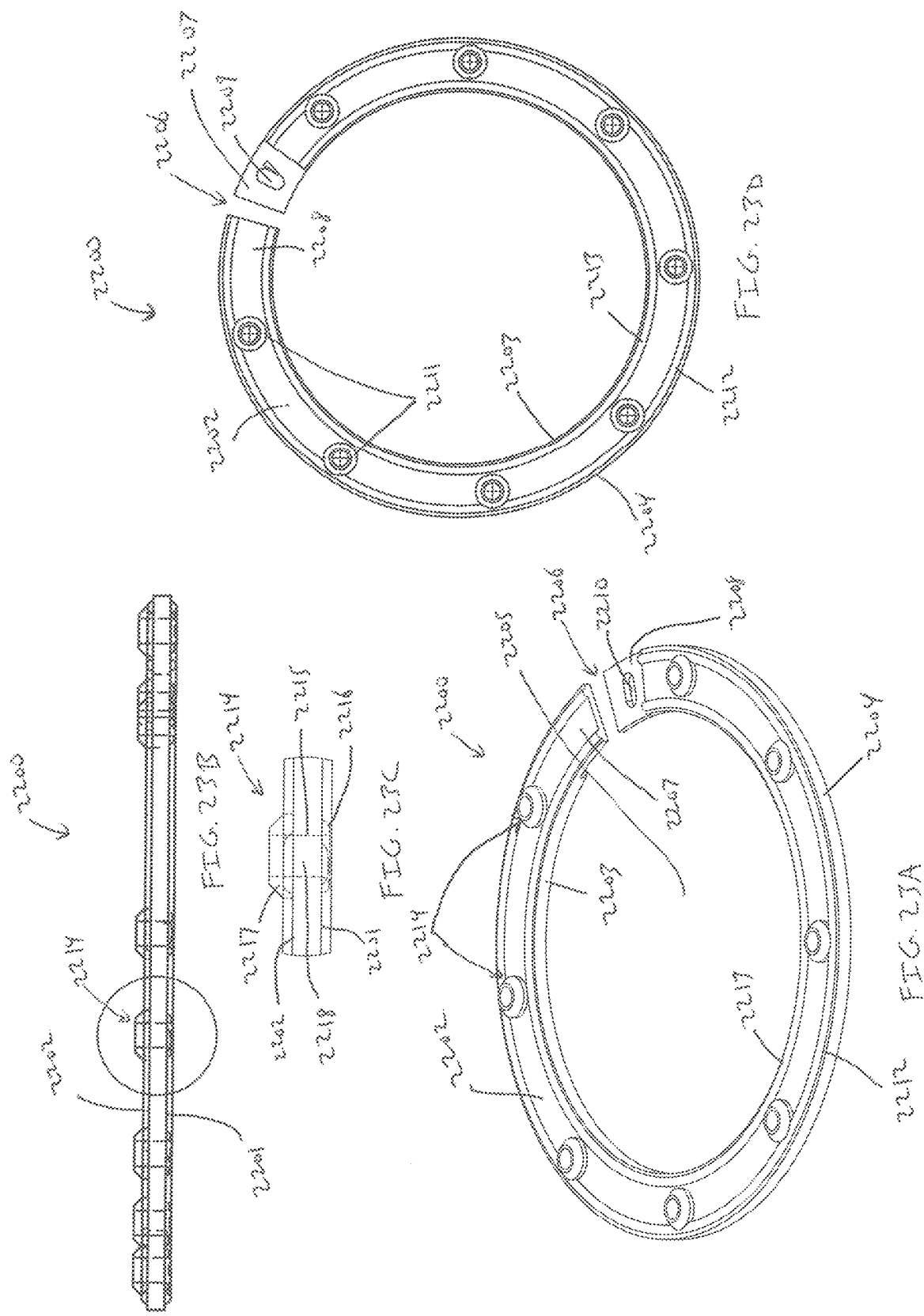

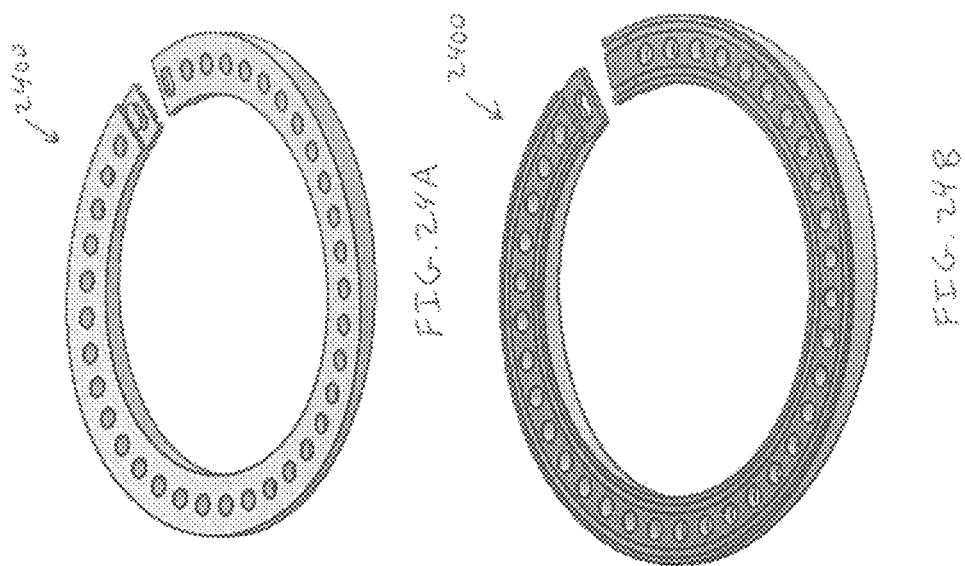
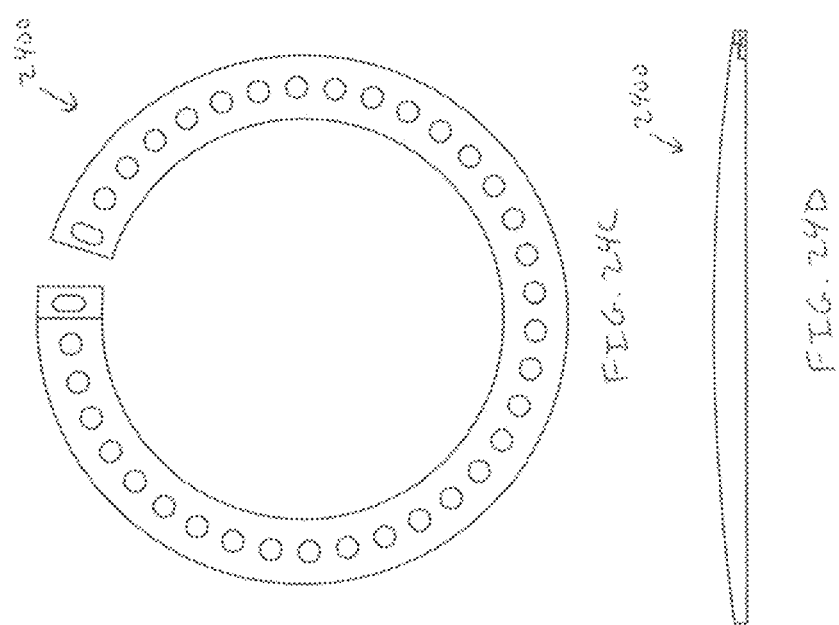

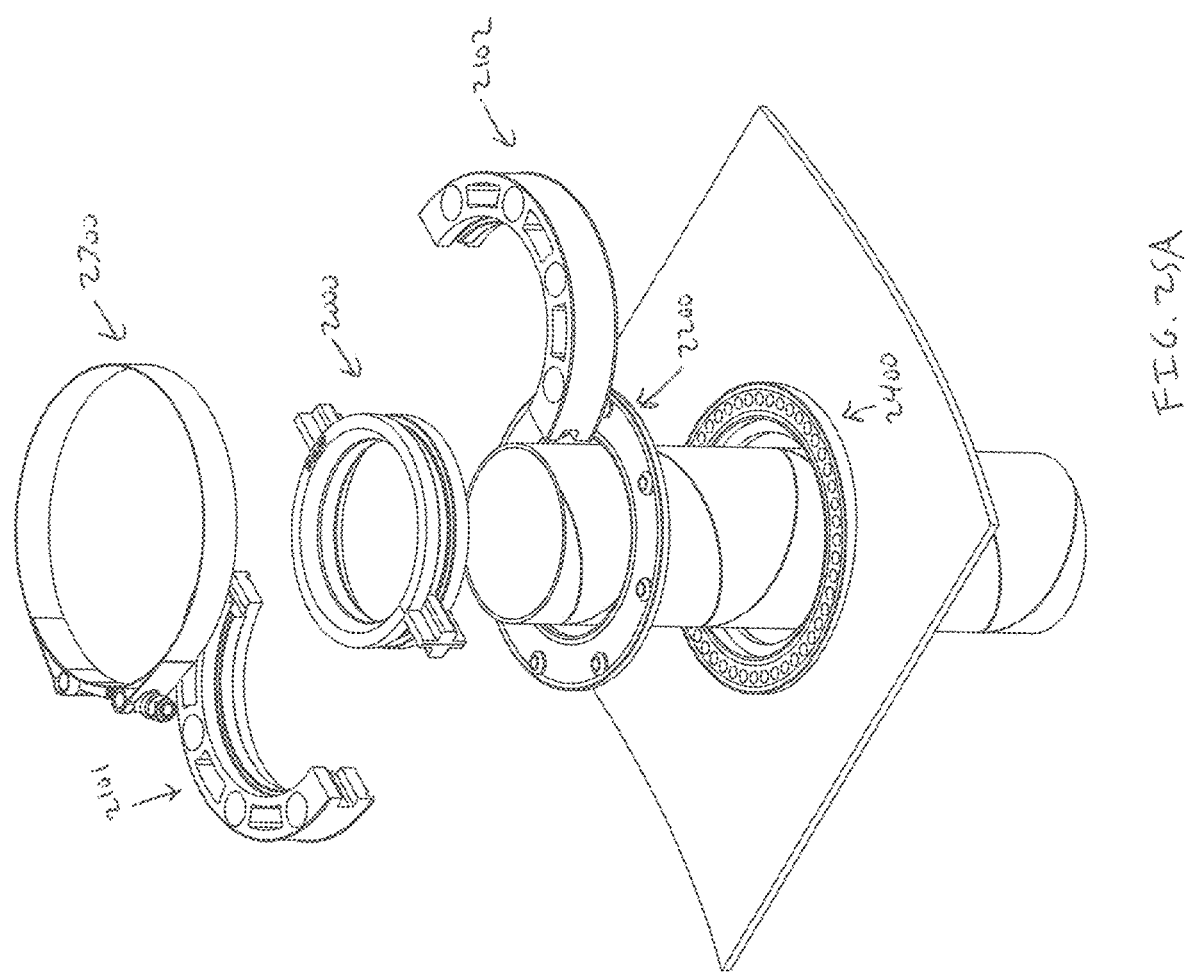

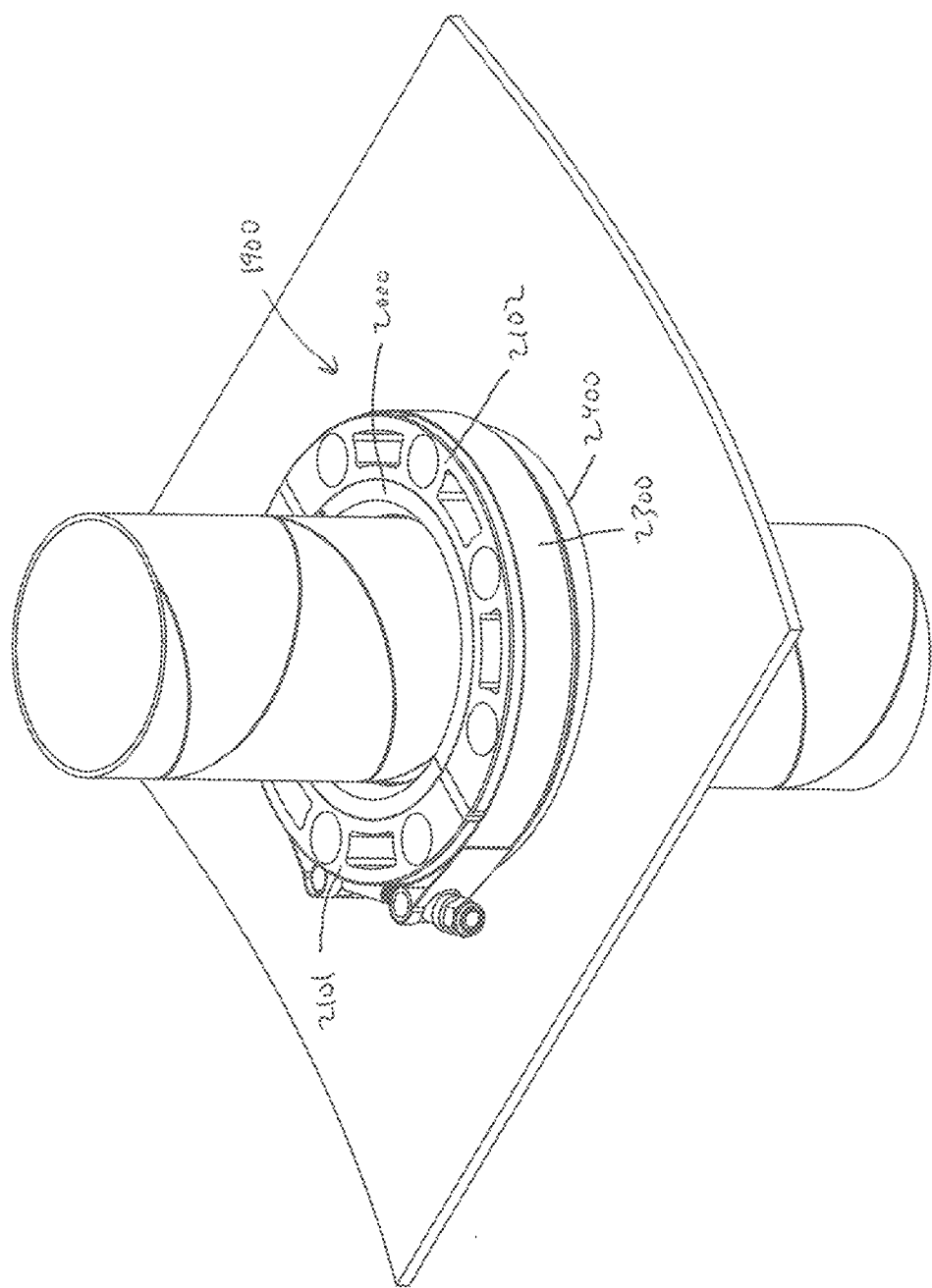

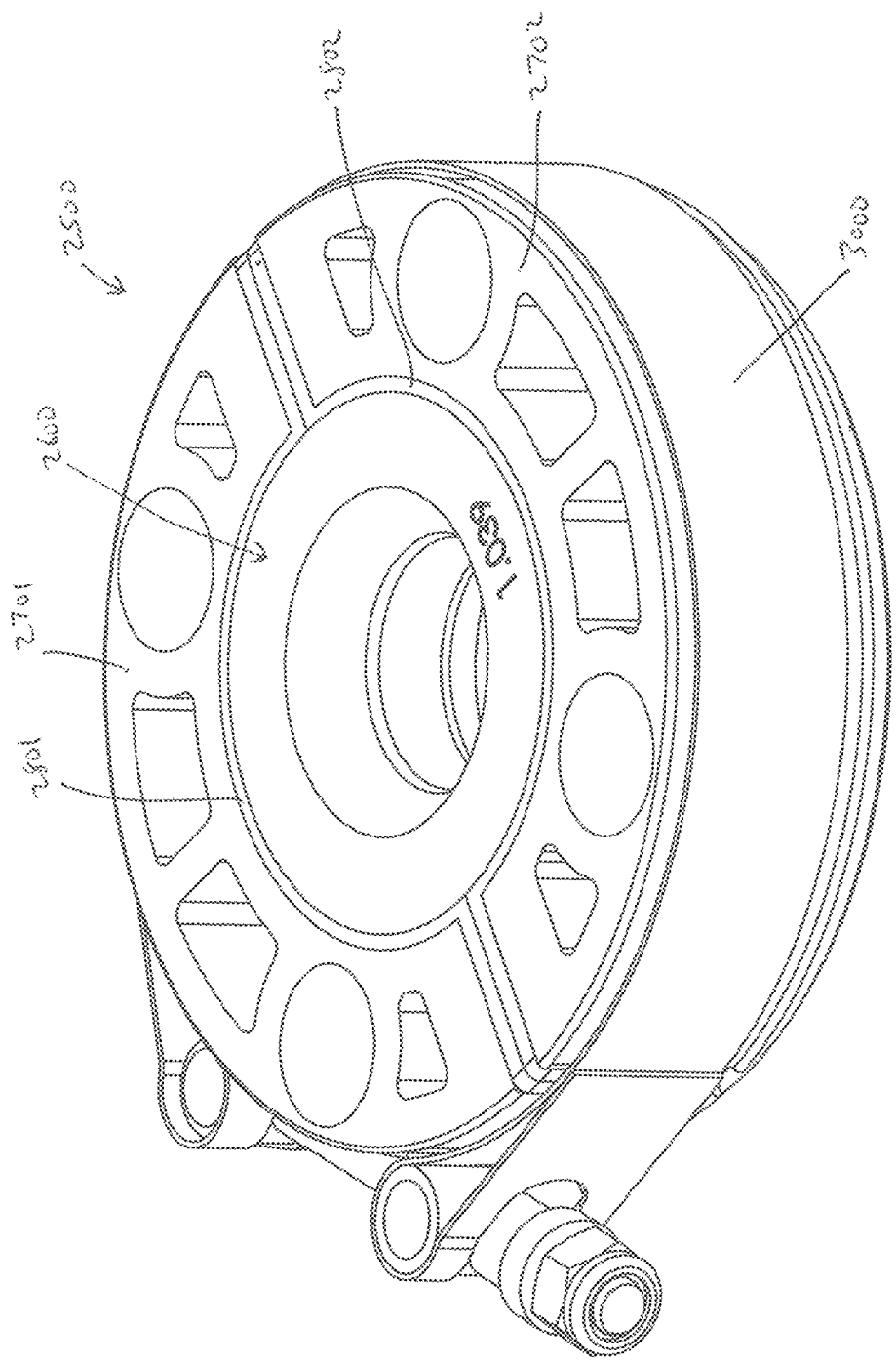

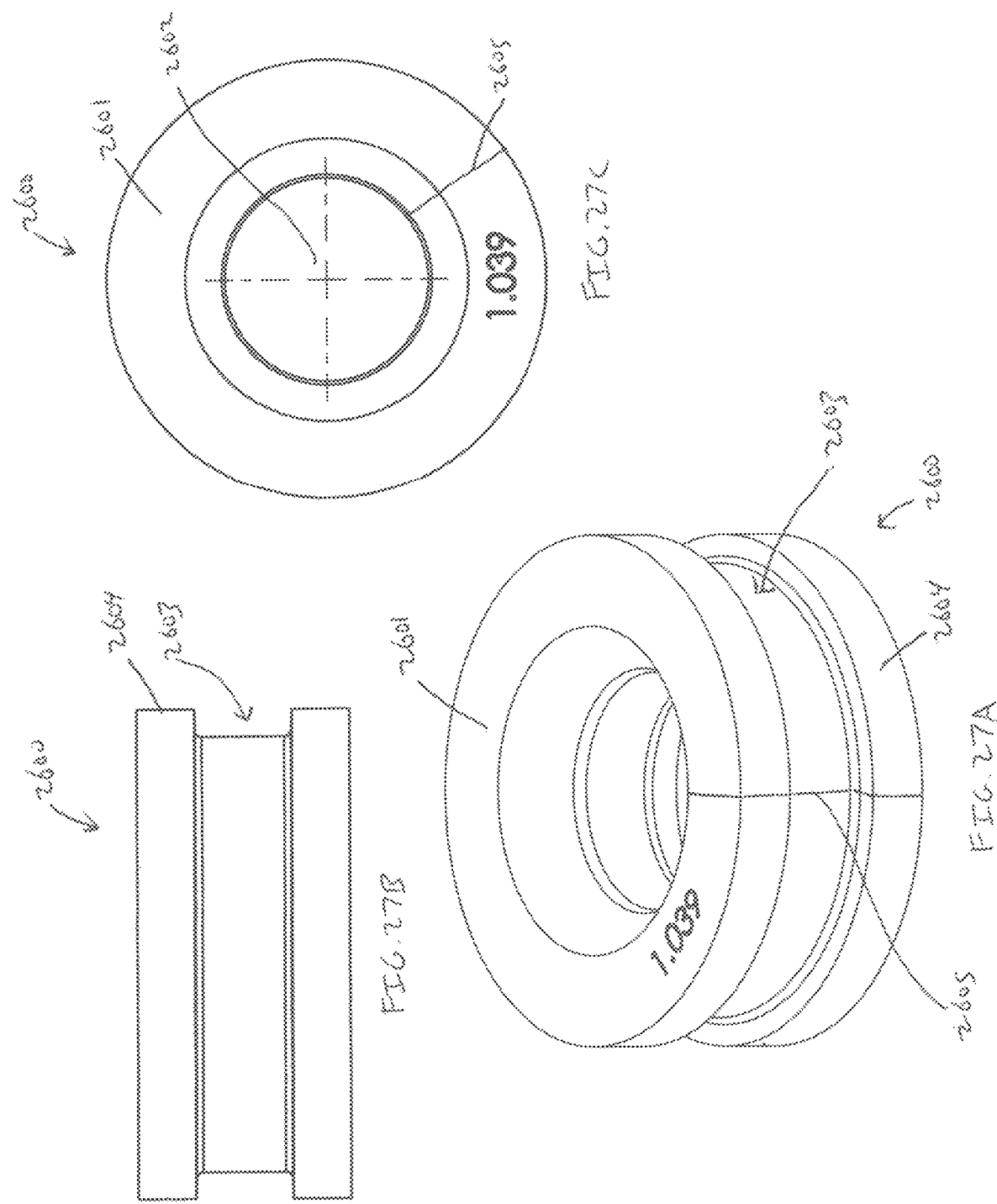

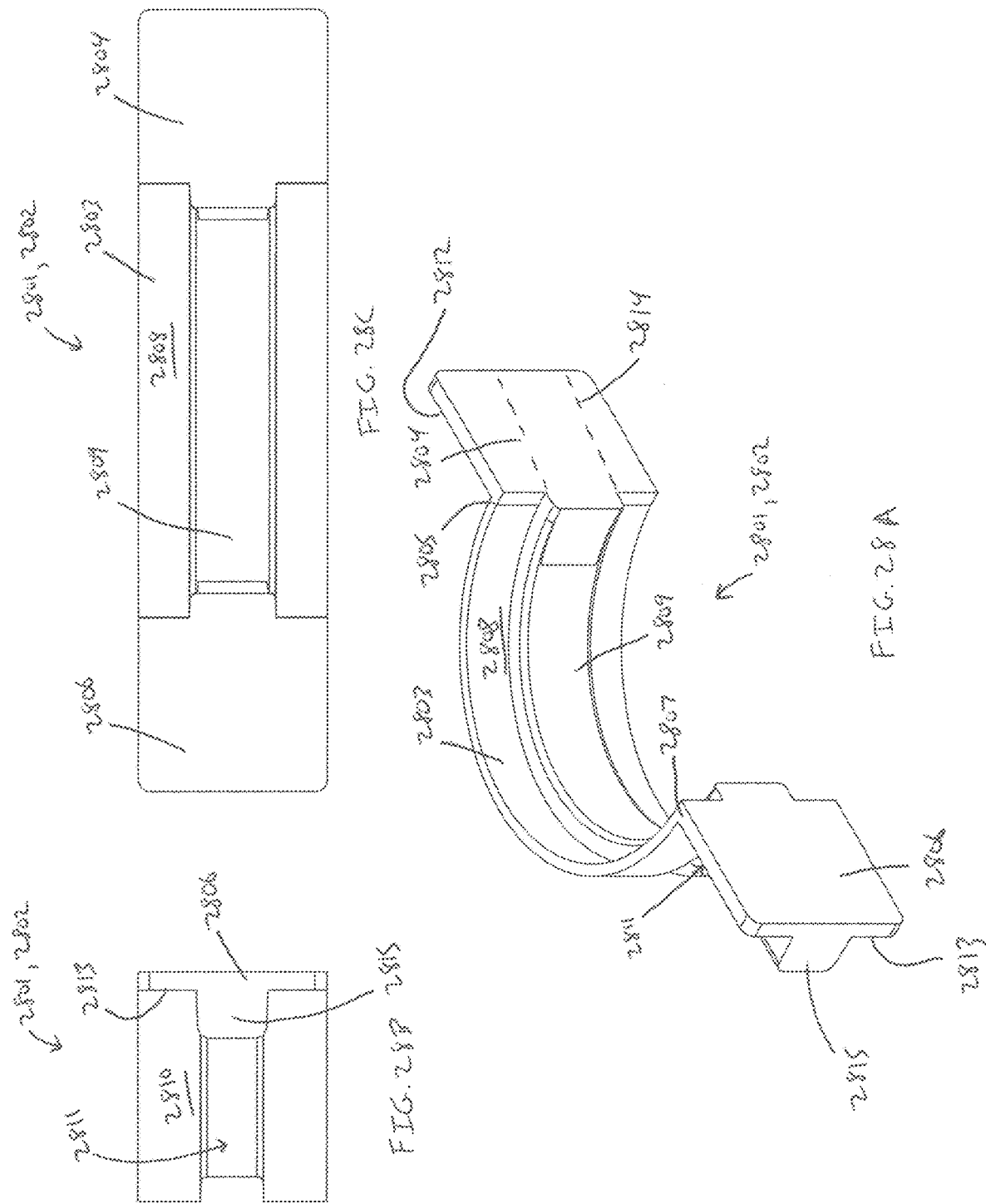

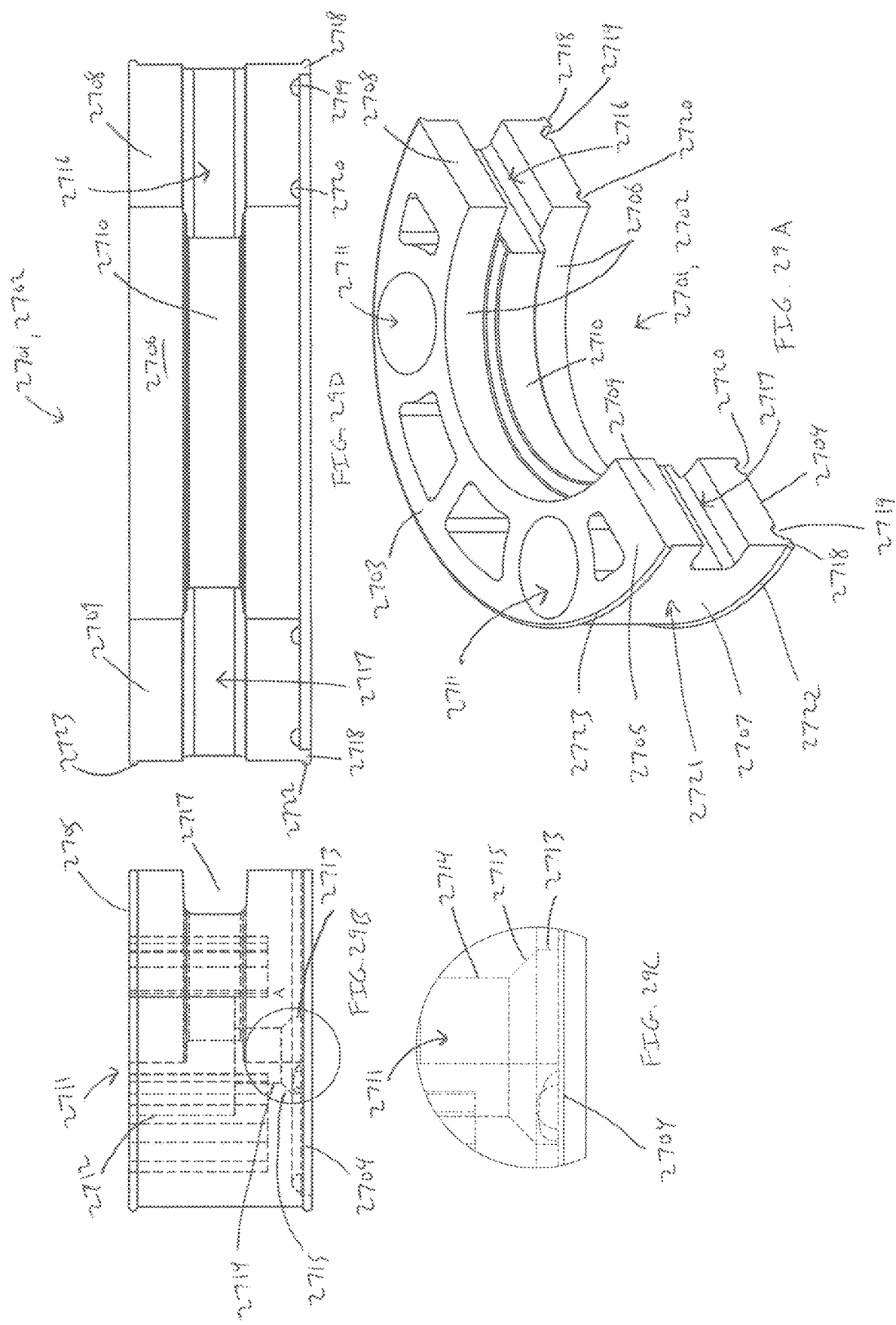

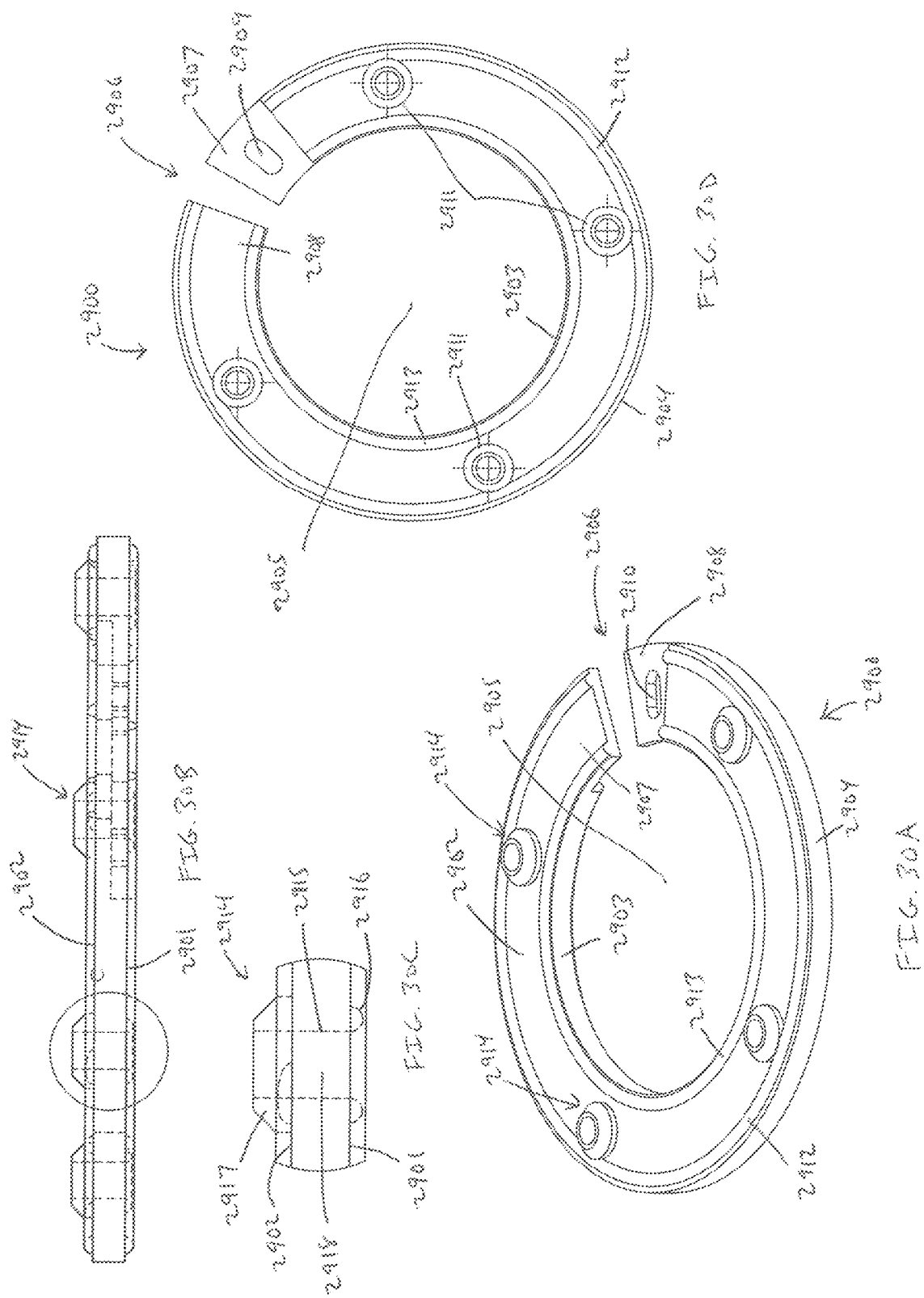

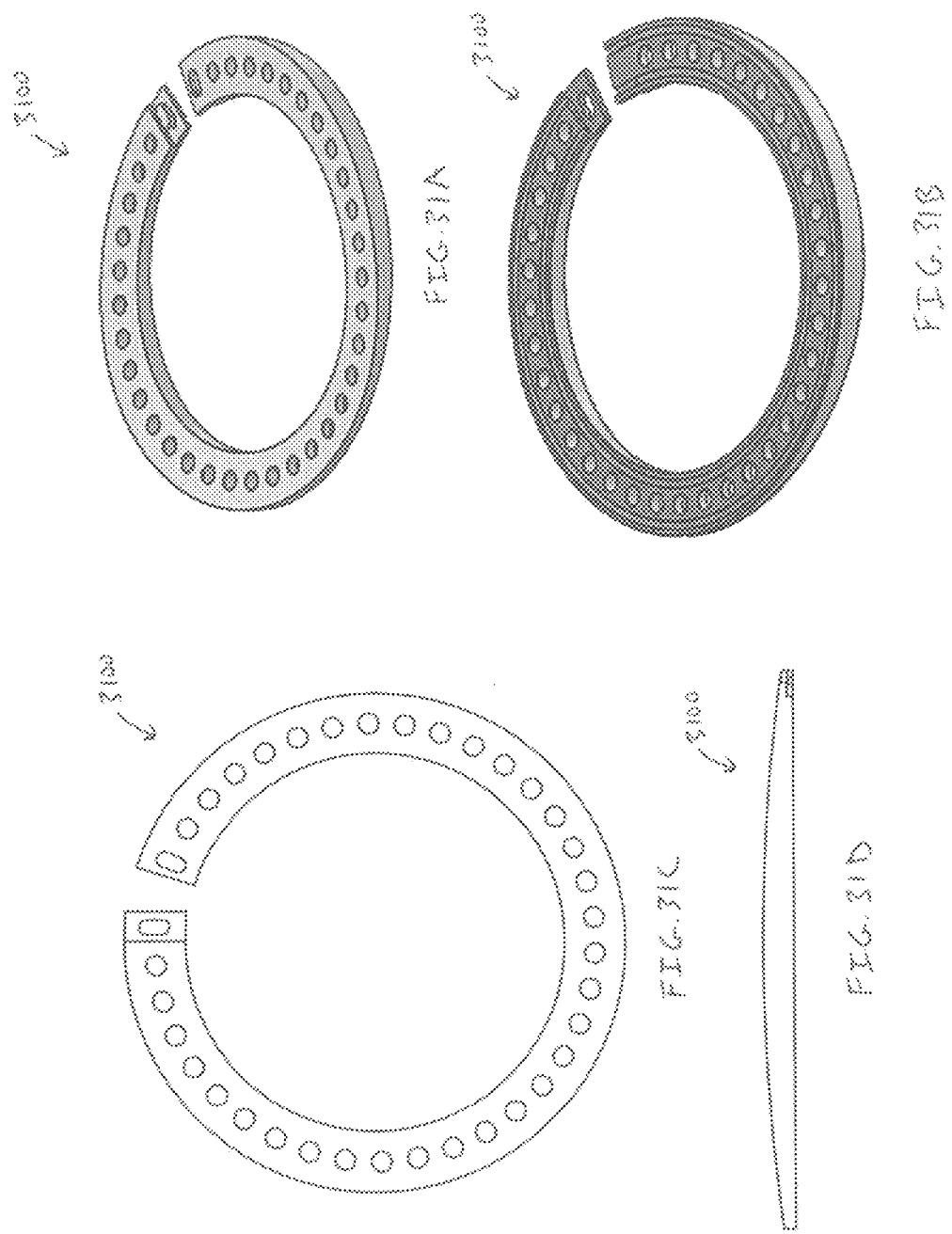

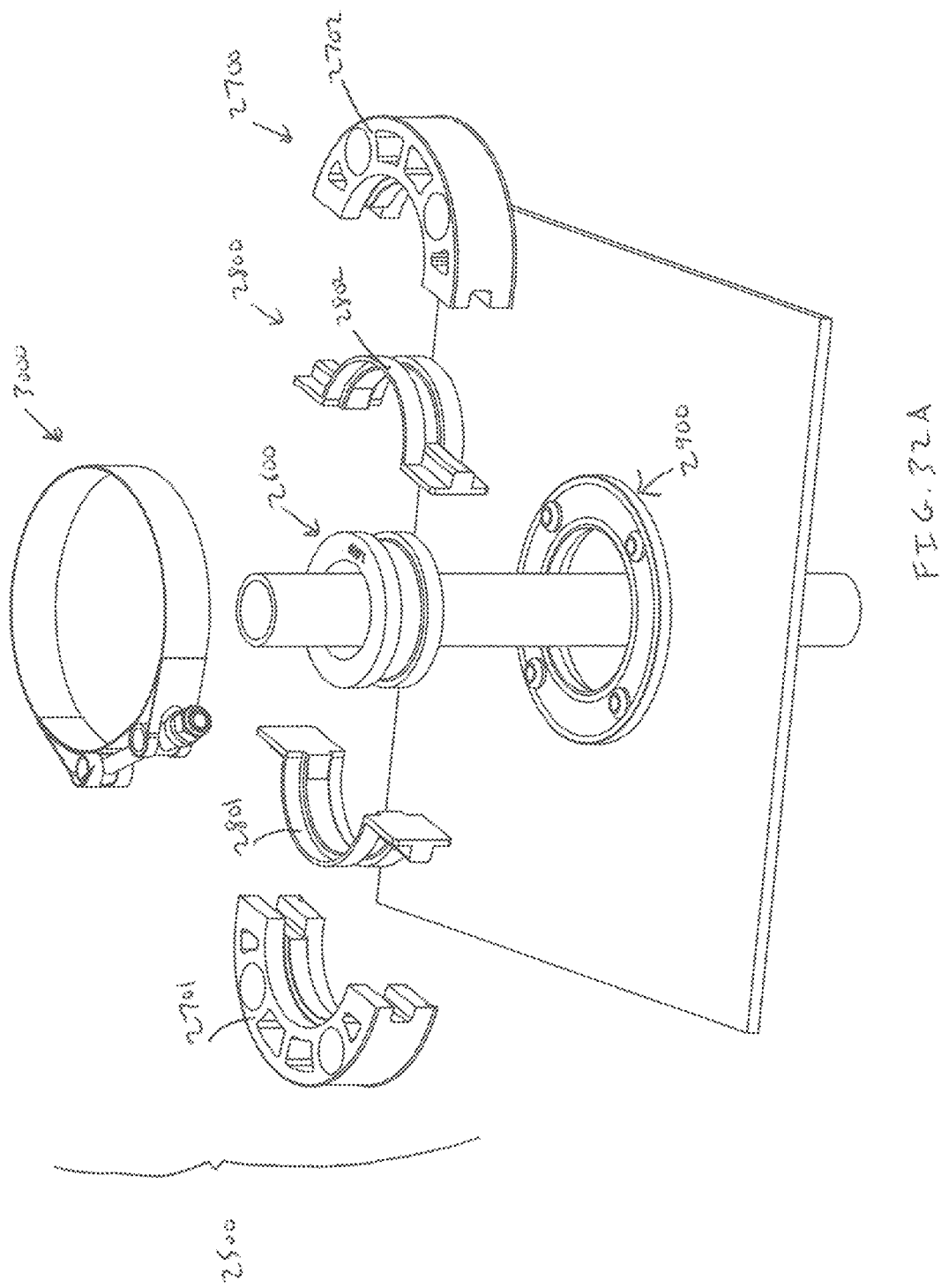

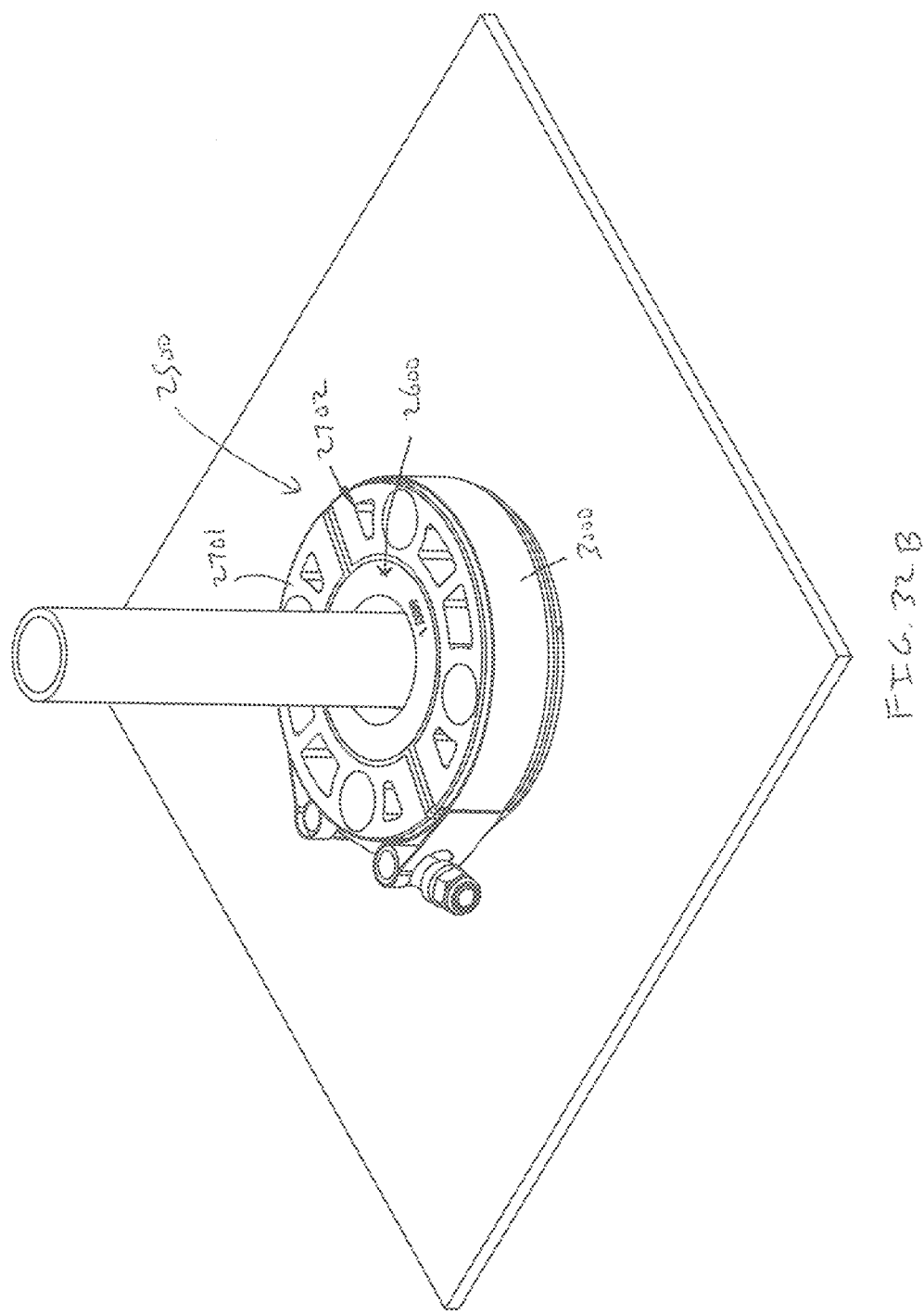

PENETRATION FITTING HAVING COMPRESSION SEALS AND METHODS OF INSTALLING AND USING THE SAME

CROSS-REFERENCES TO RELATED APPLICATION(S)

This application is a continuation of U.S. patent application Ser. No. 16/983,825, filed Aug. 3, 2020 (now U.S. Pat. No. 11,168,813), which claims priority to and the benefit of U.S. Provisional Patent Application No. 62/909,103, filed Oct. 1, 2019, the entire contents of both of which are incorporated herein by reference.

BACKGROUND

1. Field

The present disclosure relates generally to penetration fittings configured to form a seal between a wall of a containment sump and a pipe or conduit passing through an opening in the wall.

2. Description of Related Art

Underground storage tank (UST) fueling sites, such as retail gas stations, typically include pipelines carrying a product such as gasoline from the storage tank to a product dispenser. A sump is typically provided beneath the product dispenser to contain any fuel released from failed equipment and thereby prevent environmental contamination (e.g., ground water contamination) under and around the service station. Each pipeline extends through an aperture in the wall of the sump to a pipe fitting which connects the pipeline to the product dispenser.

The aperture in the sump wall through which the pipeline penetrates must be sealed to prevent the accumulated fuel in the sump from leaking through the aperture in the sump wall and into the surrounding ground (i.e., the backfill surrounding the sump). Accordingly, penetration fittings are commonly provided to form seals between the sumps and the associated pipelines to contain fuel leakage within the sumps. However, penetration fittings commonly include components, such as gaskets and boots, that are made from a material having a relatively low chemical resistance that tend to degrade and fail quickly in the harsh sump environment, and conventional penetration fittings require excavation of the backfill area surrounding the sump to replace worn components of the penetration fitting. Additionally, many conventional replacement penetration fittings require the use of adhesives, which may be messy, cumbersome, and time-consuming to apply. Furthermore, the use of adhesives may make it difficult to ensure a fluid-tight seal between the pipe and the wall of the sump because adhesives need to cure and the quality of the cure depends on a variety of environment factors, such as ambient temperature and humidity.

SUMMARY

The present disclosure is directed to various embodiments of a penetration fitting assembly configured to form a seal around a pipe or conduit and a wall of a sump through which the pipe or conduit passes. In one embodiment, the penetration fitting assembly includes a pipe gasket including an annular portion defining a central opening configured to accommodate the pipe or conduit and first and second stem portions extending in opposite directions from the annular portion, an inner ring assembly configured to surround the pipe gasket including a first inner ring half and a second inner ring half, a ring gasket assembly configured to surround the inner ring assembly including a first ring gasket half and a second ring gasket half, a wall gasket, an outer ring assembly configured to surround the ring gasket assembly including a first outer ring half and a second outer ring half, and a clamp configured to surround the outer ring assembly. When the penetration fitting assembly is installed, the outer ring assembly compresses the wall gasket against the wall of the sump, the clamp compresses the ring gasket assembly between the inner ring assembly and the outer ring assembly, and the clamp compresses the pipe gasket against the pipe or conduit.

Each of the first inner ring half and the second inner ring half may include a semi-cylindrical sidewall, a first semi-circular cap plate proximate to a rear end of the semi-cylindrical sidewall, a second semi-circular cap plate proximate to a front end of the semi-cylindrical sidewall, and a channel defined between the first semi-circular cap plate and second semi-circular cap plate configured to accommodate a portion of the pipe gasket.

The channel of each of the first inner ring half and the second inner ring half may be tapered, the pipe gasket may include a first rib and a second rib opposite the first rib, and the channel of the first inner ring half may be configured to accommodate the first rib and the channel of the second inner ring half may be configured to accommodate the second rib.

Each of the first ring gasket half and the second ring gasket half may include a semi-annular portion, a first flange extending radially outward from a first end of the semi-annular portion, and a second flange extending radially outward from a second end of the semi-annular portion.

Each of the first ring gasket half and the second ring gasket half may further include a semi-annular projection at an inner surface of the semi-annular portion, and a semi-annular recess at an outer surface of the semi-annular portion.

Each of the first inner ring half and the second inner ring half may include a semi-annular groove in an outer surface of the semi-cylindrical sidewall, each of the first outer ring half and the second outer ring half may include a semi-annular projection extending radially inward from the inner surface, and the semi-annular groove of the first and second inner ring halves may be configured to accommodate the semi-annular projection of the first and second outer ring halves.

Each of the first outer ring half and the second outer ring half may include a semi-annular projection extending radially inward, and the semi-annular recess of the first and second ring gasket halves may be configured to accommodate the semi-annular projection of the first and second outer ring halves.

Each of the first and second ring gasket halves may include projections on outer surfaces of the first and second flanges, and opposite ends of each of the first and second outer ring halves may include notches configured to accommodate the projections.

The wall gasket may include a split ring having a front surface configured to face toward the wall of the sump and a rear surface configured to face away from the wall of the sump, a series of openings circumferentially arranged in the split ring, an outer annular lip on the rear surface, and an inner annular lip on the rear surface. The series of openings may be between the outer annular lip and the inner annular lip.

Each of the first and second outer ring halves may include a front surface configured to face toward the wall of the sump and a rear surface configured to face away from the wall of the sump, and the front surface of each of the first and second outer ring halves may include a semi-annular groove configured to accommodate a portion of the outer annular lip of the wall gasket.

Each of the first and second inner ring halves may include a front surface configured to face toward the wall of the sump, and the front surface of each of the first and second inner ring halves may include a semi-annular groove configured to accommodate a portion of the inner annular lip of the wall gasket.

The wall gasket may also include a series of screw seals at the series of openings, each screw seal may include a tapered head at the rear surface of the split ring.

Each of the first and second outer ring halves may include a series of counterbores extending from the front surface to the rear surface configured to accommodate fasteners securing the outer ring assembly to the wall of the sump.

Each counterbore of the series of counterbores may include a first relatively wider portion at the rear surface, a second relatively wider portion at the front surface, a relatively narrower portion between the first relatively wider portion and the second relatively wider portion, and a taper connecting the second relatively wider portion to the relatively narrower portion. The second relatively wider portion and the taper of each of the series of counterbores may be configured to accommodate the tapered head of each of the series of screw seals.

The penetration fitting assembly may also include an adapter wall gasket including a curved front surface configured to face toward the wall of the sump.

A penetration fitting assembly according to another embodiment of the present disclosure includes a pipe gasket including an annular portion defining a central opening configured to accommodate the pipe or conduit and first and second stem portions extending in opposite directions from the annular portion, a ring assembly configured to surround the pipe gasket including a first ring half and a second ring half, a wall gasket, and a clamp configured to surround the ring assembly. When the penetration fitting assembly is installed, the ring assembly compresses the wall gasket against the wall of the sump, and the clamp compresses the pipe gasket against the pipe or conduit.

A penetration fitting assembly according to another embodiment of the present disclosure includes a pipe gasket including an annular portion defining a central opening configured to accommodate the pipe or conduit, a ring gasket assembly configured to surround the pipe gasket including a first ring gasket half and a second ring gasket half, a wall gasket, an outer ring assembly configured to surround the ring gasket assembly including a first outer ring half and a second outer ring half, and a clamp configured to surround the outer ring assembly. When the penetration fitting assembly is installed, the outer ring assembly compresses the wall gasket against the wall of the sump, the clamp compresses the ring gasket assembly between the pipe gasket and the outer ring assembly, and the clamp compresses the pipe gasket against the pipe or conduit.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will be better understood by reference to the following detailed description when considered in conjunction with the accompanying figures. In the figures, like reference numerals are used throughout the figures to reference like features and components. The figures are not necessarily drawn to scale.

FIGS. 1A-1B are an exploded perspective view and an assembled perspective view, respectively, of a penetration fitting assembly according to one embodiment of the present disclosure;

FIGS. 2A-2D are a perspective view, an end view, a front view, and a side view, respectively, of a gasket according to one embodiment of the present disclosure;

FIGS. 3A-3E are first and second perspective views, a back view, a front view, and a side view, respectively, of a base half according to one embodiment of the present disclosure;

FIGS. 5A-5C are a perspective view, an end view, and a side view, respectively, of cap gaskets according to one embodiment of the present disclosure;

FIGS. 7A-7C are a perspective view, a side view, and an end view, respectively, of a disposable spacer according to one embodiment of the present disclosure;

FIGS. 12A-12C are an exploded perspective view, an assembled perspective view, and an assembled top view, respectively, of a penetration fitting assembly including a pipe gasket, an inner ring assembly, a ring gasket assembly, an outer ring assembly, and a wall gasket according to one embodiment of the present disclosure;

FIG. 13 is a perspective view of the embodiment of the pipe gasket illustrated in FIGS. 12A-12C;

FIGS. 14A-14C are a perspective view, an end view, and a side view, respectively, of an inner ring half of the embodiment of the inner ring assembly illustrated in FIGS. 12A-12C;

FIGS. 15A-15C are a perspective view, an end view, and a side view, respectively, of a ring gasket half of the embodiment of the ring gasket assembly illustrated in FIGS. 12A-12C;

FIGS. 16A-16D are a perspective view, an end view, a side view, and a detail view, respectively, of an outer ring half of the embodiment of the outer ring assembly illustrated in FIGS. 12A-12C;

FIGS. 17A-17D are a perspective view, a side view, a detail view, and a top view, respectively, of the embodiment of the wall gasket illustrated in FIGS. 12A-12C;

FIGS. 18A-18D are a front perspective view, a rear perspective view, a top view, and a side view, respectively, of an adapter gasket configured to enable use of the embodiment of the penetration fitting assembly illustrated in FIGS. 12A-12C on a curved sump wall;

FIGS. 19A-19B are a perspective view and a cross-sectional view, respectively, illustrating the embodiment of the penetration fitting assembly illustrated in FIGS. 12A-12C installed around a pipe or conduit passing through a wall of a containment sump;

FIGS. 20A-20B are an exploded perspective view and an assembled perspective view, respectively, of a penetration fitting assembly including a pipe gasket, a ring assembly, a ring gasket assembly, a wall gasket, an adapter gasket, and a clamp according to one embodiment of the present disclosure;

FIGS. 21A-21D are a perspective view, an end view, a side view, and a top view, respectively, the embodiment of the pipe gasket illustrated in FIGS. 20A-20B;

FIGS. 22A-22D are a perspective view, an end view, a detail view, and a side view, respectively, of a ring half of the embodiment of the ring assembly illustrated in FIGS. 20A-20B;

FIGS. 23A-23D are a perspective view, a side view, a detail view, and a top view, respectively, of the embodiment of the wall gasket illustrated in FIGS. 20A-20B;

FIGS. 24A-24D are a front perspective view, a rear perspective view, a top view, and a side view, respectively, of the embodiment of the adapter gasket illustrated in FIGS. 20A-20B;

FIGS. 25A-25B are an exploded perspective view and an assembly perspective view, respectively, illustrating the embodiment of the penetration fitting assembly illustrated in FIGS. 20A-20B installed around a pipe or conduit passing through a wall of a containment sump;

FIGS. 26A-26B are an exploded perspective view and an assembled perspective view, respectively, of a penetration fitting assembly including a pipe gasket, a ring gasket assembly, a ring assembly, a wall gasket, and a clamp according to one embodiment of the present disclosure;

FIGS. 27A-27C are a perspective view, a side view, and a top view, respectively, of the embodiment of the pipe gasket illustrated in FIGS. 26A-26B;

FIGS. 28A-28C are a perspective view, an end view, and a side view, respectively, of a ring gasket half of the embodiment of the ring gasket assembly illustrated in FIGS. 26A-26B;

FIGS. 29A-29D are a perspective view, an end view, a detail view, and a side view, respectively, of a ring half of the embodiment of the ring assembly illustrated in FIGS. 26A-26B;

FIGS. 30A-30D are a perspective view, a side view, a detail view, and a top view, respectively, of the embodiment of the wall gasket illustrated in FIGS. 26A-26B;

FIGS. 31A-31D are a front perspective view, a rear perspective view, a top view, and a side view, respectively, of the embodiment of the adapter gasket illustrated in FIGS. 26A-26B; and FIGS. 32A-32B are an exploded perspective view and an assembly perspective view, respectively, illustrating the embodiment of the penetration fitting assembly illustrated in FIGS. 26A-26B installed around a pipe or conduit passing through a wall of a containment sump.

DETAILED DESCRIPTION

The present disclosure is directed to various embodiments of a penetration fitting assembly configured to form a seal between a wall of a containment sump and a pipe or conduit passing through an opening in the wall. In one or more embodiments, the penetration fitting assembly may be utilized to replace a failed rubber boot. Additionally, in one or more embodiments, the penetration fitting assemblies of the present disclosure are configured to form liquid-tight or substantially liquid-tight seals against the wall of the containment sump and around the pipe or conduit with compression seals. Further, in one or more embodiments, the penetration fitting assemblies of the present disclosure are configured to form liquid-tight or substantially liquid-tight seals against the wall of the containment sump and around the pipe or conduit without the use of adhesives.

Figure 1B:
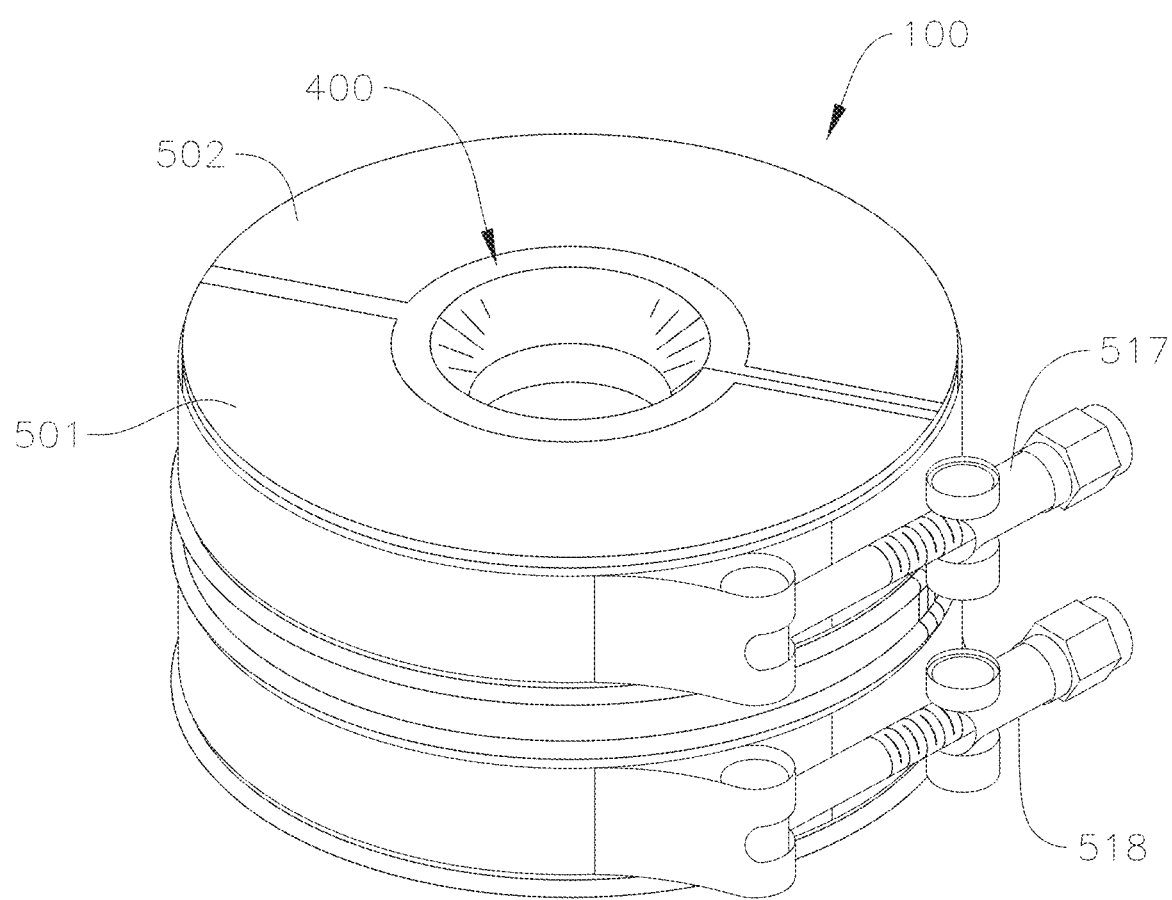
Figure 3C:
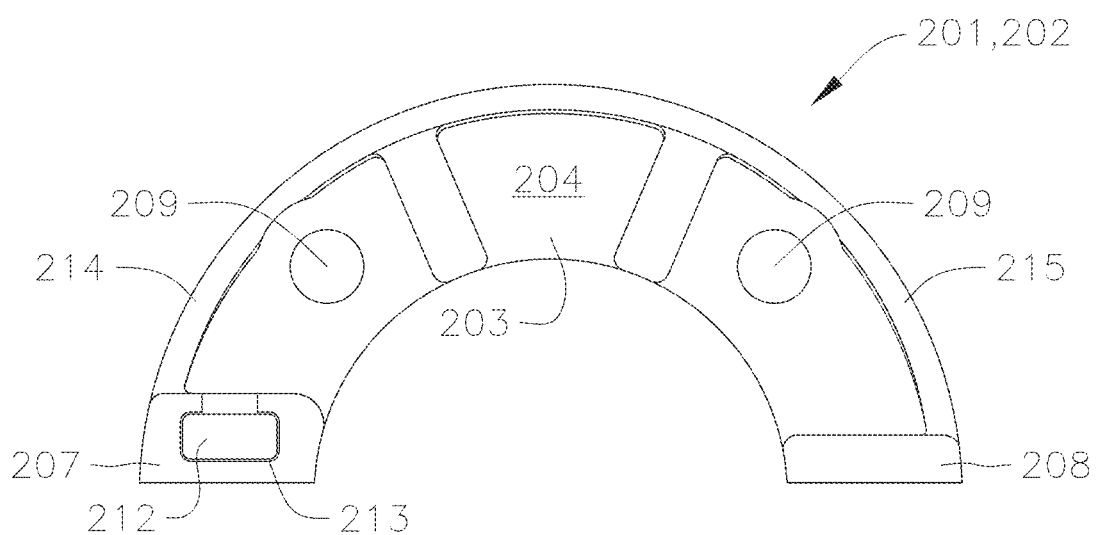
Figure 3D:
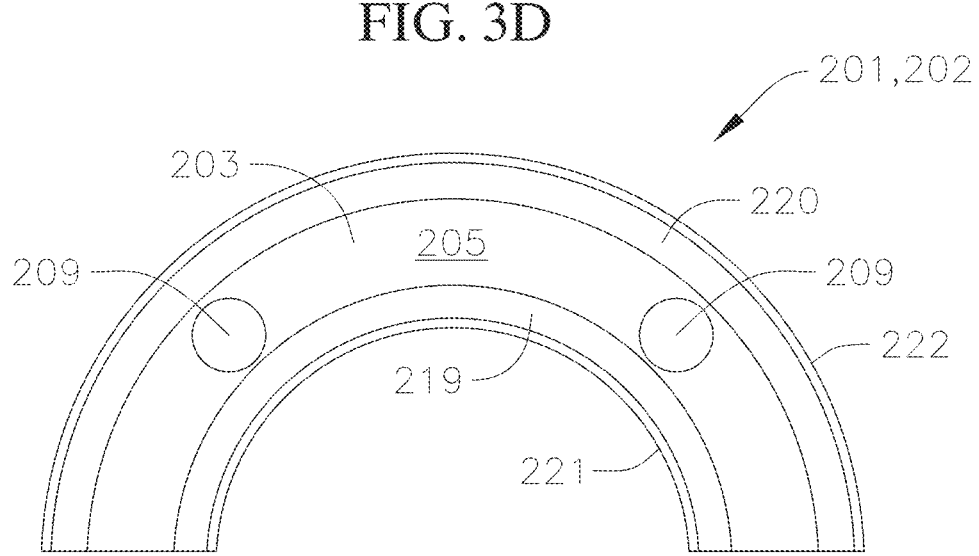

With reference now to FIGS. 1A-1B, a penetration fitting assembly 100 according to one embodiment of the present disclosure includes a base assembly 200, a gasket assembly 300 configured to form a liquid-tight seal between the base assembly 200 and a wall of containment sump, a pipe gasket 400 configured to surround a pipe or conduit passing through a wall of a containment sump, and a cap assembly 500 configured to surround the base assembly 200, compress the pipe gasket 400 against the pipe or conduit, and compress a portion of the gasket assembly 300 between the base assembly 200 and the cap assembly 500 to form a liquid-tight seal between the cap assembly 500 and the base assembly 200. The first and second base halves 201, 202 and the first and second cap halves 501, 502 may be made out of any suitable material, such as, for instance, plastic. As described in more detail below, the cap assembly 500 is configured to shield or insulate at least a portion of the gasket assembly 300 and at least a portion of the pipe gasket 400 from the hydrocarbons that may collect in the containment sump, which might otherwise degrade or prematurely wear the gasket assembly 300 and the pipe gasket 400. In this manner, the cap assembly 500 is configured to prolong the service life of the penetration fitting assembly 100 compared to related art penetration fittings in which the rubber gaskets are more completely exposed to hydrocarbons. Additionally, in one or more embodiments, the penetration fitting assembly 100 is configured to form liquid-tight seals against the wall of the containment sump and the conduit or pipe passing through the wall of the containment sump without the use of adhesives, which may improve the quality of the seals and/or may reduce installation time because sealant requires time to cure and the quality of the cure depends on a variety of environment factors, such as ambient temperature and humidity.

In the illustrated embodiment, the base assembly 200 includes a first base half 201 and a second base half 202, and the gasket assembly 300 includes a first gasket half 301 configured to engage the first base half 201 and a second gasket half 302 configured to engage the second base half 202. Additionally, in the illustrated embodiment, the cap assembly 500 includes a first cap half 501 and a second cap half 502. The first and second base halves 201, 202 are configured to surround the pipe or conduit passing through the wall of the containment sump, and the first and second cap halves 501, 502 are configured to surround the base assembly and the pipe or conduit passing through the wall of the containment sump. As described in more detail below, the first and second base halves 201, 202 are configured to compress the first and second gasket halves 301, 302, respectively, against the wall of the containment sump to form a liquid-tight seal or a substantially liquid-tight seal against the wall of the containment sump around the opening in the wall of the containment sump through which the pipe or conduit passes. Additionally, as described in more detail below, the first and second cap halves 501, 502 are configured to compress the first and second gasket halves 301, 302, respectively, against the first and second base halves 201, 202 to form a liquid-tight seal or a substantially liquid-tight seal between the first and second cap halves 501, 502 and the first and second base halves 201, 202.

FIGS. 2A-2D depict the configuration of the first and second gasket halves 301, 302 according to one embodiment of the present disclosure. In the illustrated embodiment, the configuration of first gasket half 301 is identical to the configuration of the second gasket half 302, which is configured to reduce manufacturing costs and simplify installation because the technician does not need to distinguish between the two gasket halves 301, 302. However, In one or more embodiments, the first gasket half 301 may have a different configuration than the second gasket half 302.

In the illustrated embodiment, each of the first and second gasket halves 301, 302 includes a first semi-annular portion 303, a second semi-annular portion 304 spaced radially outward apart from the first semi-annular portion 303, and a third semi-annular portion 305. In the illustrated embodiment, the first and second semi-annular portions 303, 304 are in the same or substantially the same plane, and the third semi-annular portion 305 is on a different plane than the first and second semi-annular portions 303, 304. In the illustrated embodiment, the third semi-annular portion 305 is spaced radially outward from the second semi-annular portion 304 and is spaced longitudinally rearward from the first and second semi-annular portions 303, 304.

In the illustrated embodiment, the first gasket half 301 and the second gasket half 302 each also include a first tab 306 at a first end of the first, second, and third semi-annular portions 303, 304, 305, and a second tab 307 at a second end of the first, second, and third semi-annular portions 303, 304, 305. The first and second tabs 306, 307 each include an opening 308, 309 (e.g., a hole), respectively, configured to receive a fastener securing the first and second gasket halves 301, 302 to the first and second base halves 201, 202 and securing the first and second base halves 201, 202 together.

In the illustrated embodiment, the third semi-annular portion 305 has a D-shaped cross-sectional shape, and both of the first and second semi-annular portions 303, 304 have a round (e.g., circular) cross-sectional shape. In one or more embodiments, the first, second, and third semi-annular portions 303, 304, 305 may have the same or substantially the same cross-sectional shape (e.g., round or D-shaped). Additionally, although in the illustrated embodiment the first and second gasket halves 301, 302 each include three semi-annular portions 303, 304, 305, in one or more embodiments, each of the first and second gasket halves 301, 302 may include any other suitable number of semi-annular gasket portions, such as, for instance, more than three semi-annular gasket portions or only two semi-annular gasket portions (e.g., the first and second gasket halves 301, 302 may not include the first semi-annular portion 303 or the second semi-annular portion 304).

With reference now to the embodiment illustrated in FIGS. 3A-3E, the first and second base halves 201, 202 each include a semi-annular face plate 203 having a rear surface 204 and a front surface 205 opposite the rear surface 204, a reinforcement flange 206 extending circumferentially around at least a portion of an outer periphery of the semi-annular face plate 203, and first and second abutment flanges 207, 208 at opposite end portions of the semi-annular face plate 203. In the illustrated embodiment, the reinforcement flange 206 and the first and second abutment flanges 207, 208 extend rearward from the rear surface 204 of the semi-annular face plate 203 (e.g., the reinforcement flange 206 and the first and second abutment flanges 207, 208 extend in a direction away from the front surface 205 of the semi-annular face plate 203).

In the illustrated embodiment, each of the first and second base halves 201, 202 also includes a series of openings 209 (e.g., holes) in the face plate 203 configured to accommodate fasteners for securing the first and second base halves 201, 202 to the wall of the containment sump. The configuration (e.g., number, size, and arrangement) of the openings 209 in the face plate 203 may be selected to correspond to the configuration (e.g., number, size, and arrangement) of the fasteners in the wall of the containment sump (e.g., the pre-existing fasteners in the wall of the containment sump that were utilized to install the rubber boot or other pipe fitting that is being replaced by the penetration fitting assembly 100). In one or more embodiments, the number of openings 209 in the face plate 203 of each of the first and second fitting halves 201, 202 may be in a range from two openings to six openings. In one or more embodiments, the number of openings 209 in the face plate 203 may vary depending on the size of the first and second base halves 201, 202 (e.g., relatively larger base halves 201, 202 may include more openings 209 and relatively smaller base halves 201, 202 may include fewer openings 209 in the face plates 203).

In the illustrated embodiment, the first and second abutment flanges 207, 208 each include an opening 210, 211 (e.g., a hole), respectively, configured to accommodate a fastener securing the first and second fitting halves 201, 202 together. In the illustrated embodiment, the first abutment flange 207 of each of the first and second fitting halves 201, 202 also includes a slot or channel 212 having an open end 213 at the rearward end of the first abutment flange 207. The slot 212 is configured to accommodate and retain a square nut. In the illustrated embodiment, the width of the slot 212 in the first abutment flange 207 is selected to accommodate the square nut but prevent the square nut from rotating within the slot 212 (e.g., the width of the slot 212 is at least as wide as the square nut but not wider than a diagonal of the square nut). Accordingly, once the first and second base halves 201, 202 are coupled together with the fasteners, the slots 212 prevent the nuts from rotating relative to the fasteners (i.e., the slots 212 prevent the nuts from backing off of the fasteners), which might otherwise cause the first and second base halves 201, 202 to detach from each other or at least reduce the compression of the tabs 306, 307 of the first and second gasket halves 301, 302, which could create a leak path. The slots 212, which are configured to prevent rotation of the nuts, also enables a technician to secure the first and second base halves 201, 202 together with the fasteners without requiring tool access to the nuts.

Additionally, in the illustrated embodiment, a first notch 214 is defined in the reinforcement flange 206 proximate to the first abutment flange 207, and a second notch 215 is defined in the reinforcement flange 206 proximate to the second abutment flange 208. In one or more embodiments, the first and second notches 214, 215 may extend completely through or only partially through the reinforcement flange 206 (e.g., the notches 214, 215 may extend from a rearward end of the reinforcement flange 206 to the rear surface 204 of the face plate 203 or the notches 214, 215 may extend from the rearward end of the reinforcement flange 206 toward the rear surface 204 of the face plate 203 but stop short of the rear surface 204). Accordingly, in the illustrated embodiment, the reinforcement flange, or at least the full height of the reinforcement flange 206, does not extend completely to the first and second abutment flanges 207, 208 (e.g., the reinforcement flange 206 may stop short of the first and second abutment flanges 207, 208). In one or more embodiments, the reinforcement flange 206 may be provided without the first notch proximate 214 to the first abutment flange 207 (e.g., the reinforcement flange 206 may extend completely to the first abutment flange 207, but not extend completely to the second abutment flange 208). The second notch 215 in the reinforcement flange 206 proximate to the second abutment flange 208 is configured to provide access for a tool (e.g., a spanner) to engage the head of the fastener for securing the first and second fitting halves 201, 202 together.

In the illustrated embodiment, each of the first and second base halves 201, 202 also includes at least one gusset 216 extending from the rear surface 204 of the semi-annular face plate 203 to the reinforcement flange 206.

In the illustrated embodiment, each of the first and second base halves 201, 202 also includes a semi-annular groove 217 in an outer surface 218 of the reinforcement flange 206, and first and second semi-annular grooves 219, 220 in the front surface 205 of the face plate 203. In the illustrated embodiment, the first and second semi-annular grooves 219, 220 in the front surface 205 of the face plate 203 are on opposite sides of the openings 209 in the face plate 203 (e.g., the first semi-annular groove 219 in the front surface 205 of the face plate 203 is proximate to an inner peripheral edge 221 of the face plate 203 and the second semi-annular groove 220 is proximate to an outer peripheral edge 222 of the face plate 203). In one or more embodiments, the first and second base halves 201, 202 may include any other suitable number of semi-annular grooves in the front surface 205 of the face plate 203, such as, for instance, a single semi-annular groove or three or more semi-annular grooves.

Additionally, in the illustrated embodiment, the semi-annular groove 217 in the outer surface 218 of the reinforcement flange 206 has a flat or substantially flat bottom surface 223, and the first and second semi-annular grooves 219, 220 in the front surface 205 of the face plate 203 have rounded (e.g., curved) bottom surfaces 224, 225, respectively. Accordingly, in the illustrated embodiment, the semi-annular groove 217 in the outer surface 218 of the reinforcement flange 206 is configured to accommodate a D-shaped gasket, and the first and second semi-annular grooves 219, 220 in the front surface 205 of the face plate 203 are configured to accommodate round gaskets. In one or more embodiments, the semi-annular grooves 217, 219, 220 may have any other suitable cross-sectional shapes. For instance, in one or more embodiments, all of the semi-annular grooves 217, 219, 220 may have the same or substantially the same configuration.

When the first and second gasket halves 301, 302 are coupled to the first and second base halves 201, 202, respectively, the first and second tabs 306, 307 are aligned or substantially aligned with the first and second abutment flanges 207, 208, respectively, the first and second semi-annular portions 303, 304 of the first and second gasket halves 301, 302 are accommodated in the first and second semi-annular grooves 219, 220, respectively, in the front surface 205 of the face plate 203 of the first and second base halves 201, 202, and the third semi-annular portion 305 is accommodated in the semi-annular groove 217 in the outer surface 218 of the reinforcement flange 206 of the first and second base halves 201, 202, respectively.

Figure 4A:
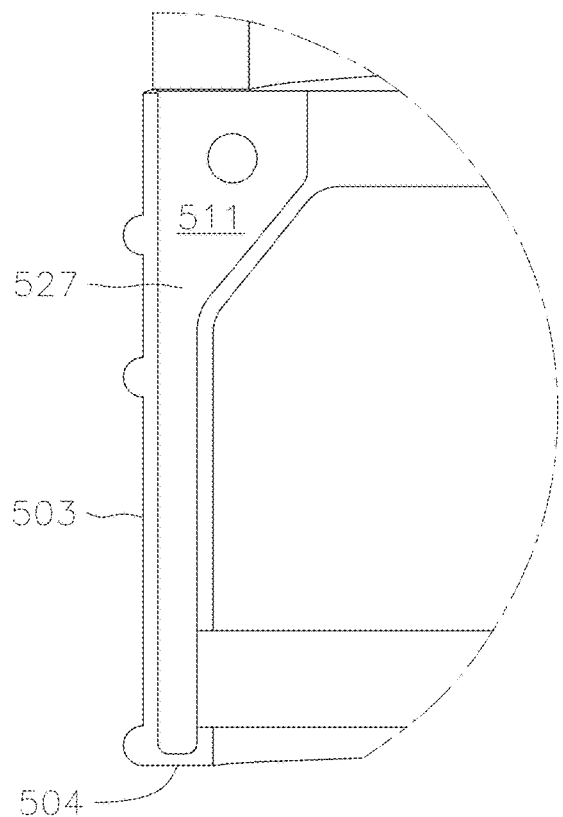
FIGS. 4A-4C are a perspective view, an end view, and a side view, respectively, of a cap half according to one embodiment of the present disclosure.
Figure 4B:
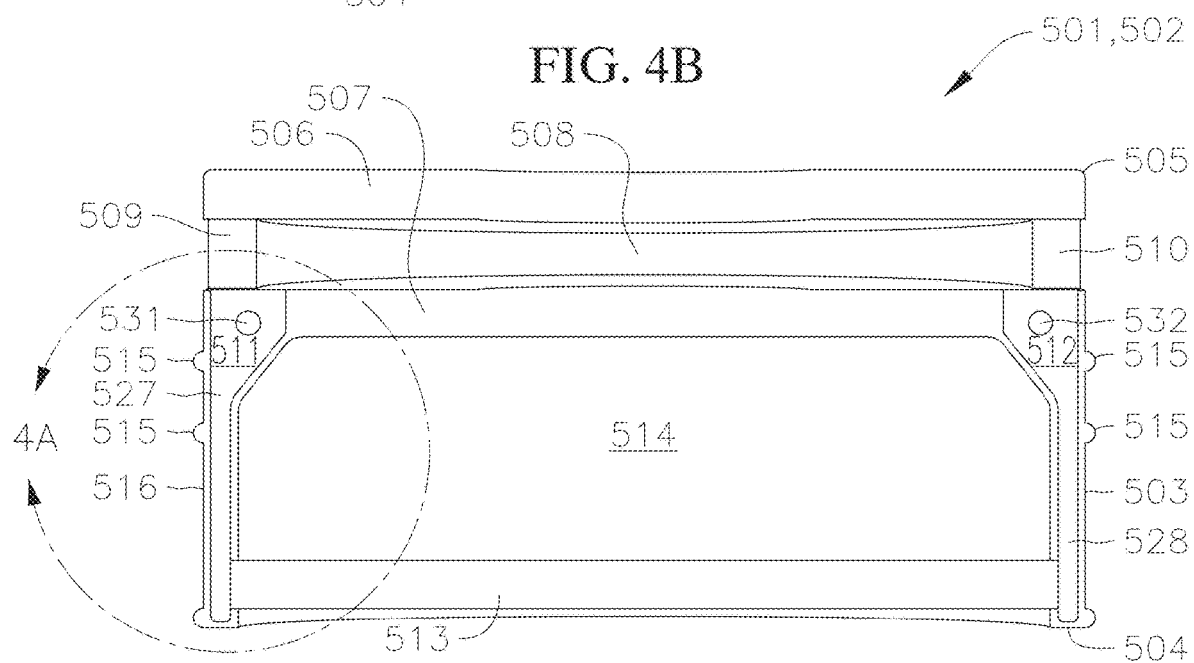
Figure 4C:
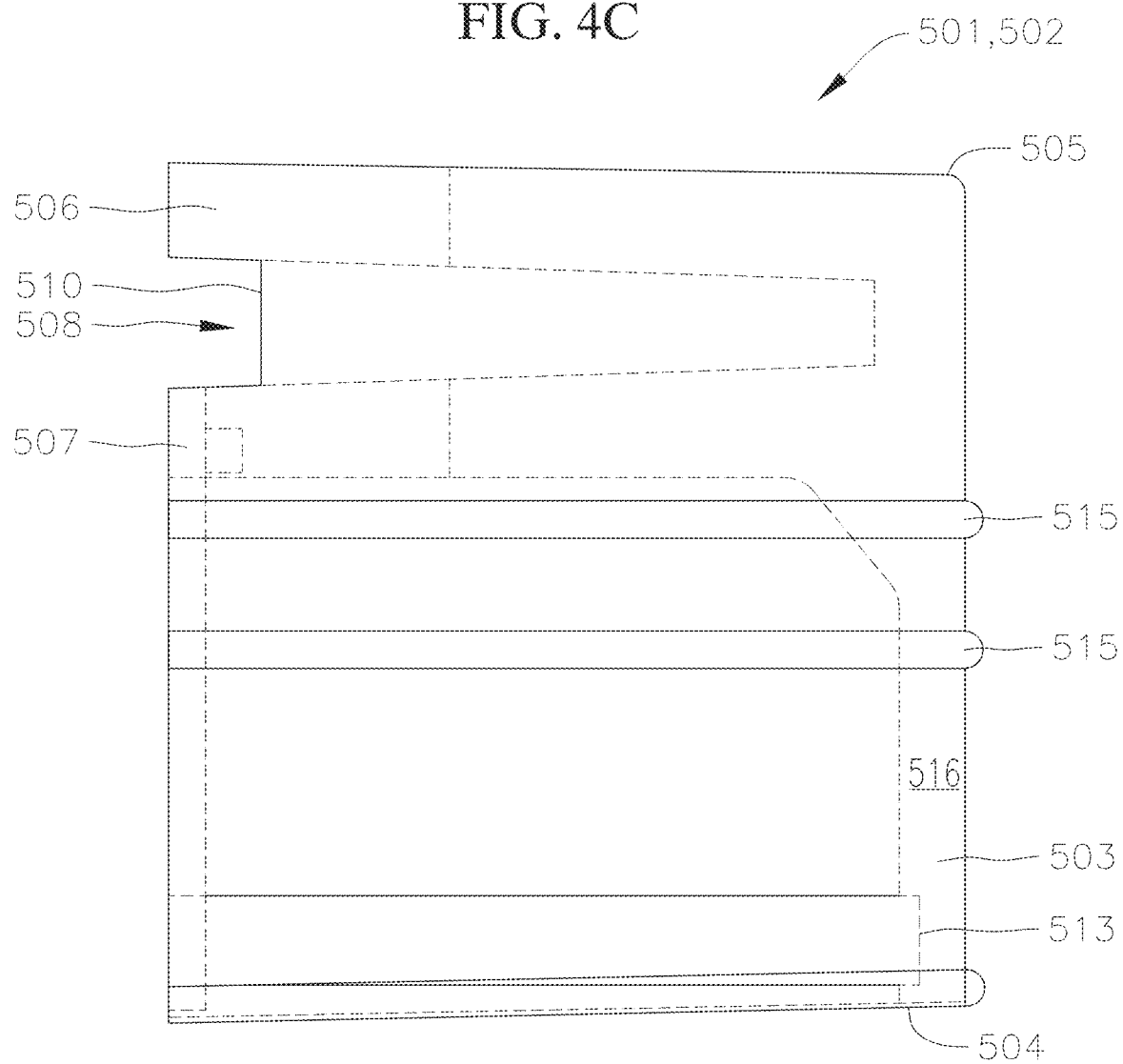

With reference now to the embodiment illustrated in FIGS. 4A-4C, each of the first and second cap halves 501, 502 includes a semi-cylindrical sidewall 503 having an front end 504 and a rear end 505, an outer cap plate 506 at the rear end 505 of the semi-cylindrical sidewall 503, and an inner cap plate 507 spaced forward of the outer cap plate 506. In the illustrated embodiment, the inner cap plate 507 and the outer cap plate 506 both have a semicircular shape or substantially a semicircular shape. Additionally, in the illustrated embodiment, the outer and inner cap plates 506, 507 are not provided with an opening (e.g., a hole) configured to accommodate the pipe or conduit passing through the wall of the containment sump. However, as described in more detail below, during installation of the penetration fitting assembly 100, a technician drills holes through the outer and inner cap plates 506, 507 to accommodate the pipe or conduit passing through the wall of the containment sump. In this manner, the penetration fitting assembly 100 is configured to accommodate a variety of different pipe offsets and angled (e.g., canted) pipes relative to the wall of the containment sump.

In the illustrated embodiment, a channel 508 is defined between the outer and inner cap plates 506, 507. In one or more embodiments, the channel 508 may taper in a direction toward the semi-cylindrical sidewall 503 (e.g., the channel 508 is wedge-shaped). Additionally, in the illustrated embodiment, the semi-cylindrical sidewall 503 of each of the first and second cap halves 501, 502 includes a pair of notches 509, 510 aligned with the channel 508 (e.g., a first mating surface 511 of the semi-cylindrical sidewall 503 includes a first notch 509 aligned with a first end of the channel 508, and a second mating surface 512 of the semi-cylindrical sidewall 503 includes a second notch 510 aligned with a second end of the channel 508 opposite the first end of the channel 508). That is, the notches 509, 510 in the semi-cylindrical sidewall 503 are located at opposite ends of the channel 508 in each of the cap halves 501, 502. Additionally, in the illustrated embodiment, the notches 509, 510 taper to the same or substantially the same extent as the channel 508. As described in more detail below, the channel 508 and the pair of notches 509, 510 in each of the first and second cap halves 501, 502 are configured to accommodate portions of the pipe gasket 400. Although in the illustrated embodiment the notches 509, 510 have a rectangular cross-sectional shape, in one or more embodiments the notches 509, 510 may have any other suitable shape depending on the configuration of the pipe gasket 400.

In the illustrated embodiment, each of the first and second cap halves 501, 502 includes a semi-annular groove 513 in an inner surface 514 of the semi-cylindrical sidewall 503. In the illustrate embodiment, the semi-annular groove 513 is proximate to the front end 504 of the semi-cylindrical sidewall 513. The semi-annular groove 513 in each of the first and second cap halves 501, 502 are configured to accommodate or receive a portion of the third semi-annular portions 305 of the first and second gasket halves 301, 302, respectively, when the cap halves 501, 502 are installed around the base halves 201, 202. In the manner, the third semi-annular portions 305 of the first and second gasket halves 301, 302 are configured to create a liquid-tight or substantially a liquid-tight seal between the semi-cylindrical sidewalls 513 of the cap halves 501, 502 and the reinforcement flanges 206 of the base halves 201, 202.

In the illustrated embodiments, each of the first and second cap halves 501, 502 includes at least one semi-annular ridge 515 (e.g., a pair of semi-annular ridges) on an outer surface 516 of the semi-cylindrical sidewall 513. Additionally, in the illustrated embodiment, the cap assembly 500 includes a pair of clamps 517, 518 (see FIG. 1A) configured to secured the cap halves 501, 502 together. In one or more embodiments, the clamps 517, 518 may be high torque band clamps or any other suitable type or kind of clamps. Additionally, in one or more embodiments, the clamps 517, 518 may be connected to the outer surfaces 516 of the semi-cylindrical sidewalls 513 of the cap halves 501, 502 on opposite sides of the semi-annular ridges 515. The semi-annular ridges 515 are configured to maintain the position of the clamps 517, 518 on the outer surfaces 516 of the semi-cylindrical sidewalls 513 and thereby prevent the clamps 517, 518 from inadvertently disengaging the cap halves 501, 502.

With reference now to the embodiment illustrated in FIGS. 5A-5C, the cap assembly 500 also includes a pair of cap gaskets 519, 520 coupled to each of the cap halves 501, 502. The pair of cap gaskets 519, 520 are configured to be connected to the first and second mating surfaces 511, 512, respectively, of each of the first and second cap halves 501, 502. As described in more detail below, when the first and second cap halves 501, 502 are brought together to compress the pipe gasket 400, the pair of cap gaskets 519, 520 connected to the first cap half 501 engage the pair of cap gaskets 519, 520, respectively, connected to the second cap half 502 to create a liquid-tight seal or substantially a liquid-tight seal along joints between the semi-cylindrical sidewalls 503 of the cap halves 501, 502.

In the illustrated embodiment, each of the cap gaskets 519, 520 is dogleg-shaped, including a wider and thinner upper portion 521, 522, respectively, and a narrower and thicker lower portion 523, 524, respectively, although in one or more embodiments the cap gaskets 519, 520 may have any other suitable shape. Additionally, in the illustrated embodiment, each of the cap gaskets 519, 520 includes a step 525, 526, respectively, between the respective wider and thinner upper portion 521, 522 above the step 525, 526 and the respective narrower and thicker lower portion 523, 524 below the step 525, 526.

In the embodiment illustrated in FIGS. 4A-4C, the mating surfaces 511, 512 of the cap halves 501, 502 includes depressions or recesses 527, 528, respectively, configured to accommodate the cap gaskets 519, 520, respectively. In the illustrated embodiment, the recesses 527, 528 in the mating surfaces 511, 512 of the cap halves 501, 502 have the same or generally the same profile shape as the cap gaskets 519, 520.

Additionally, in the illustrated embodiment, each of the cap gaskets 519, 520 includes a peg 529, 530 (e.g., a dowel), respectively, configured to be inserted into a corresponding pocket 531, 532 in the mating surfaces 511, 512 of the cap halves 501, 502 (see FIGS. 4A-4C). Although in the illustrated embodiment the pegs 529, 530 of the cap gaskets 519, 520 are cylindrical and the pockets 531, 532 in the mating surfaces 511, 512 of the cap halves 501, 502 are cylindrical, in one or more embodiments, the pegs 529, 530 and the pockets 531, 532 may have any other suitable shape or shapes. In one or more embodiments, the cap gaskets 519, 520 may be secured to the mating surfaces 511, 512 of the cap halves 501, 502 by adhesive.

In the illustrated embodiment, when the cap gaskets 519, 520 are received in the recesses in the mating surfaces 511, 512 of the cap halves 501, 502, the wider and thinner upper portions 521, 522 of the cap gaskets 519, 520 overlap the inner cap plates of the cap halves 501, 502. Additionally, in the illustrated embodiment, the wider and thinner upper portions 521, 522 of the cap gaskets 519, 520 are flush or substantially flush with the lower cap plates 507 of the cap halves 501, 502 and the narrower and thicker lower portions 523, 524 of the cap gaskets 519, 520 project outward beyond the mating surfaces 511, 512 of the cap halves 501, 502.

Figure 6A:
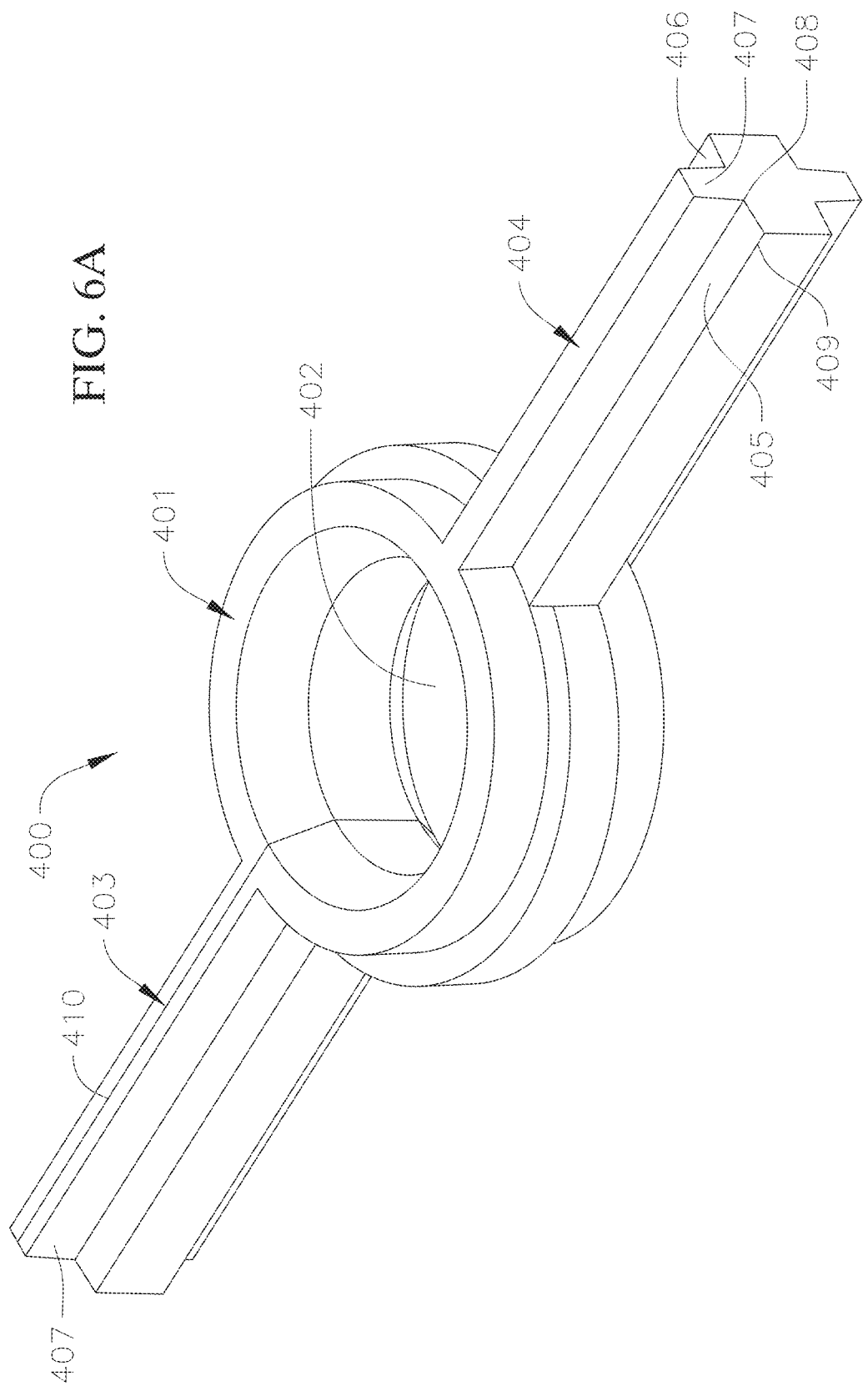
FIGS. 6A-6B are a perspective view and a top view, respectively, of a pipe gasket according to one embodiment of the present disclosure.
Figure 6B:
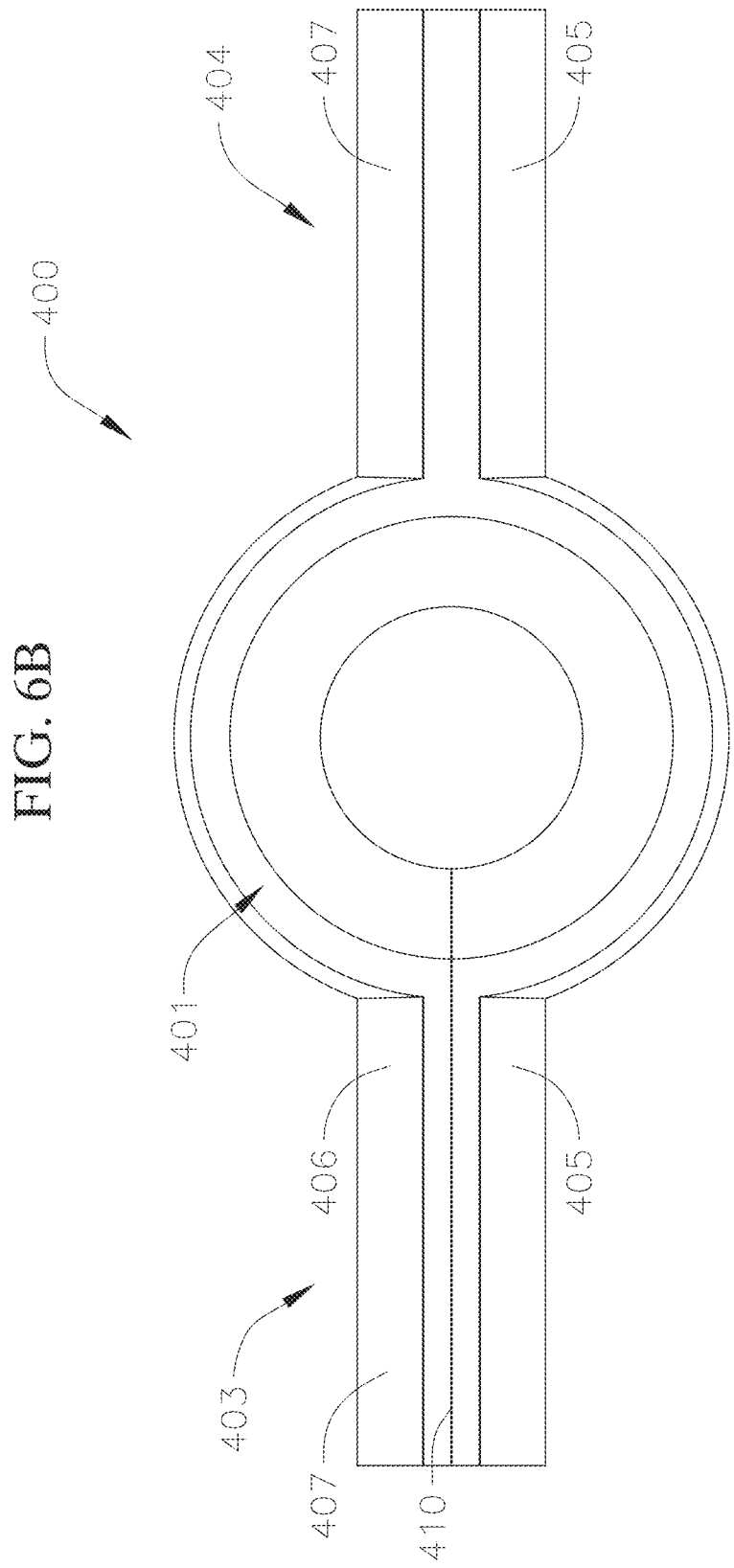

With reference now to the embodiment illustrated in FIGS. 6A-6B, the pipe gasket 400 includes an annular portion 401 defining a central opening 402 configured to accommodate the pipe or conduit passing through the wall of the containment sump, and a pair of stem portions 403, 404 extending in opposite directions from opposing portions (e.g., diametrically opposed portions) of the annular portion 401.

Additionally, in the illustrated embodiment, the pipe gasket 400 includes a first rib 405 extending along the length of one side of the first stem portion 403, around one half of the annular portion 401, and along the length of one side of the second stem portion 404. In the illustrated embodiment, the pipe gasket 400 also includes a second rib 406 extending along the length of the other side of the first stem portion 403, around the other half of the annular portion 401, and along the length of the other side of the second stem portion 404. In the illustrated embodiment, the first and second ribs 405, 406 are on opposite sides of the pipe gasket 400. Additionally, in the illustrated embodiment, each of the first and second stem portions 403, 404 include a central portion 407 between the first and second ribs 405, 406. In the illustrated embodiment, the stem portions 403, 404 each have a cruciform cross-sectional shape defined by the central portion 407 and the first and second ribs 405, 406.

In the illustrated embodiment, each of the first and second ribs 405, 406 tapers from a relatively wider, inner end 408 proximate to the central portion 407 and a relatively narrower, outer end 409 distal to the central portion 407. In one or more embodiments, the taper of the first and second ribs 405, 406 may match or substantially match the taper of the channels 508 in the cap halves 501, 502 (e.g., the first and second ribs 405, 406 of the pipe gasket 400 are keyed to the channels 508 in the first and second cap halves 501, 502). In one or more embodiments, the first and second ribs 405, 406 of the pipe gasket 400 taper at an angle in a range from approximately 2 degrees to approximately 6 degrees. In one or more embodiments, the first and second ribs 405, 406 of the pipe gasket 400 taper at an angle of approximately 4 degrees. As described in more detail below, the taper of the channels 508 in the cap halves 501, 502 and the corresponding taper of the ribs 405, 406 is configured to secure the first and second ribs 405, 406 of the pipe gasket 400 to the first and second cap halves 501, 502 with a friction fit.

Additionally, in the illustrated embodiment, the first and second ribs 405, 406 have a generally rectangular cross-sectional shape, although in one or more embodiments, the first and second ribs 405, 406 may have any other suitable cross-sectional shape depending on the configuration of the channels 508 in the first and second cap halves 501, 502, such as, for instance, a square cross-sectional shape or a rounded (e.g., semi-circular) cross-sectional shape.

In the illustrated embodiment, the pipe gasket 400 also includes a split 410 extending along the entire length of one of the stem portions 403 and through the annular portion 401. The split 410 enables a technician to wrap the annular portion 401 of the pipe fitting 400 around the pipe or conduit by spreading the stem portion 403 about the split 410, and then sliding the pipe gasket 400 onto the pipe or conduit such that the pipe or conduit passes through the split 410 and is received in the central opening 402 of the pipe gasket 400. In one or more embodiments, the split 410 may extend along the entire length of the pipe gasket 400 such that, for example, the pipe gasket 400 is two separate components (e.g., the split 410 may extend along long the entire length of one of the stem portions 403, through the annular portion 401, and along the entire length of the other stem portion 404 such that the pipe gasket 400 is a split two-piece gasket).

In the illustrated embodiment, the length of the pipe gasket 400 (e.g., the distance between ends of the stem portions 403, 404) is longer than a width (e.g., a diameter) of the first and second cap halves 501, 502 together. As described in more detail below, the longer length of the pipe gasket 400 enables a technician to slide the pipe gasket 400 along the channels 508 in the cap halves 501, 502 to locate the annular portion 401 based on the position of the pipe or conduit. For instance, if the pipe or conduit passes through the wall of the containment sump at an oblique angle (e.g., the pipe or conduit is not orthogonal to the wall of the containment sump), the longer length of the pipe gasket 400 enables a technician to locate the annular portion 401 and the central opening 402 of the pipe gasket 400 in a position that is not concentric with the cap halves 501, 502 (e.g., the longer length of the pipe gasket enables a technician to locate the annular portion 401 and the central opening 402 of the pipe gasket 400 radially off-center with respect to the outer and inner cap plates 506, 507 of the first and second cap halves 501, 502).

FIGS. 1A and 7A-7C depict a disposable spacer 600 configured to facilitate installation of the cap assembly 500. As described in more detail below, the disposable spacer 600 is configured to maintain the same spacing between the cap halves 501, 502 as the does the pipe gasket 400 while a technician drills an opening (e.g., a hole) in the outer and inner cap plates 506, 507 of the first and second cap halves 501, 502 to accommodate the pipe or conduit passing through the wall of the containment sump. The disposable spacer 600 does not remain with the cap assembly 500 once it is installed. Instead, once the opening is drilled in the outer and inner cap plates 506, 507 of the first and second cap halves 501, 502, the disposable spacer 600 may discarded and then the pipe gasket 400 may be installed between the cap halves 501, 502.

In the illustrated embodiment, the disposable spacer 600 is an axial member including a central portion 601, a first rib 602 extending along the length of one side of the central portion 601, and a second rib 603 extending along the length of the other side of the central portion 601. In the illustrated embodiment, the first and second ribs 602, 603 are on opposite sides of the central portion 601. In one or more embodiments, the disposable spacer 600 may have the same configuration or substantially the same configuration as the stem portions 403, 404 of the pipe gasket 400. In the illustrated embodiment, the disposable spacer 600 has a cruciform cross-sectional shape.

In the illustrated embodiment, each of the first and second ribs 602, 603 tapers from a relatively wider, inner end 604 proximate to the central portion 601 and a relatively narrower, outer end distal 605 to the central portion 601. In one or more embodiments, the taper of the first and second ribs 602, 603 may match or substantially match the taper of the channels 508 in the cap halves 501, 502 (e.g., the first and second ribs 602, 603 of the of the disposable spacer 600 are keyed to the channels 508 in the first and second cap halves 501, 502). In one or more embodiments, the first and second ribs 602, 603 of the disposable spacer 600 taper at an angle in a range from approximately 2 degrees to approximately 6 degrees. In one or more embodiments, the first and second ribs 602, 603 of the disposable spacer 600 taper at an angle of approximately 4 degrees. As described in more detail below, the taper of the channels 508 in the cap halves 501, 502 and the corresponding taper of the ribs 602, 603 of the disposable spacer 600 is configured to secure the first and second ribs 602, 603 of the disposable spacer 600 to the first and second cap halves 501, 502 with a friction fit.

Additionally, in the illustrated embodiment, the first and second ribs 602, 603 have a generally rectangular cross-sectional shape, although in one or more embodiments, the first and second ribs 602, 603 may have any other suitable cross-sectional shape depending on the configuration of the channels 508 in the first and second cap halves 501, 502, such as, for instance, a square cross-sectional shape or a rounded (e.g., semi-circular) cross-sectional shape.

Additionally, in the illustrated embodiment, an upper surface 606 of the central portion 601 of the disposable spacer 600 includes one or more indicia 607 (e.g., one or more visual indicia), such as, for instance, one or more markings. In the illustrated embodiment, the one or more indicia 607 includes a notch in the upper surface 606 of the central portion 601. The one or more indicia 607 indicate the range of permissible locations (i.e., the envelope) in which an opening (e.g., a hole) can be drilled through the outer and inner cap plates 506, 507 of the first and second cap halves 501, 502 to accommodate the pipe or conduit passing through the wall of the containment sump.

Figure 8A:
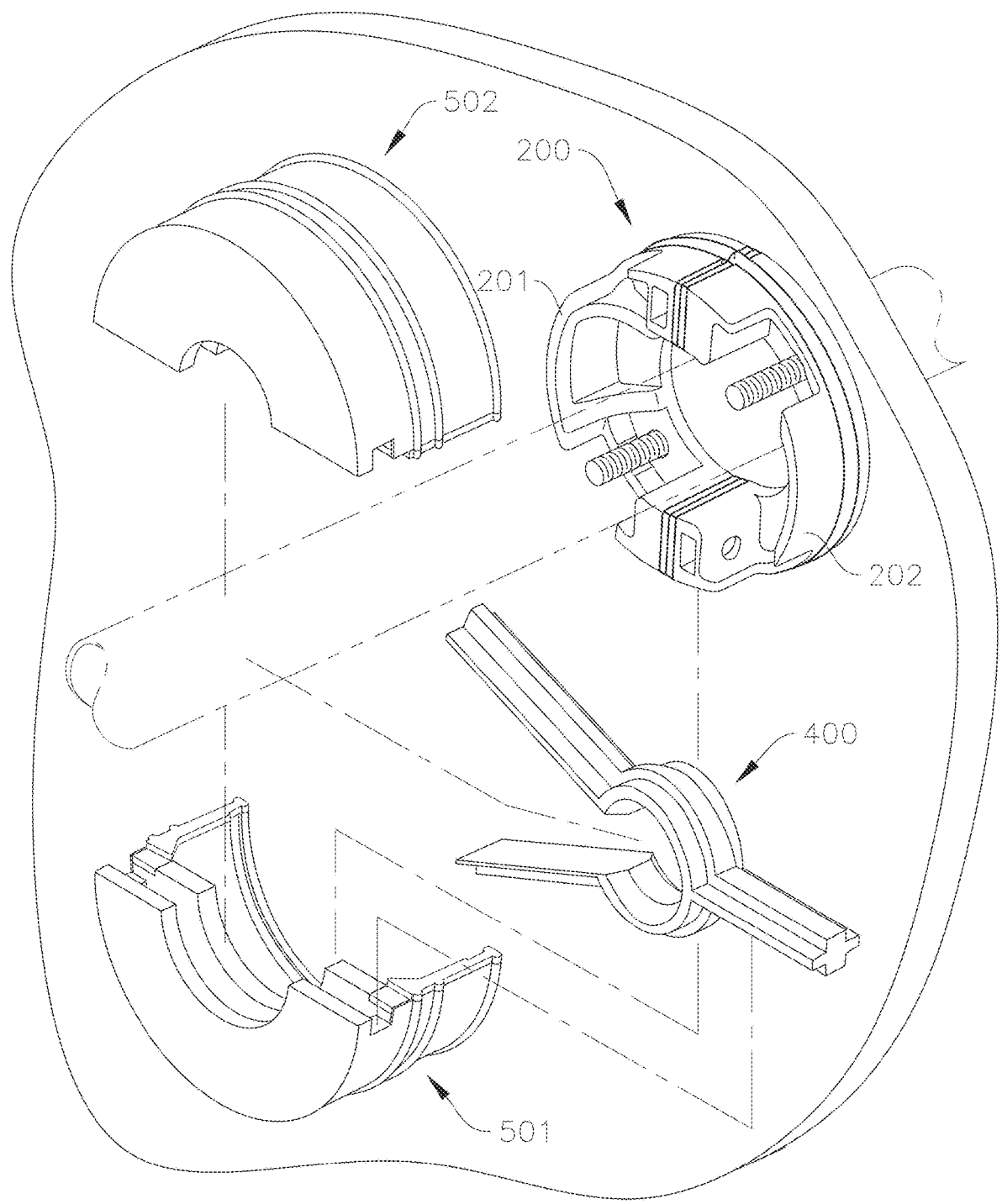
FIGS. 8A-8B are perspective views illustrating the embodiment of the penetration fitting assembly being installed around a pipe or conduit passing through a wall of a containment sump.
Figure 8B:
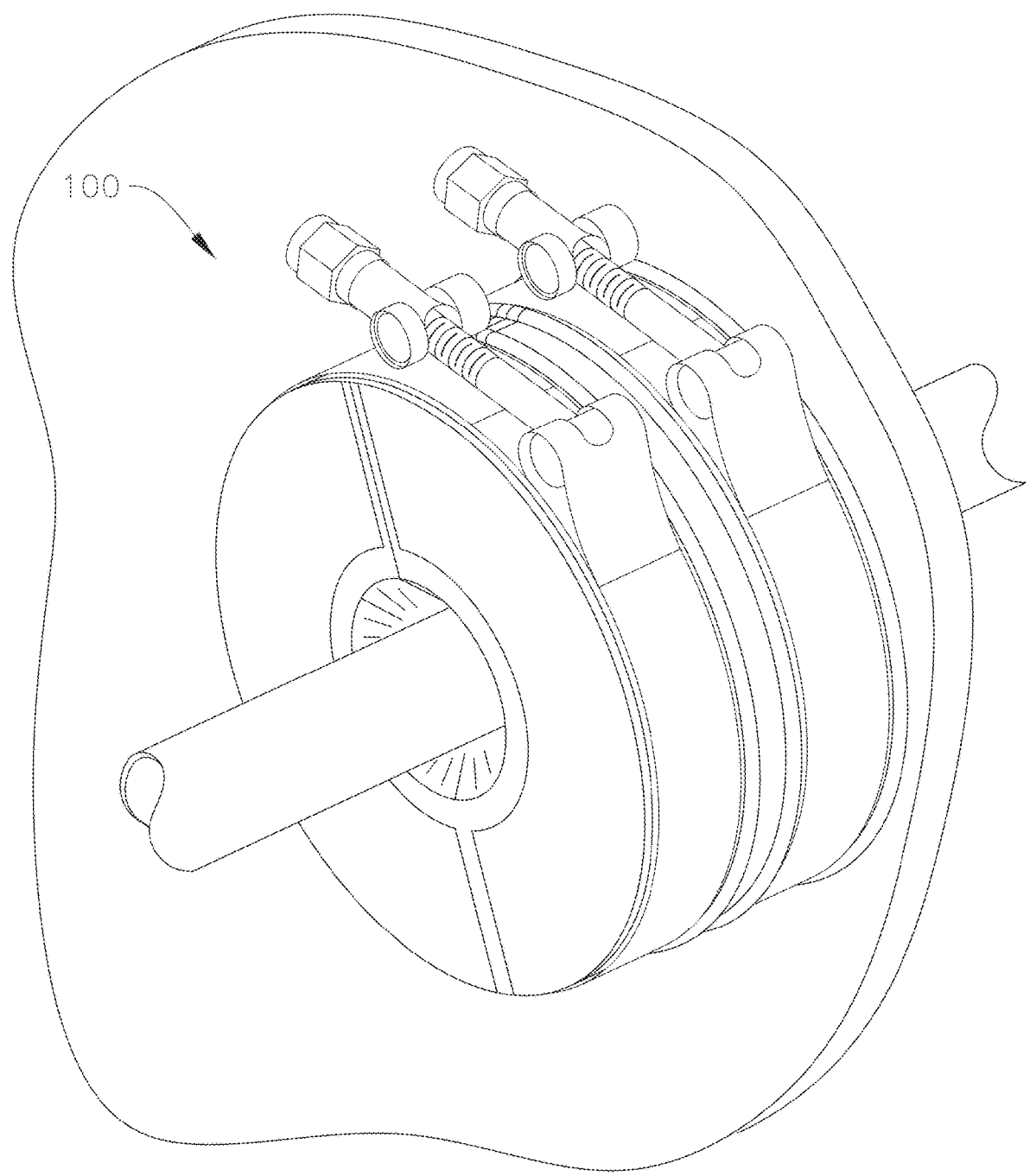

FIGS. 8A-8B depict tasks of installing the penetration fitting assembly 100 around a pipe or conduit passing through an opening in a wall of containment sump according to one embodiment of the present disclosure. To install the penetration fitting assembly 100, the existing boot sealing the pipe or conduit to the wall in the containment sump is first removed, which exposes the fasteners (e.g., studs) securing the existing boot to the wall of the sump.

The first and second gasket halves 301, 302 may then be attached to the first and second base halves 201, 202, respectively, such that the first and second semi-annular portions 303, 304 of the gasket halves 301, 302 are accommodated in the first and second semi-annular grooves 219, 220, respectively, in the front surface 205 of the face plate 203 of the first and second base halves 201, 202, the third semi-annular portions 305 of the first and second gasket halves 301, 302 are accommodated in the semi-annular groove 217 in the outer surface 218 of the reinforcement flange 206 of the first and second base halves 201, 202, and the first and second tabs 306, 307 of the gasket halves 301, 302 abut outer surfaces of the first and second abutment flanges 207, 208, respectively.

The first and second base halves 201, 202, together with the first and second gaskets halves 301, 302 coupled thereto, may then be brought together around the pipe or conduit and then coupled together. The first and second base halves 201, 202 may be coupled together by inserting nuts (e.g., square nuts) into the slots 212 in the first abutment flanges 207, inserting fasteners through the openings 308, 309 in the tabs 306, 307 of the gaskets halves 301, 302 and the openings 210, 211 in the abutment flanges 207, 208, and then tightening the fasteners. As described above, the notch 215 in the reinforcement flange 206 proximate to the second abutment flange 208 of each of the base halves 201, 202 provide clearance for a tool, such as a spanner or a hex key, to engage the heads of the fasteners.

Once the first and second base halves 201, 202 have been coupled together around the pipe or conduit, the base assembly 200 may then be slid along the pipe or conduit toward the wall of the containment sump until the fasteners (e.g., studs) extending through the wall of the containment sump extend through the openings 209 in the semi-annular face plates 203 of the base halves 201, 202 and the first and second semi-annular portions 303, 304 of the first and second gasket halves 301, 302 abut (e.g., contact) the inner surface of the wall of the sump. In one or more embodiments, the first and second base halves 201, 202, together with the first and second gaskets halves 301, 302 coupled thereto, may be coupled to the wall of the containment sump with separate fasteners (e.g., not the pre-existing studs utilized to secure the boot to the wall of the sump). When the first and second base halves 201, 202 of the base assembly 200 are coupled to the wall of the containment sump, the first and second base halves 201, 202 compress the first and second semi-annular portions 303, 304 of the first and second gasket halves 301, 302 against the wall of the containment sump to form a liquid-tight seal or a substantially liquid-tight seal between the face plates 203 of the base halves 201, 202 and the wall of the containment sump around the pipe or conduit and the opening in the wall of the containment sump through which the pipe or conduit passes.

Openings 532, 533 may then be cut (e.g., with a hole saw) in the outer and inner cap plates 506, 507, respectively, of the cap halves 501, 502 to accommodate the pipe or conduit. In one embodiment, the openings 532, 533 may be cut in the cap halves 501, 502 by first inserting the ribs 602, 603 of the disposable spacer 600 into the channels 508 of the cap halves 501, 502. Once the disposable spacer 600 has been inserted into the channels 508 of the cap halves 501, 502, the openings 532, 533 may be cut along the joint between the first and second cap halves 501, 502 and through the disposable spacer 600 at any position within or along the one or more indicia 607 on the upper surface 606 of the disposable spacer 600.

The pipe gasket 400 may then be installed around the pipe or conduit. In one or more embodiments, the pipe gasket 400 may be installed by spreading the stem portion 403 about the split 410, and then sliding the pipe gasket 400 onto the pipe or conduit such that the pipe or conduit passes through the split 410 and is received in the central opening 402 of the pipe gasket 400.

The cap halves 501, 502, with the openings 532, 533 cut in the outer and inner cap plates 506, 507, may then be brought together around the pipe gasket 400 and the pipe or conduit passing therethrough. The cap halves 501, 502 may then be coupled together with the pair of clamps 517, 518 (e.g. high-torque clamps) extending around outer surfaces 516 of the semi-cylindrical sidewalls 513 of the cap halves 501, 502. When the cap halves 501, 502 are coupled together by the clamps 517, 518, the ribs 405, 406 of the pipe gasket 400 are connected to the tapered channels 508 of the cap halves 501 with a friction fit, and the cap halves 501, 502 compress annular portion 401 of the pipe gasket 400 against the pipe or conduit to create a liquid-tight or substantially liquid-tight seal against the pipe or conduit. Additionally, when the cap halves 501, 502 are coupled together by the clamps 517, 518, the third semi-annular portions 305 of the gasket halves 301, 302 are accommodated in the semi-annular grooves 513 in the inner surfaces 514 of the semi-cylindrical sidewalls 503 of the cap halves 501, 502 and the third semi-annular portions 305 of the gasket halves 301, 302 are compressed between the semi-cylindrical sidewalls 503 of the cap halves 501, 502 and the reinforcement flanges 206 of the base halves 201, 202 to create a liquid-tight seal or a substantially liquid-tight seal between the semi-cylindrical sidewalls 503 of the cap halves 501, 502 and the reinforcement flanges 206 of the base halves 201, 202. Accordingly, in the illustrated embodiment, the penetration fitting assembly 100 forms liquid-tight or substantially liquid-tight seals against the wall of the containment sump and around the pipe or conduit without the use of adhesives (i.e., with only compression seals), although in one or more embodiments, one or more adhesives may be utilized to forms liquid-tight or substantially liquid-tight seals against the wall of the containment sump and/or around the pipe or conduit passing through an opening in the wall of the containment sump. For example, in one or more embodiments, sealant may be applied to each of the gaskets (e.g., the pipe gasket 400 and the first and second gasket halves 301, 302).

Additionally, when the cap halves 501, 502 are coupled together by the clamps 517, 518, the cap assembly 500 shields or covers at least a portion of the gasket assembly 300 and the pipe gasket 400 from hydrocarbons that may collect in the sump, which might otherwise degrade or prematurely wear the gasket assembly 300 and the pipe gasket 400. In this manner, the cap assembly 500 is configured to prolong the service life of the penetration fitting assembly 100 compared to related art penetration fittings in which the rubber gaskets are more completely exposed to hydrocarbons.

Figure 10:
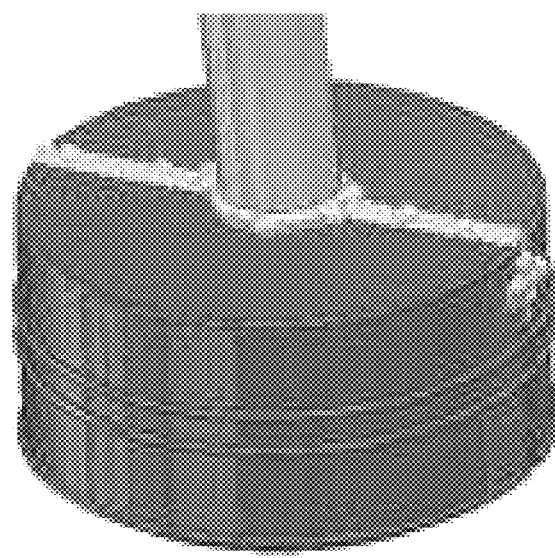
FIG. 10 is an assembled perspective view of a penetration fitting assembly according to a further embodiment of the present disclosure.

In one or more embodiments, the penetration fitting assembly 100 may be provided without the base assembly 200 and the gasket assembly 300. For instance, in one or more embodiments in which the penetration fitting assembly 100 is not secured to the wall of the containment sump with fasteners, the penetration fitting assembly 100 may be provided without the base assembly 200 and the gasket assembly 300. Additionally, in one or more embodiments, the penetration fitting assembly 100 may be provided without the pipe gasket 400. For instance, in one or more embodiments, one or both of the cap halves 501, 502 may include an injection port configured to permit a sealant to be injected between the first and second cap halves 501, 502 and around the pipe or conduit, as shown, for example, in FIG. 10.

Figure 11:
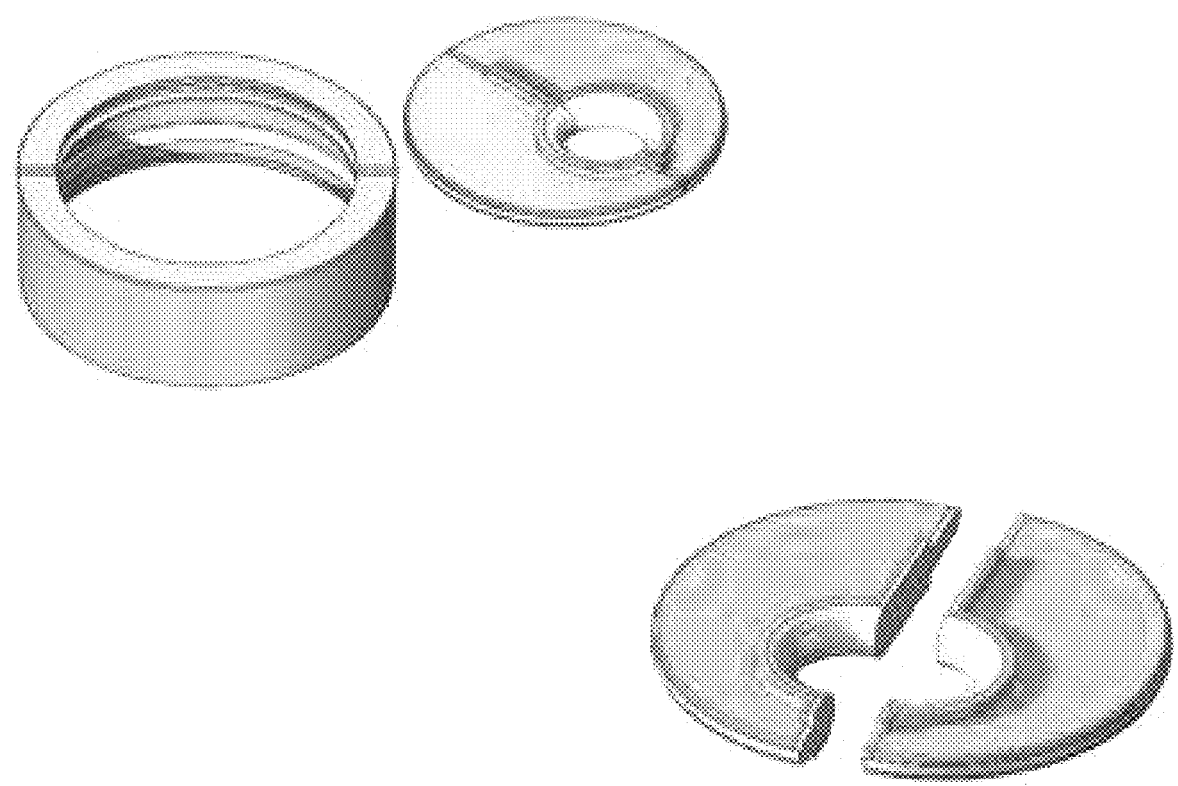
FIG. 11 is an exploded perspective view of a penetration fitting assembly including a two-piece split pipe gasket according to another embodiment of the present disclosure.

In one or more embodiments, the cap assembly 500 (i.e., first and second cap halves 501, 502) and the pipe gasket 400 may have any other suitable configurations. For instance, in one or more embodiments, the cap assembly 500 (i.e., first and second cap halves 501, 502) and the pipe gasket 400 may have the configurations shown in FIG. 11.

Figure 9:
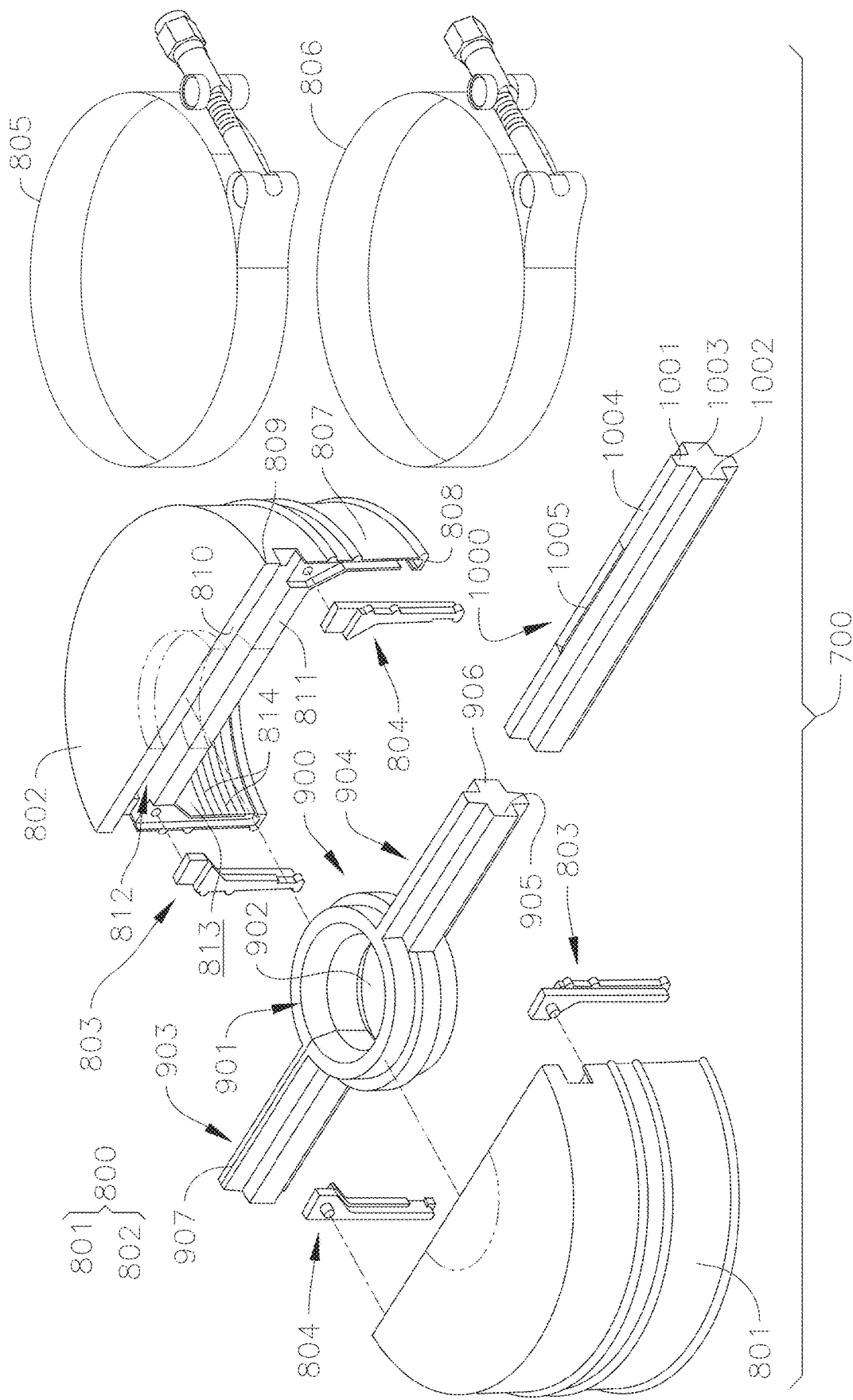
FIG. 9 is an exploded perspective view of a penetration fitting assembly according to another embodiment of the present disclosure.

With reference now to FIG. 9, a penetration fitting assembly 700 according to another embodiment of the present disclosure includes cap assembly 800, a pipe gasket 900, and a disposable spacer 1000. In the illustrated embodiment, the cap assembly 800 includes a first cap half 801, a second cap half 802, a pair of cap gaskets 803, 804 coupled to each of the cap halves 801, 802, and at least one clamp (e.g., a pair of high torque clamps 805, 806) configured to couple the first and second cap halves cap halves 801, 802 together. In one or more embodiments, the configurations of the cap gaskets 803, 804 are the same as or substantially the same as the configurations of the cap gaskets 519, 520, respectively, described above with reference to the embodiment illustrated in FIGS. 1A-8B.

In the illustrated embodiment, each of the cap halves 801, 802 includes a semi-cylindrical sidewall 807 having an front end 808 and a rear end 809, an outer semicircular cap plate 810 at the rear end 809 of the semi-cylindrical sidewall 807, an inner semicircular cap plate 811 spaced forward of the outer semicircular cap plate 810, and a channel 812 defined between the outer and inner semicircular cap plates 810, 811. In the illustrated embodiment, the configuration of the cap halves 801, 802 is the same as the configuration of the cap halves cap halves 501, 502 described above with reference to the embodiment illustrated in FIGS. 1A-8B, with the exception that an inner surface 813 of a semi-cylindrical sidewall 807 of each of the cap halves 801, 802 includes a series of semi-annular, partial threads 814. Together, the semi-annular, partial threads 814 of the cap halves 801, 802 define a series of threads. The threads of the first and second cap halves 801, 802 enable the cap assembly 800 to be threadedly connected to an existing threaded penetration fitting hub, for instance.

In the illustrated embodiment, the pipe gasket 900 includes an annular portion 901 defining a central opening 902 configured to accommodate the pipe or conduit passing through the wall of the containment sump, a pair of stem portions 903, 904 extending in opposite directions from opposing portions (e.g., diametrically opposed portions) of the annular portion 901, first and second ribs 905, 906 extending along opposite sides of the stem portions 903, 904 and the annular portion 901, and a split 907 extending along the entire length of one of the stem portions 903 and through the annular portion 901. In one or more embodiments, the configuration of the pipe gasket 900 is the same as or substantially the same as the configuration of the pipe gasket 400 described above with reference to the embodiment illustrated in FIGS. 1A-8B.

In the illustrated embodiment, the disposable spacer 1000 is an axial member including a central portion 1001, and first and second ribs 1002, 1003 extending along opposite sides of the central portion 1001. Additionally, in one or more embodiments, an upper surface 1004 of the central portion 1001 of the disposable spacer 1000 includes one or more indicia 1005 (e.g., one or more visual indicia), such as, for instance, one or more markings and/or a notch. In one or more embodiments, the configuration of the disposable spacer 1000 is the same as or substantially the same as the configuration of the disposable spacer 600 described above with reference to the embodiment illustrated in FIGS. 1A-8B.

To install the penetration fitting assembly 700, openings 815, 816 may then be cut (e.g., with a hole saw) in the outer and inner semicircular cap plates 810, 811, respectively, of the cap halves 801, 802 to accommodate the pipe or conduit. In one embodiment, the openings 815, 816 may be cut in the cap halves 801, 802 by first inserting the ribs 1002, 1003 of the disposable spacer 1000 into the channels 812 of the cap halves 801, 802. Once the ribs 1002, 1003 of the disposable spacer 1000 have been inserted into the channels 812 of the cap halves 801, 802, the openings 815, 816 may be cut along the joint between the first and second cap halves 801, 802 and through the disposable spacer 1000 at any position within or along the one or more indicia 1005 on the upper surface 1004 of the disposable spacer 1000.

The pipe gasket 900 may then be installed around the pipe or conduit. In one or more embodiments, the pipe gasket 900 may be installed by spreading the stem portion 903 about the split 907, and then sliding the pipe gasket 900 onto the pipe or conduit such that the pipe or conduit passes through the split 907 and is received in the central opening 902 of the pipe gasket 900.

The cap halves 801, 802, with the openings 815, 816 cut in the outer and inner cap plates 810, 811, may then be brought together around the pipe gasket 900 and the pipe or conduit passing therethrough. The cap halves 801, 802 may then be coupled together with the pair of high torque clamps 805, 806 extending around outer surfaces 817 of the semi-cylindrical sidewalls 807 of the cap halves 801, 802. When the cap halves 801, 802 are coupled together by the clamps 805, 806, the ribs 905, 906 of the pipe gasket 900 are connected to the channels 812 of the cap halves 801, 802 with a friction fit, and the cap halves 901, 902 compress annular portion 901 of the pipe gasket 900 against the pipe or conduit to create a liquid-tight or substantially liquid-tight seal against the pipe or conduit. Accordingly, in the illustrated embodiment, the penetration fitting assembly 700 forms a liquid-tight or substantially liquid-tight seal around the pipe or conduit without the use of adhesives (i.e., with only a compression seal), although in one or more embodiments, one or more adhesives may be utilized to form a liquid-tight or substantially liquid-tight seal around the pipe or conduit passing through an opening in the wall of the containment sump.

Additionally, when the cap halves 801, 802 are coupled together by the clamps 805, 806, the cap assembly 800 shields or covers at least a portion of the pipe gasket 900 from hydrocarbons that may collect in the sump, which might otherwise degrade or prematurely wear the pipe gasket 900. In this manner, the cap assembly 800 is configured to prolong the service life of the penetration fitting assembly 700 compared to related art penetration fittings in which the rubber gaskets are more completely exposed to hydrocarbons.

In one or more embodiments, the penetration fitting assembly 700 may be provided without the pipe gasket 900. For instance, in one or more embodiments, one or both of the cap halves 801, 802 may include an injection port configured to permit a sealant to be injected between the first and second cap halves 801, 802 and around the pipe or conduit, as shown, for example, in FIG. 10.

With reference now to FIGS. 12A-12C, a penetration fitting assembly 1100 according to another embodiment of the present disclosure includes a pipe gasket 1200 configured to surround a pipe or conduit passing through an opening in a wall of a containment sump, an inner ring assembly 1300 configured to compress the pipe gasket 1200 against the pipe or conduit to form a liquid-tight seal against the pipe or conduit, a wall gasket 1400, a ring gasket assembly 1500, an outer ring assembly 1600 to compress the wall gasket 1400 against the sump wall to form a liquid-tight seal between the outer ring assembly 1600 and the sump wall, and a clamp 1700 (e.g., a high torque band clamp or any other suitable type of clamp) configured to surround the outer ring assembly 1600 and to compress the ring gasket assembly 1500 between the inner and outer ring assemblies 1300, 1600 to form a liquid-tight seal between the inner ring assembly 1300 and the outer ring assembly 1600. In the illustrated embodiment, the inner ring assembly 1300 includes a first inner ring half 1301 and a second inner ring half 1302, the ring gasket assembly 1500 includes a first ring gasket half 1501 and a second ring gasket half 1502, and the outer ring assembly 1600 includes a first outer ring half 1601 and a second outer ring half 1602. The first outer ring half 1601 is configured to engage the first ring gasket half 1501, and the first ring gasket half 1501 is configured to engage the first inner ring half 1301 and/or the second inner ring half 1302. The second outer ring half 1602 is configured to engage the second ring gasket half 1502, and the second ring gasket half 1502 is configured to engage the first inner ring half 1301 and/or the second inner ring half 1302.

As illustrated in FIG. 13, the pipe gasket 1200 includes an annular portion 1201 defining a central opening 1202 configured to accommodate the pipe or conduit passing through the wall of the containment sump, and a pair of stem portions 1203, 1204 extending in opposite directions from opposing portions (e.g., diametrically opposed portions) of the annular portion 1201.

Additionally, in the illustrated embodiment, the pipe gasket 1200 includes a first rib 1205 extending along the length of one side of the first stem portion 1203, around one half of the annular portion 1201, and along the length of one side of the second stem portion 1204. In the illustrated embodiment, the pipe gasket 1200 also includes a second rib 1206 extending along the length of the other side of the first stem portion 1203, around the other half of the annular portion 1201, and along the length of the other side of the second stem portion 1204. In the illustrated embodiment, the first and second ribs 1205, 1206 are on opposite sides of the pipe gasket 1200. Additionally, in the illustrated embodiment, each of the first and second stem portions 1203, 1204 include a central portion 1207 between the first and second ribs 1205, 1206. In the illustrated embodiment, the stem portions 1203, 1204 each have a cruciform cross-sectional shape defined by the central portion 1207 and the first and second ribs 1205, 1206.

In the illustrated embodiment, each of the first and second ribs 1205, 1206 tapers from a relatively wider, inner end 1208 proximate to the central portion 1207 and a relatively narrower, outer end 1209 distal to the central portion 1207. In one or more embodiments, the first and second ribs 1205, 1206 of the pipe gasket 1200 taper at an angle in a range from approximately 2 degrees to approximately 6 degrees. In one or more embodiments, the first and second ribs 1205, 1206 of the pipe gasket 1200 taper at an angle of approximately 4 degrees.

In the illustrated embodiment, the pipe gasket 1200 also includes a split 1210 extending along the entire length of one of the stem portions 1203 and through the annular portion 1201. The split 1210 enables a technician to wrap the annular portion 1201 of the pipe fitting 1200 around the pipe or conduit by spreading the stem portion 1203 about the split 1210, and then sliding the pipe gasket 1200 onto the pipe or conduit such that the pipe or conduit passes through the split 1210 and is received in the central opening 1202 of the pipe gasket 1200. In one or more embodiments, the split 1210 may extend along the entire length of the pipe gasket 1200 such that, for example, the pipe gasket 1200 is two separate components (e.g., the split 1210 may extend along long the entire length of one of the stem portions 1203, through the annular portion 1201, and along the entire length of the other stem portion 1204 such that the pipe gasket 1200 is a split two-piece gasket).

As illustrated in FIGS. 14A-14C, each of the first and second inner ring halves 1301, 1302 includes a semi-cylindrical sidewall 1303 having a front end 1304 and a rear end 1305, a rear cap plate 1306 at the rear end 1305 of the semi-cylindrical sidewall 1303, and a front cap plate 1307 spaced forward of the rear cap plate 1306. In the illustrated embodiment, the front cap plate 1307 and the rear cap plate 1306 both have a semicircular shape or substantially a semicircular shape. Additionally, in the illustrated embodiment, the rear and front cap plates 1306, 1307 are not provided with an opening (e.g., a hole) configured to accommodate the pipe gasket 1200 and the pipe or conduit passing through the wall of the containment sump. However, as described in more detail below, during installation of the penetration fitting assembly 1100, a technician drills holes through the rear and front cap plates 1306, 1307 to accommodate the pipe gasket 1200 and the pipe or conduit passing through the wall of the containment sump. In this manner, the penetration fitting assembly 1100 is configured to accommodate a variety of different pipe offsets and angled (e.g., canted) pipes relative to the wall of the containment sump.

In the illustrated embodiment, a channel 1308 is defined between the front and rear cap plates 1306, 1307. The channels 1308 in the outer and inner cap plates 1306, 1307 are configured to accommodate the first and second ribs 1205, 1206 of the pipe gasket 1200. In one or more embodiments, the channel 1308 may taper in a direction toward the semi-cylindrical sidewall 1303 (e.g., the channel 1308 is wedge-shaped). In one or more embodiments, the taper of the channels 1308 in the first and second inner ring halves 1301, 1302 may match or substantially match the taper of the first and second ribs 1205, 1206 of the pipe gasket 1200 (e.g., the first and second ribs 1205, 1206 of the pipe gasket 1200 are keyed to the channels 1308 in the first and second inner ring halves 1301, 1302). For instance, in one or more embodiments, the channels 1308 may taper at an angle in a range from approximately 2 degrees to approximately 6 degrees (e.g., approximately 4 degrees). As described in more detail below, the taper of the channels 1308 in the first and second inner ring halves 1301, 1302 and the corresponding taper of the ribs 1205, 1206 of the pipe gasket 1200 is configured to secure the first and second ribs 1205, 1206 of the pipe gasket 1200 to the first and second inner ring halves 1301, 1302 with a friction fit. Additionally, in the illustrated embodiment, the first and second ribs 1205, 1206 of the pipe gasket 1200 have a generally rectangular cross-sectional shape, although in one or more embodiments, the first and second ribs 1205, 1206 may have any other suitable cross-sectional shape depending on the configuration of the channels 1308 in the first and second inner ring halves 1301, 1302, such as, for instance, a square cross-sectional shape or a rounded (e.g., semi-circular) cross-sectional shape.

In the illustrated embodiment, the length of the pipe gasket 1200 (e.g., the distance between ends of the stem portions 1203, 1204) is longer than a width (e.g., a diameter) of the first and second inner ring halves 1301, 1302 together. As described in more detail below, the longer length of the pipe gasket 1200 enables a technician to slide the pipe gasket 1200 along the channels 1308 in the first and second inner ring halves 1301, 1302 to locate the annular portion 1201 based on the position of the pipe or conduit. For instance, if the pipe or conduit passes through the wall of the containment sump at an oblique angle (e.g., the pipe or conduit is not orthogonal to the wall of the containment sump), the longer length of the pipe gasket 1200 enables a technician to locate the annular portion 1201 and the central opening 1202 of the pipe gasket 1200 in a position that is not concentric with the first and second inner ring halves 1301, 1302 (e.g., the longer length of the pipe gasket enables a technician to locate the annular portion 1201 and the central opening 1202 of the pipe gasket 1200 radially off-center with respect to the outer and inner cap plates 1306, 1307 of the first and second inner ring halves 1301, 1302).

Additionally, in the illustrated embodiment, opposite ends 1309, 1310 of the semi-cylindrical sidewall 1303 of each of the first and second inner ring halves 1301, 1302 include notches 1311, 1312, respectively, aligned with the channel 1308 and proximate to first and second mating surfaces 1313, 1314, respectively, of the first and second inner ring halves 1301, 1302. Additionally, in the illustrated embodiment, the notches 1311, 1312 taper to the same or substantially the same extent as the channel 1308 (e.g., the notches 1311, 1312 may taper at an angle in a range from approximately 2 degrees to approximately 6 degrees, such as approximately 4 degrees). The pair of notches 1311, 1312 in each of the first and second inner ring halves 1301, 1302 are configured to accommodate the first and second ribs 1205, 1206 of the pipe gasket 1200. The configuration (e.g., the shape and size) of the notches 1311, 1312 may match or substantially match the configuration (e.g., the shape and size) of the first and second ribs 1205, 1206 of the pipe gasket 1200. Although in the illustrated embodiment the notches 1311, 1312 have a rectangular cross-sectional shape, in one or more embodiments the notches 1311, 1312 may have any other suitable shape depending on the configuration of the first and second ribs 1205, 1206 of the pipe gasket 1200.

In the illustrated embodiment, each of the first and second inner ring halves 1301, 1302 also includes a semi-annular groove 1314 in an outer surface 1315 of the semi-cylindrical sidewall 1303. As described in more detail below, the semi-annular groove 1314 in each of the first and second inner ring halves 1301, 1302 are configured to accommodate or receive a portion of the first and second ring gasket halves 1501, 1502, respectively, to create a fluid-tight seal between the inner ring assembly 1300 and the outer ring assembly 1600.

Additionally, in the illustrated embodiment, a front surface 1316 of the front cap plate 1307 of each of the first and second inner ring halves 1301, 1302 includes a semi-annular recess 1317 proximate to an outer sidewall surface 1318 of the front cap plate 1307. As described in more detail below, the semi-annular recesses 1317 in the first and second inner ring halves 1301, 1302 are configured to accommodate a portion of the wall gasket 1400.

As illustrated in FIGS. 15A-15C, each of the first and second ring gasket halves 1501, 1502 includes a semi-annular portion 1503, a first flange 1504 extending radially outward from a first end 1505 of the semi-annular portion 1503, and a second flange 1506 extending radially outward from a second end 1507 of the semi-annular portion 1503. Additionally, in the illustrated embodiment, an inner surface 1508 of the semi-annular portion 1503 includes a semi-annular projection 1509 extending radially inward, and an outer surface 1510 of the semi-annular portion opposite the inner surface 1508 includes a corresponding semi-annular recess 1511 (e.g., a semi-annular groove) extending radially inward. Additionally, in the illustrated embodiment, an outer surface 1512, 1513 of each of the first and second flanges 1504, 1506 includes an outwardly extending projection 1514, 1515 (e.g., a rib), respectively, aligned with the recess 1511 in the outer surface 1510 of the semi-annular portion 1503. The semi-annular projections 1509 of the first and second ring gasket halves 1501, 1502 are configured to extend into the semi-annular grooves 1314 of the first and second inner ring halves 1301, 1302.

In the illustrated embodiment, the configuration of first ring gasket half 1501 is identical to the configuration of the second ring gasket half 1502, which is configured to reduce manufacturing costs and simplify installation because the technician does not need to distinguish between the two ring gasket halves 1501, 1502. However, in one or more embodiments, the first ring gasket half 1501 may have a different configuration than the second ring gasket half 1502. The first and second ring gasket halves 1501, 1502 may be formed of any material suitable configured to form a compression seal between the inner ring assembly and the outer ring assembly, such as, for example, rubber.

As illustrated in FIGS. 16A-16D, each of the first and second outer ring halves 1601, 1602 includes a semi-annular portion 1603 including a front surface 1604 configured to face toward the wall of the sump, a rear surface 1605 opposite the front surface 1604, an inner sidewall surface 1606 facing radially inward, an outer sidewall surface 1607 opposite the inner sidewall surface 1606 facing radially outward, and mating surfaces 1608, 1609 at ends of the semi-annular portion 1603. Additionally, in the illustrated embodiment, each of the first and second outer ring halves 1601, 1602 includes a semi-annular projection 1610 (e.g., a semi-annular rib) extending radially inward from the inner sidewall surface 1606. The semi-annular projections 1610 (e.g., the semi-annular ribs) of the first and second outer ring halves 1601, 1602 are configured to extend into the semi-annular recesses 1511 (e.g., the semi-annular grooves) in the outer surfaces 1510 of the first and second ring gasket halves 1501, 1502. The configuration (e.g., the size and shape) of the semi-annular projections 1610 of the first and second outer ring halves 1601, 1602 may the same as or substantially the same as the configuration (e.g., the size and shape) of the semi-annular recesses 1511 of the first and second ring gasket halves 1501, 1502.

In the illustrated embodiment, each of the first and second outer ring halves 1601, 1602 also includes a series of counterbores 1611 extending from the front surface 1604 to the rear surface 1605. The counterbores 1611 are configured to receive fasteners securing the first and second outer ring halves 1601, 1602 to the sump wall and compressing the wall gasket 1400 against the sump wall. Additionally, in the illustrated embodiment, each of the counterbores 1611 includes a first relatively wider portion 1612 extending from the rear surface 1605 toward the front surface 1604, a second relatively wider portion 1613 extending from the front surface 1604 toward the rear surface 1605, a relatively narrower intermediate portion 1614 between the first and second relatively wider portions 1612, 1613, and a taper 1615 connecting the second relatively wider portion 1613 to the relatively narrower intermediate portion 1614.

In the illustrated embodiment, the first and second mating surfaces 1608, 1609 of each of the first and second outer ring halves 1601, 1602 includes notches 1616, 1617, respectively. The notches 1616, 1617 are configured to accommodate the projections 1514, 1515 on the outer surfaces 1512, 1513 of the first and second flanges 1504, 1506 of the first and second ring gasket halves 1501, 1502. The configuration (e.g., the size and shape) of the notches 1616, 1617 may be the same as or substantially the same as the configuration (e.g., the size and shape) of the projections 1514, 1515.

Additionally, in the illustrated embodiment, each of the first and second outer ring halves 1601, 1602 includes a semi-annular ridge 1618 at an interface between the front surface 1604 and the outer sidewall surface 1607. The semi-annular ridge 1618 extends forward (i.e., toward the sump wall) away from the front surface 1604. In the illustrated embodiment, each of the first and second outer rings halves 1601, 1602 includes a semi-annular recess 1619 proximate to the semi-annular ridge 1617. The semi-annular recess 1619 is spaced inward toward the inner sidewall surface 1606 relative to the semi-annular ridge 1618 (e.g., the semi-annular recess 1619 is between the semi-annular ridge 1618 and the interface between the front surface 1604 and the inner sidewall surface 1606).

In the illustrated embodiment, each of the first and second outer ring halves 1601, 1602 also includes a semi-annular recess 1620 in the outer sidewall surface 1607. In the illustrated embodiment, the semi-annular recess 1620 does not extend all the way to the front surface 1604 or the rear surface 1605 such that front and rear lips 1621, 1622, respectively, are formed on the outer sidewall surface 1607. The semi-annular recesses 1620 in the first and second outer ring halves 1601, 1602 are configured to accommodate the clamp 1700, and the front and rear lips 1621, 1622 are configured to retain the clamp 1700 on the first and second outer ring halves 1601, 1602. That is, the clamp 1700 is configured to secure the first and second outer ring halves 1601, 1602 together, and the front and rear lips 1621, 1622 are configured to maintain the position of the clamp 1700 on the outer sidewall surfaces 1607 and thereby prevent the clamp 1700 from inadvertently disengaging the first and second outer ring halves 1601, 1602.

As illustrated in FIGS. 17A-17D, the wall gasket 1400 is a split ring having a front surface 1401, a rear surface 1402 opposite the front surface 1401, an inner sidewall surface 1403, and an outer sidewall surface 1404. When the penetration fitting 1100 is installed, the front surface 1401 faces toward the sump wall, and the rear surface 1402 faces away from the sump wall. The wall gasket 1400 defines a central opening 1405 and includes a slit or split 1406 that opens up into the central opening 1405 that enables the wall gasket 1400 to be installed around a pipe or gasket. That is, the wall gasket 1400 can be spread open about the split 1406 such that the pipe or conduit can pass through the split 1406 and into the central opening 1405, and then the wall gasket 1400 can be closed around the pipe or conduit. In the illustrated embodiment, the wall gasket 1400 includes split interlocking features that are configured to secure the wall gasket 1400 in the closed configuration. In the illustrated embodiment, the wall gasket 1400 includes a first tab 1407 at one end of the wall gasket 1400 proximate to the split 1406, and a second tab 1408 at the other end of the wall gasket 1400 proximate to the split 1406. The first and second tabs 1407, 1408 are configured to overlap each other (e.g., the first and second tabs 1407, 1408 form a lap joint). Additionally, in the illustrated embodiment, the first tab 1407 includes a male locking feature 1409, and the second tab 1408 includes a female locking feature 1410 configured to receive or accommodate the male locking feature 1409. In one or more embodiments, the wall gasket 1400 may not be provided with the split 1406 and a technician may cut or otherwise form the split 1406 during installation of the penetration fitting assembly 1100.

In the illustrated embodiment, the wall gasket 1400 also includes a series of circumferentially arranged openings 1411 (e.g., holes) configured to receive fasteners securing the wall gasket 1400 to the sump wall. Additionally, in the illustrated embodiment, the wall gasket 1400 includes an outer annular lip 1412 (e.g., an O-ring) at an interface between the rear surface 1402 and the outer sidewall surface 1404, and an inner annular lip 1413 (e.g., an O-ring) at an interface between the rear surface 1402 and the inner sidewall surface 1403. The inner and outer annular lips 1413, 1412 extend rearward away from the rear surface 1402. When the penetration fitting assembly 1100 is installed, the semi-annular recesses 1317 of the first and second inner ring halves 1301, 1302 are configured to accept or accommodate the inner annular lip 1413 of the wall gasket 1400, and the semi-annular recesses 1619 of the first and second outer ring halves 1601, 1602 are configured to accept or accommodate the outer annular lip 1412 of the wall gasket 1400. The engagement between the semi-annular recesses 1317 of the first and second inner ring halves 1301, 1302 and the inner annular lip 1413 of the wall gasket 1400 is configured to register (i.e., locate) the inner ring assembly 1300 to the wall gasket 1400, and the engagement between the semi-annular recesses 1619 of the first and second outer ring halves 1601, 1602 and the outer annular lip 1412 of the wall gasket 1400 is configured to register (i.e., locate) the outer ring assembly 1600 to the wall gasket 1400.

In the illustrated embodiment, the wall gasket 1400 also includes a series of screw seals 1414 in the openings 1411. In the illustrated embodiment, each screw seal 1414 includes a stem portion 1415 extending through the opening 1411, a tail portion 1416 connected to the stem portion 1415 and overlapping the front surface 1401, and a head portion 1417 connected to the stem portion 1415 and overlapping the rear surface 1402. Each of the screw seals 1414 also defines an opening 1418 configured to accommodate a fastener securing the outer ring assembly 1600 and the wall gasket 1400 to the wall of the sump. In the illustrated embodiment, the head portion 1417 of each of the screw seals 1414 tapers in a direction away from the rear surface 1402. The tapered head portions 1417 of the screw seals 1414 are configured to extend into the relatively wider portion 1613 and the taper 1615 of each of the counterbores 1611 in the first and second outer ring halves 1601, 1602 when the penetration fitting assembly 1100 is installed (i.e., the relatively wider portion 1613 and the taper 1615 of each of the counterbores 1611 in the first and second outer ring halves 1601, 1602 are configured to accommodate the tapered head portions 1417 of the screw seals 1414 of the wall gasket 1400). The wall gasket 1400 may be formed of any material suitable configured to form a compression seal between the outer ring assembly 1600 and the sump wall, such as, for example, rubber.

In one or more embodiments in which the sump wall is curved (e.g., rounded), the penetration fitting assembly 1100 may include an adapter gasket 1800 (shown in FIGS. 18A-18D) configured to be positioned between the sump wall and the wall gasket 1400. In the illustrated embodiment, the adapter gasket 1800 is a ring or annular member including a curved (e.g., rounded) front surface 1801, a flat or substantially flat (e.g., planar or substantially planar) rear surface 1802 opposite the curved front surface 1801, an inner sidewall surface 1803, and an outer sidewall surface 1804. In one or more embodiments, the contour or profile of the curved front surface 1801 may match or substantially match the contour or profile of the sump wall. When the penetration fitting 1100 is installed, the curved front surface 1801 faces toward the sump wall, and the rear surface 1802 faces away from the sump wall. Furthermore, in the illustrated embodiment, the adapter gasket 1800 includes a series of circumferentially arranged openings (e.g., holes) 1805 extending from the curved front surface 1801 to the rear surface 1802. The openings 1805 are configured to accommodate fasteners for securing the adapter gasket 1800 to the sump wall. Additionally, in the illustrated embodiment, the number of openings 1805 exceeds the number of fasteners utilized to secure the adapter gasket 1800 to the sump wall, and the openings 1805 are therefore also configured to increase the flexibility of the adapter gasket 1800 and to thereby aid in conforming the curved front surface 1801 to the contour of the sump wall.

In the illustrated embodiment, the adapter gasket 1800 also includes an outer annular recess or groove 1806 proximate to an interface between the rear surface 1802 and the outer sidewall surface 1804, and an inner annular recess or groove 1807 proximate to an interface between the rear surface 1802 and the inner sidewall surface 1803. The outer and inner annular grooves 1806, 1807 are configured to accommodate seals (e.g., O-rings) to form a fluid-tight seal between the adapter gasket 1800 and the wall gasket 1400.

The adapter gasket 1800 also defines a central opening 1808 configured to accommodate an angled pipe or conduit. Additionally, in the illustrated embodiment, the adapter gasket 1800 includes a slit or split 1809 that opens up into the central opening 1808 that enables the adapter gasket 1800 to be installed around a pipe or gasket. That is, the adapter gasket 1800 can be spread open about the split 1809 such that the pipe or conduit can pass through the split 1809 and into the central opening 1808, and then the adapter gasket 1800 can be closed around the pipe or conduit. In the illustrated embodiment, the adapter gasket 1800 also includes split interlocking features that are configured to secure the wall gasket 1800 in the closed configuration. In the illustrated embodiment, the adapter gasket 1800 includes a first tab 1810 at one end of the adapter gasket 1800 proximate to the split 1809, and a second tab 1811 at the other end of the adapter gasket 1800 proximate to the split 1809. The first and second tabs 1810, 1811 are configured to overlap each other (e.g., the first and second tabs 1810, 1811 form a lap joint). Additionally, in the illustrated embodiment, the first tab 1810 includes a male locking feature 1812, and the second tab 1811 includes a female locking feature 1813 configured to receive or accommodate the male locking feature 1812. In one or more embodiments, the split 1800 of the adapter gasket 1800 may form any other suitable type of joint, such as a butt joint, when the split 1800 is in the closed configuration. Additionally, in one or more embodiments, the adapter gasket 1800 may not be provided with the split 1809 and a technician may cut or otherwise form the split 1809 during installation of the penetration fitting assembly 1100.

FIGS. 19A-19B depict the penetration fitting assembly 1100 installed around a pipe or conduit passing through an opening in a wall of a sump. To install the penetration fitting assembly 1100 around a pipe or conduit passing through an opening in a wall of containment sump according to one embodiment of the present disclosure, the existing boot sealing the pipe or conduit to the wall in the containment sump is first removed, which exposes the fasteners (e.g., studs) securing the existing boot to the wall of the sump.

The wall gasket 1400 may then be installed. In one or more embodiments, the wall gasket 1400 may be installed by spreading the wall gasket 1400 about the split 1406 (or cutting the split 1406 in the wall gasket 1400 and then spreading the wall gasket about the split 1406) and then sliding the wall gasket 1400 onto the pipe or conduit such that the pipe or conduit passes through the split 1406 and is received in the central opening 1405 of the wall gasket 1400. The split 1406 may then be closed and the ends of the wall gasket 1400 may be secured together. In one embodiment, the split 1406 in the wall gasket 1400 may be closed such that the first and second tabs 1407, 1408 overlap each other, and the male locking feature 1409 of the first tab 1407 is inserted into the female locking feature 1410 of the second tab 1408. The wall gasket 1400 may then be slid along the pipe or conduit toward the wall of the sump such that the fasteners (e.g., studs) that were utilized to secure the boot to the wall of the sump pass through the openings 1418 in the screw seals 1414. When the wall gasket 1400 is installed, the front surface 1401 of the wall gasket 1400 faces toward the sump wall and the rear surface 1402 faces away from the sump wall.

In an embodiment in which the sump wall is curved (e.g., rounded), the method of installing the penetration fitting assembly 1100 may include installing the adapter gasket 1800 before installing the wall gasket 1400. In one or more embodiments, the adapter gasket 1800 may be installed by spreading the wall gasket 1800 about the split 1809 (or cutting the split 1809 in the adapter gasket 1800 and then spreading the adapter gasket 1800 about the split 1809) and then sliding the adapter gasket 1800 onto the pipe or conduit such that the pipe or conduit passes through the split 1809 and is received in the central opening 1808 of the adapter gasket 1800. The split 1809 may then be closed and the ends of the adapter gasket 1800 may be secured together. In one embodiment, the split 1809 in the adapter gasket 1800 may be closed such that the first and second tabs 1810, 1811 overlap each other (forming a lap joint), and the male locking feature 1812 of the first tab 1810 is inserted into the female locking feature 1813 of the second tab 1811. In one or more embodiments, the adapter gasket 1800 may form a butt joint when the adapter gasket 1800 is closed. The adapter gasket 1800 may then be slid along the pipe or conduit toward the wall of the sump such that the fasteners (e.g., studs) that were utilized to secure the boot to the wall of the sump pass through the openings 1805. When the adapter gasket 1800 is installed, the curved front surface 1801 of the adapter gasket 1800 faces toward the sump wall and the rear surface 1802 faces away from the sump wall. Additionally, when the wall gasket 1400 is installed, the front surface 1401 of the wall gasket 1400 engages the rear surface 1802 of the adapter gasket 1800.

Openings 1317, 1318 may then be cut (e.g., with a hole saw) in the rear and front cap plates 1306, 1307, respectively, of each of the first and second inner ring halves 1301, 1302 to accommodate the pipe or conduit. The holes 1317, 1318 are depicted best in FIG. 12A. In one embodiment, the openings 1317, 1318 may be cut in the inner ring halves 1301, 1302 by first inserting the ribs 602, 603 of the disposable spacer 600 (shown in FIGS. 7A-7C) into the channels 1308 of the inner ring halves 1301, 1302. Once the disposable spacer 600 has been inserted into the channels 1308 of the inner ring halves 1301, 1302, the openings 1306, 1307 may be cut along the joint between the first and second inner ring halves 1301, 1302 and through the disposable spacer 600 at any position within or along the one or more indicia 607 on the upper surface 606 of the disposable spacer 600.

The pipe gasket 1200 may then be installed around the pipe or conduit. In one or more embodiments, the pipe gasket 1200 may be installed by spreading the stem portion 1203 about the split 1210, and then sliding the pipe gasket 1200 onto the pipe or conduit such that the pipe or conduit passes through the split 1210 and is received in the central opening 1202 of the pipe gasket 1200.

The inner ring halves 1301, 1302, with the openings 1317, 1318 cut in the rear and front cap plates 1306, 1307, may then be brought together around the pipe gasket 1200 and the pipe or conduit passing therethrough. When the inner ring halves 1301, 1302 are brought together around the pipe gasket 1200, the ribs 1205, 1206 of the pipe gasket 1200 are received in the tapered channels 1308 of the inner ring halves 1301, 1302 with a friction fit.

The ring gasket assembly 1500 may then be installed. In one embodiment, installing the ring gasket assembly 1500 includes bringing the first and second ring gasket halves 1501, 1502 together around the inner ring assembly 1300 (e.g., the first and second inner ring halves 1301, 1302). When the first and second ring gasket halves 1501, 1502 are brought together around the inner ring assembly 1300, the semi-annular projections 1509 of the first and second ring gasket halves 1501, 1502 are received in the semi-annular grooves 1314 of the first and second inner ring halves 1301, 1302 with a friction fit. Additionally, when the first and second ring gasket halves 1501, 1502 are brought together around the inner ring assembly 1300, the first and second flanges 1504, 1506 of the first ring gasket half 1501 contacts the first and second flanges 1504, 1506, respectively, of the second ring gasket half 1502.

The outer ring assembly 1600 may then be installed. In one embodiment, installing the outer ring assembly 1600 includes brining the first and second outer ring halves 1601, 1602 together around the ring gasket assembly 1500 (e.g., the first and second ring gasket halves 1501, 1502). When the first and second outer ring halves 1601, 1602 are brought together around the ring gasket assembly 1500, the semi-annular projections 1610 on the inner sidewall surfaces 1606 of the outer ring halves 1601, 1602 are received in the semi-annular recess 1511 in the outer surfaces 1510 of the ring gasket halves 1501, 1502, and the outwardly extending projections 1514, 1515 on the first and second flanges 1504, 1506 of the ring gasket halves 1501, 1502 are received in the notches 1616, 1617 in the first and second mating surfaces 1608, 1609 of the outer ring halves 1601, 1602, with a friction fit.

Alternatively, in one or more embodiments, the first and second ring gasket halves 1501, 1502 of the ring gasket assembly 1500 may be connected to the first and outer ring halves 1601, 1602 and then the ring gasket halves 1501, 1502 and the outer ring halves 1601, 1602 as a unit may be brought together around the inner ring halves 1301, 1302.

The first and second outer ring halves 1601, 1602 may then be secured together with the clamp 1700. In one or more embodiments, when the clamp 1700 is installed, the clamp 1700 is received in the semi-annular recesses 1620 in the outer sidewall surfaces 1607 of the outer ring halves 1601, 1602 and the clamp 1700 is retained between the front and rear lips 1621, 1622 on the outer sidewall surfaces 1607 of the outer ring halves 1601, 1602. The clamp 1700 is configured to compress the ring gasket halves 1501, 1502 between the inner ring halves 1301, 1302 and the outer ring halves 1601, 1602 to create a liquid-tight or substantially liquid-tight seal between the inner ring halves 1301, 1302 and the outer ring halves 1601, 1602, and to compress the pipe gasket 1200 against the pipe or conduit to create a liquid-tight or a substantially-liquid tight seal against the pipe or conduit.

The outer ring halves 1601, 1602 may be secured to the sump wall before or after coupling the outer ring halves 1601, 1602 with the clamp 1700. In one embodiment, the outer ring halves 1601, 1602 may be secured to the sump wall by moving the outer ring halves 1601, 1602 toward the sump wall such that the tapered head portion 1417 of each of the screw seals 1414 of the wall gasket 1400 are received in the tapered portion 1615 of the counterbores 1611 in the first and second outer ring halves 1601, 1602, and the fasteners extending up through the counterbores 1611 and into the first relatively wider portion 1612 of the counterbores 1611. The fasteners may be secured to the outer ring halves 1601, 1602 with nuts accommodated in the first relatively wider portions 1612 of the counterbores 1611. Additionally, when the first and second outer ring halves 1601, 1602 are secured together by the clamp 1700 and are secured to the sump wall by the fasteners, the outer annular lip 1412 of the wall gasket 1400 is received in the semi-annular recesses 1619 of the first and second outer ring halves 1601, 1602 and the inner annular lip 1413 of the wall gasket 1400 is received in the semi-annular recesses 1317 of the first and second inner ring halves 1301, 1302 to register (i.e., locate) the outer ring assembly 1600 and the inner ring assembly 1300 to the wall gasket 1400.

Accordingly, in the illustrated embodiment, the penetration fitting assembly 1100 forms liquid-tight or substantially liquid-tight seals against the wall of the containment sump and around the pipe or conduit without the use of adhesives (i.e., with only compression seals), although in one or more embodiments, one or more adhesives may be utilized to forms liquid-tight or substantially liquid-tight seals against the wall of the containment sump and/or around the pipe or conduit passing through an opening in the wall of the containment sump. For example, in one or more embodiments, sealant may be applied to each of the gaskets (e.g., the pipe gasket 1200, the wall gasket 1400, and the first and second ring gasket halves 1501, 1502).

With reference now to FIGS. 20A-20B, a penetration fitting assembly 1900 according to another embodiment of the present disclosure includes a pipe gasket 2000 configured to surround a pipe or conduit passing through an opening in a wall of a containment sump, a ring assembly 2100 configured to compress the pipe gasket 2000 against the pipe or conduit to form a liquid-tight seal against the pipe or conduit, a wall gasket 2200 configured to be compressed by the ring assembly 2100 against the sump wall to form a liquid-tight seal between the ring assembly 2100 and the sump wall, and a clamp 2300 (e.g., a high torque band clamp or any other suitable type of clamp) configured to surround the ring assembly 2100 and to compress the pipe gasket 2000 against the pipe or conduit to form a liquid-tight seal between the pipe gasket 2000 and the pipe or conduit. In the illustrated embodiment, the ring assembly 2100 includes a first ring half 2101 and a second inner ring half 2101.

As illustrated in FIGS. 21A-21D, the pipe gasket 2000 includes an annular portion 2001 defining a central opening 2002 configured to accommodate the pipe or conduit passing through the wall of the containment sump, and a pair of stem portions 2003, 2004 extending in opposite directions from opposing portions (e.g., diametrically opposed portions) of the annular portion 2001.

Additionally, in the illustrated embodiment, the pipe gasket 2000 includes a first rib 2005 extending along the length of one side of the first stem portion 2003 and along the length of one side of the second stem portion 2004. In the illustrated embodiment, the pipe gasket 2000 also includes a second rib 2006 extending along the length of the other side of the first stem portion 2003 and along the length of the other side of the second stem portion 2004. In the illustrated embodiment, the first and second ribs 2005, 2006 are on opposite sides of the pipe gasket 2000. Additionally, in the illustrated embodiment, each of the first and second stem portions 2003, 2004 include a central portion 2007 between the first and second ribs 2005, 2006. In the illustrated embodiment, the stem portions 2003, 2004 each have a cruciform cross-sectional shape defined by the central portion 2007 and the first and second ribs 2005, 2006.

In the illustrated embodiment, each of the first and second ribs 2005, 2006 tapers from a relatively wider, inner end 2008 proximate to the central portion 2007 and a relatively narrower, outer end 2009 distal to the central portion 2007. In one or more embodiments, the first and second ribs 2005, 2006 of the pipe gasket 2000 taper at an angle in a range from approximately 2 degrees to approximately 6 degrees.

In one or more embodiments, the first and second ribs 2005, 2006 of the pipe gasket 2000 taper at an angle of approximately 4 degrees.

In the illustrated embodiment, the pipe gasket 2000 also includes a split 2010 extending along the entire length of one of the stem portions 2003 and through the annular portion 2001. The split 2010 enables a technician to wrap the annular portion 2001 of the pipe fitting 2000 around the pipe or conduit by spreading the stem portion 2003 about the split 2010, and then sliding the pipe gasket 2000 onto the pipe or conduit such that the pipe or conduit passes through the split 2010 and is received in the central opening 2002 of the pipe gasket 2000. In one or more embodiments, the split 2010 may extend along the entire length of the pipe gasket 2000 such that, for example, the pipe gasket 2000 is two separate components (e.g., the split 2000 may extend along long the entire length of one of the stem portions 2003, through the annular portion 2001, and along the entire length of the other stem portion 2004 such that the pipe gasket 2000 is a split two-piece gasket).

In the illustrated embodiment, the pipe gasket 2000 also includes first and second semi-annular recesses (e.g., grooves) 2011, 2012 in an outer surface 2013 of the annular portion 2001 of the pipe gasket 2000. Each of the first and second semi-annular recesses extends from the first stem portion 2003 to the second stem portion 2004. In one or more embodiments, the first and second semi-annular notches 2011, 2012 may taper radially inward at an angle in a range from approximately 2 degrees to approximately 6 degrees (e.g., approximately 4 degrees).

As illustrated in FIGS. 22A-22D, each of the first and second ring halves 2101, 2102 includes a semi-annular portion 2103 including a front surface 2104 configured to face toward the wall of the sump, a rear surface 2105 opposite the front surface 2104, an inner sidewall surface 2106 facing radially inward, an outer sidewall surface 2107 opposite the inner sidewall surface 2106 facing radially outward, and mating surfaces 2108, 2109 at ends of the semi-annular portion 2103. Additionally, in the illustrated embodiment, each of the first and second ring halves 2101, 2102 includes a semi-annular projection 2110 (e.g., a semi-annular rib) extending radially inward from the inner sidewall surface 2106. The semi-annular projections 2110 (e.g., the semi-annular ribs) of the first and second ring halves 2101, 2102 are configured to extend into the semi-annular recesses 2011, 2012 (e.g., the semi-annular grooves) in the outer surface 2013 of the annular portion 2001 of the pipe gasket 2000. The configuration (e.g., the size and shape) of the semi-annular projections 2110 of the first and second ring halves 2101, 2102 may be the same as or substantially the same as the configuration (e.g., the size and shape) of the semi-annular recesses 2011, 2012 of the pipe gasket 2000.

In the illustrated embodiment, each of the first and second ring halves 2101, 2102 also includes a series of counterbores 2111 extending from the front surface 2104 to the rear surface 2105. The counterbores 2111 are configured to receive fasteners securing the first and second ring halves 2101, 2102 to the sump wall and compressing the wall gasket 2200 against the sump wall. Additionally, in the illustrated embodiment, each of the counterbores 2111 includes a first relatively wider portion 2112 extending from the rear surface 2105 toward the front surface 2104, a second relatively wider portion 2113 extending from the front surface 2104 toward the rear surface 2105, a relatively narrower intermediate portion 2114 between the first and second relatively wider portions 2112, 2113, and a taper 2115 connecting the second relatively wider portion 2113 to the relatively narrower intermediate portion 2114.

In the illustrated embodiment, the first and second mating surfaces 2108, 2109 of each of the first and second ring halves 2011, 2012 includes notches 2116, 2117, respectively. The notches 2116, 2117 are configured to accommodate the first and second ribs 2005, 2006 on pipe gasket 2000. The configuration (e.g., the size and shape) of the notches 2116, 2117 may be the same as or substantially the same as the configuration (e.g., the size and shape) of the ribs 2005, 2006.

Additionally, in the illustrated embodiment, each of the first and second ring halves 2011, 2012 includes a semi-annular ridge 2118 at an interface between the front surface 2104 and the outer sidewall surface 2107. The semi-annular ridge 2118 extends forward (i.e., toward the sump wall) away from the front surface 2104. In the illustrated embodiment, each of the first and second rings halves 2101, 2102 includes a semi-annular recess 2119 proximate to the semi-annular ridge 2118. The semi-annular recess 2119 is spaced inward toward the inner sidewall surface 2106 relative to the semi-annular ridge 2118 (e.g., the semi-annular recess 2119 is between the semi-annular ridge 2118 and the interface between the front surface 2104 and the inner sidewall surface 2106).

In the illustrated embodiment, each of the first and second ring halves 2101, 2102 also includes a semi-annular recess 2120 in the outer sidewall surface 2107. In the illustrated embodiment, the semi-annular recess 2120 does not extend all the way to the front surface 2104 or the rear surface 2105 such that front and rear lips 2121, 2122, respectively, are formed on the outer sidewall surface 2107. The semi-annular recesses 2120 in the first and second ring halves 2101, 2102 are configured to accommodate the clamp 2300, and the front and rear lips 2121, 2122 are configured to retain the clamp 2300 on the first and second outer ring halves 2101, 2102. That is, the clamp 2300 is configured to secure the first and second ring halves 2101, 2102 together, and the front and rear lips 2121, 2122 are configured to maintain the position of the clamp 2300 on the outer sidewall surfaces 2107 and thereby prevent the clamp 2300 from inadvertently disengaging the first and second outer ring halves 2101, 2102.

As illustrated in FIGS. 23A-23D, the wall gasket 2200 is a split ring having a front surface 2201, a rear surface 2202 opposite the front surface 2201, an inner sidewall surface 2203, and an outer sidewall surface 2204. When the penetration fitting 1100 is installed, the front surface 2201 faces toward the sump wall, and the rear surface 2202 faces away from the sump wall. The wall gasket 2200 defines a central opening 2205 and includes a slit or split 2206 that opens up into the central opening 2205 that enables the wall gasket 2200 to be installed around a pipe or gasket. That is, the wall gasket 2200 can be spread open about the split 2206 such that the pipe or conduit can pass through the split 2206 and into the central opening 2205, and then the wall gasket 2200 can be closed around the pipe or conduit. In the illustrated embodiment, the wall gasket 2200 includes split interlocking features that are configured to secure the wall gasket 2200 in the closed configuration. In the illustrated embodiment, the wall gasket 2200 includes a first tab 2207 at one end of the wall gasket 2200 proximate to the split 2206, and a second tab 2208 at the other end of the wall gasket 2200 proximate to the split 2206. The first and second tabs 2207, 2208 are configured to overlap each other (e.g., the first and second tabs 2207, 2208 form a lap joint). Additionally, in the illustrated embodiment, the first tab 2207 includes a male locking feature 2209, and the second tab 2208 includes a female locking feature 2210 configured to receive or accommodate the male locking feature 2209. In one or more embodiments, the wall gasket 2200 may not be provided with the split 2206 and a technician may cut or otherwise form the split 2206 during installation of the penetration fitting assembly 1100.

In the illustrated embodiment, the wall gasket 2200 also includes a series of circumferentially arranged openings 2211 (e.g., holes) configured to receive fasteners securing the wall gasket 2200 to the sump wall. Additionally, in the illustrated embodiment, the wall gasket 2200 includes an outer annular lip 2212 (e.g., an O-ring) at an interface between the rear surface 2202 and the outer sidewall surface 2204, and an inner annular lip 2213 (e.g., an O-ring) at an interface between the rear surface 2202 and the inner sidewall surface 2203. The inner and outer annular lips 2213, 2212 extend rearward away from the rear surface 2202. When the penetration fitting assembly 1900 is installed, the semi-annular recesses 2119 of the first and second ring halves 2101, 2102 are configured to accept or accommodate the outer annular lip 2212 of the wall gasket 2200. The engagement between the semi-annular recesses 2119 of the first and second ring halves 2101, 2102 and the outer annular lip 2212 of the wall gasket 2200 is configured to register (i.e., locate) the ring assembly 2100 to the wall gasket 2200.

In the illustrated embodiment, the wall gasket 2200 also includes a series of screw seals 2214 in the openings 2211. In the illustrated embodiment, each screw seal 2214 includes a stem portion 2215 extending through the opening 2211, a tail portion 2216 connected to the stem portion 2215 and overlapping the front surface 2201, and a head portion 2217 connected to the stem portion 2215 and overlapping the rear surface 2202. Each of the screw seals 2214 also defines an opening 2218 configured to accommodate a fastener securing the ring assembly 2100 and the wall gasket 2200 to the wall of the sump. In the illustrated embodiment, the head portion 2217 of each of the screw seals 2214 tapers in a direction away from the rear surface 2202. The tapered head portions 2217 of the screw seals 2214 are configured to extend into the relatively wider portion 2113 and the taper 2114 of each of the counterbores 2111 in the first and second outer ring halves 2101, 2102 when the penetration fitting assembly 1900 is installed (i.e., the relatively wider portion 2113 and the taper 2114 of each of the counterbores 2111 in the first and second ring halves 2101, 2102 are configured to accommodate the tapered head portions 2217 of the screw seals 2214 of the wall gasket 2200). The wall gasket 2200 may be formed of any material suitable configured to form a compression seal between the ring assembly 2100 and the sump wall, such as, for example, rubber.

In one or more embodiments in which the sump wall is curved (e.g., rounded), the penetration fitting assembly 1900 may include an adapter gasket 2400 (shown in FIGS. 24A-24D) configured to be positioned between the sump wall and the wall gasket 2200. The adapter gasket 2400 may be the same as or similar to the embodiment of the adapter gasket 1800 described above with reference to FIGS. 18A-18D.

FIGS. 25A-25B depict the penetration fitting assembly 1900 installed around a pipe or conduit passing through an opening in a wall of a sump. To install the penetration fitting assembly 1900 around a pipe or conduit passing through an opening in a wall of a containment sump according to one embodiment of the present disclosure, the existing boot sealing the pipe or conduit to the wall in the containment sump is first removed, which exposes the fasteners (e.g., studs) securing the existing boot to the wall of the sump.

The wall gasket 2200 may then be installed. In one or more embodiments, the wall gasket 2200 may be installed by spreading the wall gasket 2200 about the split 2206 (or cutting the split 2206 in the wall gasket 2200 and then spreading the wall gasket about the split 2206) and then sliding the wall gasket 2200 onto the pipe or conduit such that the pipe or conduit passes through the split 2206 and is received in the central opening 2205 of the wall gasket 2200. The split 2206 may then be closed and the ends of the wall gasket 2200 may be secured together. In one embodiment, the split 2206 in the wall gasket 2200 may be closed such that the first and second tabs 2207, 2208 overlap each other, and the male locking feature 2209 of the first tab 2207 is inserted into the female locking feature 2210 of the second tab 2208. The wall gasket 2200 may then be slid along the pipe or conduit toward the wall of the sump such that the fasteners (e.g., studs) that were utilized to secure the boot to the wall of the sump pass through the openings 2218 in the screw seals 2214. When the wall gasket 2200 is installed, the front surface 2201 of the wall gasket 2200 faces toward the sump wall and the rear surface 2202 faces away from the sump wall.

In an embodiment in which the sump wall is curved (e.g., rounded), the method of installing the penetration fitting assembly 1900 may include installing the adapter gasket 2400 before installing the wall gasket 2200. The adapter gasket 2400 may be installed in the same manner or substantially same manner as described above with reference to the installation of the adapter gasket 1800.

The pipe gasket 2000 may then be installed around the pipe or conduit. In one or more embodiments, the pipe gasket 2000 may be installed by spreading the stem portion 2003 about the split 2010, and then sliding the pipe gasket 2000 onto the pipe or conduit such that the pipe or conduit passes through the split 2010 and is received in the central opening 2002 of the pipe gasket 2000.

The ring assembly 2100 may then be installed. In one embodiment, installing the ring assembly 2100 includes brining the first and second outer ring halves 2101, 2102 together around the pipe gasket 2000. When the first and second ring halves 2101, 2102 are brought together around the pipe gasket 200, the semi-annular projections 2110 on the inner sidewall surfaces 2106 of the ring halves 2101, 2102 are received in the semi-annular recesses 2011, 2012 in an outer surface 2013 of the annular portion 2001 of the pipe gasket 2000, and the ribs 2005, 2006 of the pipe gasket 2000 are received in the notches 2116, 2117 in the first and second mating surfaces 2108, 2109 of the ring halves 2101, 2102, with a friction fit.

The first and second ring halves 2101, 2102 may then be secured together with the clamp 2300. In one or more embodiments, when the clamp 2300 is installed, the clamp 2300 is received in the semi-annular recesses 2119 in the outer sidewall surfaces 2107 of the outer ring halves 2101, 2102 and the clamp 2300 is retained between the front and rear lips 2120, 2121 on the outer sidewall surfaces 2107 of the outer ring halves 2101, 2102. The clamp 2300 is configured to compress the pipe gasket 2000 against the pipe or conduit to create a liquid-tight or a substantially-liquid tight seal against the pipe or conduit.

The ring halves 2101, 2102 may be secured to the sump wall before or after coupling the ring halves 2101, 2102 with the clamp 2300. In one embodiment, the ring halves 2101, 2102 may be secured to the sump wall by moving the ring halves 2101, 2102 toward the sump wall such that the tapered head portion 2217 of each of the screw seals 2214 of the wall gasket 2200 are received in the tapered portion 2115 of the counterbores 2111 in the first and second ring halves 2101, 2102, and the fasteners extending up through the counterbores 2111 and into the first relatively wider portion 2112 of the counterbores 2111. The fasteners may be secured to the ring halves 2101, 2102 with nuts accommodated in the first relatively wider portions 2112 of the counterbores 2111. Additionally, when the first and second ring halves 2101, 2102 are secured together by the clamp 2300 and are secured to the sump wall by the fasteners, the outer annular lip 2212 of the wall gasket 2200 is received in the semi-annular recesses 2118 of the first and second ring halves 2101, 2102 to register (i.e., locate) the ring assembly 1600 to the wall gasket 2200.

Accordingly, in the illustrated embodiment, the penetration fitting assembly 1900 forms liquid-tight or substantially liquid-tight seals against the wall of the containment sump and around the pipe or conduit without the use of adhesives (i.e., with only compression seals), although in one or more embodiments, one or more adhesives may be utilized to forms liquid-tight or substantially liquid-tight seals against the wall of the containment sump and/or around the pipe or conduit passing through an opening in the wall of the containment sump. For example, in one or more embodiments, sealant may be applied to each of the gaskets (e.g., the pipe gasket 2000 and the wall gasket 2200).

Figure 26A:
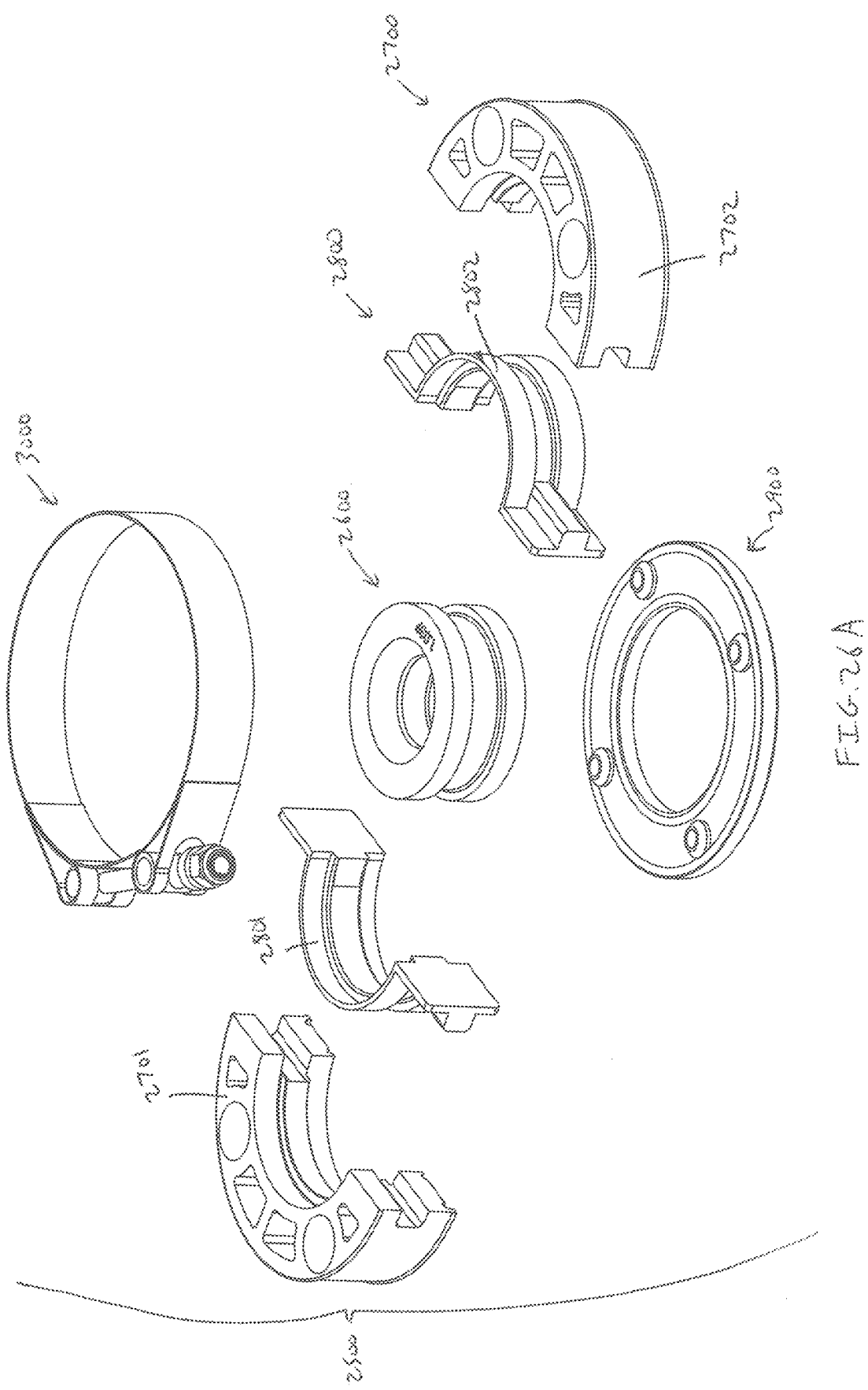

With reference now to FIGS. 26A-26B, a penetration fitting assembly 2500 according to another embodiment of the present disclosure includes a pipe gasket 2600 configured to surround a pipe or conduit passing through an opening in a wall of a containment sump, a ring assembly 2700, a ring gasket assembly 2800 configured to form a liquid-tight seal between the pipe gasket 2600 and the ring assembly 2700, a wall gasket 2900, and a clamp 3000 (e.g., a high torque band clamp or any other suitable type of clamp) configured to surround the ring assembly 2700 and to compress the ring gasket assembly 2800 between the pipe gasket 2600 and the ring assembly 2700 to form a liquid-tight seal between the pipe gasket 2600 and the ring assembly 2700 and to compress the pipe gasket 2600 against the pipe or conduit to form a fluid-tight seal against the pipe or conduit. In the illustrated embodiment, the ring assembly 2700 includes a first ring half 2701 and a second ring half 2702, and the ring gasket assembly 2800 includes a first ring gasket half 2801 and a second ring gasket half 2802.

As illustrated in FIGS. 27A-27C, the pipe gasket 2600 includes an annular portion 2601 defining a central opening 2602 configured to accommodate the pipe or conduit passing through the wall of the containment sump. In one or more embodiments, the central opening 2602 may be concentric with the annular portion 2601. In one or more embodiments, the central opening 2602 may not be concentric with the annular portion 2601 (i.e., the central opening 2602 may be offset from a centerline of the annular portion 2601). In the illustrated embodiment, the pipe gasket 2600 also includes an annular recess (e.g., groove) 2603 in an outer surface 2604 of the annular portion 2601 of the pipe gasket 2600. In one or more embodiments, the annular recess 2603 may taper radially inward at an angle in a range from approximately 2 degrees to approximately 6 degrees (e.g., approximately 4 degrees). In the illustrated embodiment, the pipe gasket 2600 also includes a split 2605 extending through one side of the annular portion 2601. In one or more embodiments, the split 2605 may be formed by a technician during installation of the penetration fitting assembly 2500. The split 2605 enables a technician to wrap the annular portion 2601 of the pipe fitting 2600 around the pipe or conduit by spreading the annular portion 2601 about the split 2605, and then sliding the pipe gasket 2600 onto the pipe or conduit such that the pipe or conduit passes through the split 2605 and is received in the central opening 2602 of the pipe gasket 2600. In one or more embodiments, the split 2605 may extend through both sides of the annular portion 2601 such that, for example, the pipe gasket 2600 is two separate components (e.g., the pipe gasket 2600 is a split two-piece gasket).

As illustrated in FIGS. 28A-28C, each of the first and second ring gasket halves 2801, 2802 includes a semi-annular portion 2803, a first flange 2804 extending radially outward from a first end 2805 of the semi-annular portion 2803, and a second flange 2806 extending radially outward from a second end 2807 of the semi-annular portion 2803. Additionally, in the illustrated embodiment, an inner surface 2808 of the semi-annular portion 2803 includes a semi-annular projection 2809 extending radially inward, and an outer surface 2810 of the semi-annular portion opposite the inner surface 2808 includes a corresponding semi-annular recess 2811 (e.g., a semi-annular groove) extending radially inward. Additionally, in the illustrated embodiment, an outer surface 2812, 2813 of each of the first and second flanges 2804, 2806 includes an outwardly extending projection 2814, 2815 (e.g., a rib), respectively, aligned with the recess 2811 in the outer surface 2810 of the semi-annular portion 2803. The semi-annular projections 2809 of the first and second ring gasket halves 2801, 2802 are configured to extend into the annular groove 2603 of the pipe gasket 2600.

In the illustrated embodiment, the configuration of first ring gasket half 2801 is identical to the configuration of the second ring gasket half 2802, which is configured to reduce manufacturing costs and simplify installation because the technician does not need to distinguish between the two ring gasket halves 2801, 2802. However, in one or more embodiments, the first ring gasket half 2801 may have a different configuration than the second ring gasket half 2802. The first and second ring gasket halves 2801, 2802 may be formed of any material suitable configured to form a compression seal between the inner ring assembly and the outer ring assembly, such as, for example, rubber.

As illustrated in FIGS. 29A-29D, each of the first and second ring halves 2701, 2702 includes a semi-annular portion 2703 including a front surface 2704 configured to face toward the wall of the sump, a rear surface 2705 opposite the front surface 2704, an inner sidewall surface 2706 facing radially inward, an outer sidewall surface 2707 opposite the inner sidewall surface 2706 facing radially outward, and mating surfaces 2708, 2709 at ends of the semi-annular portion 2703. Additionally, in the illustrated embodiment, each of the first and second outer ring halves 2701, 2702 includes a semi-annular projection 2710 (e.g., a semi-annular rib) extending radially inward from the inner sidewall surface 2706. The semi-annular projections 2710 (e.g., the semi-annular ribs) of the first and second outer ring halves 2701, 2702 are configured to extend into the semi-annular recesses 2811 (e.g., the semi-annular grooves) in the outer surfaces 2810 of the first and second ring gasket halves 2801, 2802. The configuration (e.g., the size and shape) of the semi-annular projections 2710 of the first and second ring halves 2701, 2702 may the same as or substantially the same as the configuration (e.g., the size and shape) of the semi-annular recesses 2811 of the first and second ring gasket halves 2801, 2802.

In the illustrated embodiment, each of the first and second outer ring halves 2701, 2702 also includes a series of counterbores 2711 extending from the front surface 2704 to the rear surface 2705. The counterbores 2711 are configured to receive fasteners securing the first and second ring halves 2701, 2702 to the sump wall and compressing the wall gasket 2900 against the sump wall. Additionally, in the illustrated embodiment, each of the counterbores 2711 includes a first relatively wider portion 2712 extending from the rear surface 2705 toward the front surface 2704, a second relatively wider portion 2713 extending from the front surface 2704 toward the rear surface 2705, a relatively narrower intermediate portion 2714 between the first and second relatively wider portions 2712, 2713, and a taper 2715 connecting the second relatively wider portion 2713 to the relatively narrower intermediate portion 2714.

In the illustrated embodiment, the first and second mating surfaces 2708, 2709 of each of the first and second ring halves 2701, 2702 includes notches 2716, 2717, respectively. The notches 2716, 2717 are configured to accommodate the projections 2814, 2815 on the outer surfaces 2812, 2813 of the first and second flanges 2804, 2806 of the first and second ring gasket halves 2801, 2802. The configuration (e.g., the size and shape) of the notches 2716, 2717 may be the same as or substantially the same as the configuration (e.g., the size and shape) of the projections 2814, 2815.

Additionally, in the illustrated embodiment, each of the first and second ring halves 2701, 2702 includes a semi-annular ridge 2718 at an interface between the front surface 2704 and the outer sidewall surface 2707. The semi-annular ridge 2718 extends forward (i.e., toward the sump wall) away from the front surface 2704. In the illustrated embodiment, each of the first and second rings halves 2701, 2702 includes a first semi-annular recess 2719 in the front surface 2704 proximate to the semi-annular ridge 2718 and a second semi-annular recess 2720 in the front surface 2704 proximate to the interface between the front surface 2704 and the inner sidewall surface 2706. The first semi-annular recess 2719 is spaced inward toward the inner sidewall surface 2706 relative to the semi-annular ridge 2718, and the second semi-annular recess 2720 is spaced inward toward the inner sidewall surface 2706 relative to the first semi-annular recess 2719 (e.g., the first and second semi-annular recesses 2719, 2720 are between the semi-annular ridge 2718 and the interface between the front surface 2704 and the inner sidewall surface 2706).

In the illustrated embodiment, each of the first and second ring halves 2701, 2702 also includes a semi-annular recess 2721 in the outer sidewall surface 2707. In the illustrated embodiment, the semi-annular recess 2721 does not extend all the way to the front surface 2704 or the rear surface 2705 such that front and rear lips 2722, 2723, respectively, are formed on the outer sidewall surface 2707. The semi-annular recesses 2721 in the first and second ring halves 2701, 2702 are configured to accommodate the clamp 3000, and the front and rear lips 2722, 2723 are configured to retain the clamp 3000 on the first and second outer ring halves 2701, 2702. That is, the clamp 3000 is configured to secure the first and second outer ring halves 2701, 2702 together, and the front and rear lips 2721, 2722 are configured to maintain the position of the clamp 3000 on the outer sidewall surfaces 2707 and thereby prevent the clamp 3000 from inadvertently disengaging the first and second outer ring halves 2701, 2702.

As illustrated in FIGS. 30A-30D, the wall gasket 2900 is a split ring having a front surface 2901, a rear surface 2902 opposite the front surface 2901, an inner sidewall surface 2903, and an outer sidewall surface 2904. When the penetration fitting 1100 is installed, the front surface 2901 faces toward the sump wall, and the rear surface 2902 faces away from the sump wall. The wall gasket 2900 defines a central opening 2905 and includes a slit or split 2906 that opens up into the central opening 2905 that enables the wall gasket 2900 to be installed around a pipe or gasket. That is, the wall gasket 2900 can be spread open about the split 2906 such that the pipe or conduit can pass through the split 2906 and into the central opening 2905, and then the wall gasket 2900 can be closed around the pipe or conduit. In the illustrated embodiment, the wall gasket 2900 includes split interlocking features that are configured to secure the wall gasket 2900 in the closed configuration. In the illustrated embodiment, the wall gasket 2900 includes a first tab 2907 at one end of the wall gasket 2900 proximate to the split 2906, and a second tab 2908 at the other end of the wall gasket 2900 proximate to the split 2906. The first and second tabs 2907, 2908 are configured to overlap each other (e.g., the first and second tabs 2907, 2908 form a lap joint). Additionally, in the illustrated embodiment, the first tab 2907 includes a male locking feature 2909, and the second tab 2908 includes a female locking feature 2910 configured to receive or accommodate the male locking feature 2909. In one or more embodiments, the wall gasket 2900 may not be provided with the split 2906 and a technician may cut or otherwise form the split 2906 during installation of the penetration fitting assembly 2500.

In the illustrated embodiment, the wall gasket 2900 also includes a series of circumferentially arranged openings 2911 (e.g., holes) configured to receive fasteners securing the wall gasket 2900 to the sump wall. Additionally, in the illustrated embodiment, the wall gasket 2900 includes an outer annular lip 2912 (e.g., an O-ring) at an interface between the rear surface 2902 and the outer sidewall surface 2904, and an inner annular lip 2913 (e.g., an O-ring) at an interface between the rear surface 2902 and the inner sidewall surface 2903. The inner and outer annular lips 2913, 2912 extend rearward away from the rear surface 2902. When the penetration fitting assembly 2500 is installed, the semi-annular recesses 2719, 2720 of the first and second ring halves 2701, 2702 are configured to accept or accommodate the outer annular lip 2912 and the inner annular lip 2913, respectively, of the wall gasket 2900. The engagement between the semi-annular recesses 2719, 2720 of the first and second ring halves 2701, 2702 and the outer and inner annular lip 2912, 2913 of the wall gasket 2900 is configured to register (i.e., locate) the ring assembly 2700 to the wall gasket 2900.

In the illustrated embodiment, the wall gasket 2900 also includes a series of screw seals 2914 in the openings 2911. In the illustrated embodiment, each screw seal 2914 includes a stem portion 2915 extending through the opening 2911, a tail portion 2916 connected to the stem portion 2915 and overlapping the front surface 2901, and a head portion 2917 connected to the stem portion 2915 and overlapping the rear surface 2902. Each of the screw seals 2914 also defines an opening 2918 configured to accommodate a fastener securing the ring assembly 2700 and the wall gasket 2900 to the wall of the sump. In the illustrated embodiment, the head portion 2917 of each of the screw seals 2914 tapers in a direction away from the rear surface 2902. The tapered head portions 2917 of the screw seals 2914 are configured to extend into the relatively wider portion 2713 and the taper 2714 of each of the counterbores 2711 in the first and second ring halves 2701, 2702 when the penetration fitting assembly 2500 is installed (i.e., the relatively wider portion 2713 and the taper 2714 of each of the counterbores 2711 in the first and second outer ring halves 2701, 2702 are configured to accommodate the tapered head portions 2917 of the screw seals 2914 of the wall gasket 2900). The wall gasket 2900 may be formed of any material suitable configured to form a compression seal between the ring assembly 2700 and the sump wall, such as, for example, rubber.

In one or more embodiments in which the sump wall is curved (e.g., rounded), the penetration fitting assembly 2500 may include an adapter gasket 3100 (shown in FIGS. 31A-31D) configured to be positioned between the sump wall and the wall gasket 2900. The adapter gasket 3100 may be the same as or similar to the embodiment of the adapter gasket 1800 described above with reference to FIGS. 18A-18D.

FIGS. 32A-32B depict the penetration fitting assembly 2500 installed around a pipe or conduit passing through an opening in a wall of a sump. To install the penetration fitting assembly 2500 around a pipe or conduit passing through an opening in a wall of containment sump according to one embodiment of the present disclosure, the existing boot sealing the pipe or conduit to the wall in the containment sump is first removed, which exposes the fasteners (e.g., studs) securing the existing boot to the wall of the sump.

The wall gasket 2900 may then be installed. In one or more embodiments, the wall gasket 2900 may be installed by spreading the wall gasket 2900 about the split 2906 (or cutting the split 2906 in the wall gasket 2900 and then spreading the wall gasket about the split 2906) and then sliding the wall gasket 2900 onto the pipe or conduit such that the pipe or conduit passes through the split 2906 and is received in the central opening 2905 of the wall gasket 2900. The split 2906 may then be closed and the ends of the wall gasket 2900 may be secured together. In one embodiment, the split 2906 in the wall gasket 2900 may be closed such that the first and second tabs 2907, 2908 overlap each other, and the male locking feature 2909 of the first tab 2907 is inserted into the female locking feature 2910 of the second tab 2908. The wall gasket 2900 may then be slid along the pipe or conduit toward the wall of the sump such that the fasteners (e.g., studs) that were utilized to secure the boot to the wall of the sump pass through the openings 2918 in the screw seals 2914. When the wall gasket 2900 is installed, the front surface 2901 of the wall gasket 2900 faces toward the sump wall and the rear surface 2902 faces away from the sump wall.

In an embodiment in which the sump wall is curved (e.g., rounded), the method of installing the penetration fitting assembly 2500 may include installing the adapter gasket 3100 before installing the wall gasket 2900. The adapter gasket 3100 may be installed in the same manner or substantially same manner as described above with reference to the installation of the adapter gasket 1800.

The pipe gasket 2600 may then be installed around the pipe or conduit. In one or more embodiments, the pipe gasket 2600 may be installed by spreading the annular portion 2601 about the split 2605, and then sliding the pipe gasket 2600 onto the pipe or conduit such that the pipe or conduit passes through the split 2605 and is received in the central opening 2602 of the pipe gasket 2600.

The ring gasket assembly 2800 may then be installed. In one embodiment, installing the ring gasket assembly 2800 includes bringing the first and second ring gasket halves 2801, 2802 together around the pipe gasket 2600. When the first and second ring gasket halves 2801, 2802 are brought together around the pipe gasket 2600, the semi-annular projections 2809 of the first and second ring gasket halves 2801, 2802 are received in the semi-annular groove 2603 of the pipe gasket 2600 with a friction fit. Additionally, when the first and second ring gasket halves 2801, 2802 are brought together around the pipe gasket 2600, the first and second flanges 2804, 2806 of the first ring gasket half 2801 contact the first and second flanges 2804, 2806, respectively, of the second ring gasket half 2802.

The ring assembly 2700 may then be installed. In one embodiment, installing the ring assembly 2700 includes brining the first and second outer ring halves 2701, 2702 together around the ring gasket assembly 2800 (e.g., the first and second ring gasket halves 2801, 2802). When the first and second ring halves 2701, 2702 are brought together around the ring gasket assembly 2800, the semi-annular projections 2710 on the inner sidewall surfaces 2706 of the ring halves 2701, 2702 are received in the semi-annular recess 2811 in the outer surfaces 2810 of the ring gasket halves 2801, 2802, and the outwardly extending projections 2814, 2815 on the first and second flanges 2804, 2806 of the ring gasket halves 2801, 2802 are received in the notches 2716, 2717 in the first and second mating surfaces 2708, 2709 of the ring halves 2701, 2702, with a friction fit.

Alternatively, in one or more embodiments, the first and second ring gasket halves 2801, 2802 of the ring gasket assembly 2800 may be connected to the first and ring halves 2701, 2702 and then the ring gasket halves 2801, 2802 and the outer ring halves 2701, 2702 as a unit may be brought together around the pipe gasket 2600.

The first and second ring halves 2701, 2702 may then be secured together with the clamp 3000. In one or more embodiments, when the clamp 3000 is installed, the clamp 3000 is received in the semi-annular recesses 2721 in the outer sidewall surfaces 2707 of the ring halves 2701, 2702 and the clamp 3000 is retained between the front and rear lips 2722, 2723 on the outer sidewall surfaces 2707 of the ring halves 2701, 2702. The clamp 3000 is configured to compress the ring gasket halves 2801, 2802 between the pipe gasket 2600 and the ring halves 2701, 2702 to create a liquid-tight or substantially liquid-tight seal between the pipe gasket 2600 and the ring halves 2701, 2702, and to compress the pipe gasket 2600 against the pipe or conduit to create a liquid-tight or a substantially-liquid tight seal against the pipe or conduit.

The outer ring halves 2701, 2702 may be secured to the sump wall before or after coupling the ring halves 2701, 2702 with the clamp 3000. In one embodiment, the outer ring halves 2701, 2702 may be secured to the sump wall by moving the ring halves 2701, 2702 toward the sump wall such that the tapered head portion 2917 of each of the screw seals 2914 of the wall gasket 2900 are received in the tapered portion 2715 of the counterbores 2711 in the first and second outer ring halves 2701, 2702, and the fasteners extending up through the counterbores 2711 and into the first relatively wider portion 2712 of the counterbores 2711. The fasteners may be secured to the outer ring halves 2701, 2702 with nuts accommodated in the first relatively wider portions 2712 of the counterbores 2711. Additionally, when the first and second ring halves 2701, 2702 are secured together by the clamp 3000 and are secured to the sump wall by the fasteners, the outer annular lip 2912 of the wall gasket 2900 is received in the first semi-annular recesses 2719 of the first and second outer ring halves 2701, 2702 and the inner annular lip 2913 of the wall gasket 2900 is received in the second semi-annular recesses 2720 of the first and second outer ring halves 2701, 2702 to register (i.e., locate) the ring assembly 2700 to the wall gasket 2900.

Accordingly, in the illustrated embodiment, the penetration fitting assembly 2500 forms liquid-tight or substantially liquid-tight seals against the wall of the containment sump and around the pipe or conduit without the use of adhesives (i.e., with only compression seals), although in one or more embodiments, one or more adhesives may be utilized to forms liquid-tight or substantially liquid-tight seals against the wall of the containment sump and/or around the pipe or conduit passing through an opening in the wall of the containment sump. For example, in one or more embodiments, sealant may be applied to each of the gaskets (e.g., the pipe gasket 2600, the wall gasket 2900, and the first and second ring gasket halves 2801, 2802).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. As used herein, the term "semi," such as in semi-annular, semi-cylindrical, and semi-circular, refers to half or substantially half. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A penetration fitting assembly configured to form a seal around a pipe or conduit and a wall of a sump through which the pipe or conduit passes, the penetration fitting assembly comprising:
    a pipe gasket comprising an opening configured to accommodate the pipe or conduit;
    an inner ring assembly configured to surround the pipe gasket, the inner ring assembly comprising a first inner ring part and a second inner ring part;
    a ring gasket assembly configured to surround the inner ring assembly, the ring gasket assembly comprising a first ring gasket part and a second ring gasket part;
    a wall gasket;
    an outer ring assembly configured to surround the ring gasket assembly, the outer ring assembly comprising a first outer ring part and a second outer ring part; and
    a clamp configured to surround the outer ring assembly, wherein, when the penetration fitting assembly is installed, the wall gasket is compressed against the wall of the sump, the ring gasket assembly is compressed between the inner ring assembly and the outer ring assembly, and the pipe gasket is compressed against the pipe or conduit.

2. The penetration fitting assembly of claim 1, wherein each of the first inner ring part and the second inner ring part comprises:
    a semi-cylindrical sidewall;
    a first semi-circular cap plate proximate to a rear end of the semi-cylindrical sidewall;
    a second semi-circular cap plate proximate to a front end of the semi-cylindrical sidewall; and
    a channel defined between the first semi-circular cap plate and second semi-circular cap plate configured to accommodate a portion of the pipe gasket.

3. The penetration fitting assembly of claim 2, wherein:
    the channel of each of the first inner ring part and the second inner ring part is tapered,
    the pipe gasket comprises a first rib and a second rib opposite the first rib, and
    the channel of the first inner ring part is configured to accommodate the first rib and the channel of the second inner ring part is configured to accommodate the second rib.

4. The penetration fitting assembly of claim 3, wherein each of the first ring gasket part and the second ring gasket part comprises:
    a semi-annular portion;
    a first flange extending radially outward from a first end of the semi-annular portion; and
    a second flange extending radially outward from a second end of the semi-annular portion.

5. The penetration fitting assembly of claim 4, wherein each of the first ring gasket part and the second ring gasket part further comprises:
    a semi-annular projection at an inner surface of the semi-annular portion; and
    a semi-annular recess at an outer surface of the semi-annular portion.

6. The penetration fitting assembly of claim 5, wherein:
    each of the first inner ring part and the second inner ring part comprises a semi-annular groove in an outer surface of the semi-cylindrical sidewall,
    each of the first ring gasket part and the second ring gasket part comprises a semi-annular projection extending radially inward from the inner surface, and
    the semi-annular groove of the first and second inner ring parts is configured to accommodate the semi-annular projection of the first and second ring gasket parts.

7. The penetration fitting assembly of claim 6, wherein each of the first outer ring part and the second outer ring part comprises a semi-annular projection extending radially inward, and wherein the semi-annular recess of the first and second ring gasket parts is configured to accommodate the semi-annular projection of the first and second outer ring parts.

8. The penetration fitting assembly of claim 7, wherein each of the first and second ring gasket parts comprises projections on outer surfaces of the first and second flanges, and wherein opposite ends of each of the first and second outer ring parts comprises notches configured to accommodate the projections.

9. The penetration fitting assembly of claim 1, wherein the wall gasket comprises:
    a split ring comprising a front surface configured to face toward the wall of the sump and a rear surface configured to face away from the wall of the sump;
    a plurality of openings circumferentially arranged in the split ring;
    an outer annular lip on the rear surface, and
    an inner annular lip on the rear surface, wherein the plurality of openings are between the outer annular lip and the inner annular lip.

10. The penetration fitting assembly of claim 9, wherein each of the first and second outer ring parts comprises a front surface configured to face toward the wall of the sump and a rear surface configured to face away from the wall of the sump, and wherein the front surface of each of the first and second outer ring parts comprises a semi-annular groove configured to accommodate a portion of the outer annular lip of the wall gasket.

11. The penetration fitting assembly of claim 10, wherein each of the first and second inner ring parts comprises a front surface configured to face toward the wall of the sump, and wherein the front surface of each of the first and second inner ring parts comprises a semi-annular groove configured to accommodate a portion of the inner annular lip of the wall gasket.

12. The penetration fitting assembly of claim 11, wherein the wall gasket further comprises a plurality of screw seals at the plurality of openings, each screw seal of the plurality of screw seals comprising a tapered head at the rear surface of the split ring.

13. The penetration fitting assembly of claim 12, wherein each of the first and second outer ring parts comprises a plurality of counterbores extending from the front surface to the rear surface configured to accommodate fasteners securing the outer ring assembly to the wall of the sump.

14. The penetration fitting assembly of claim 13, wherein each counterbore of the plurality of counterbores comprises a first relatively wider portion at the rear surface, a second relatively wider portion at the front surface, a relatively narrower portion between the first relatively wider portion and the second relatively wider portion, and a taper connecting the second relatively wider portion to the relatively narrower portion, and wherein the second relatively wider portion and the taper of each of the plurality of counterbores is configured to accommodate the tapered head of each of the plurality of screw seals.

15. The penetration fitting assembly of claim 1, further comprising an adapter wall gasket, the adapter wall gasket comprising a curved front surface configured to face toward the wall of the sump.

16. A method of installing the penetration fitting assembly of claim 1, the method comprising:
   installing the wall gasket to the wall of the sump;
   forming an opening in the inner ring assembly to accommodate the pipe gasket;
   installing the pipe gasket around the pipe or conduit;
   installing the first inner ring part and the second inner ring part around the pipe gasket such that the pipe gasket is accommodated in the opening;
   installing the first ring gasket part and the second ring gasket part of the ring gasket assembly around the of the inner ring assembly;
   installing the first outer ring part and the second outer ring part of the outer ring assembly around the ring gasket assembly; and
   securing the first outer ring part and the second outer ring part to the wall of the sump.

17. The method of claim 16, wherein the forming the opening in the inner ring assembly comprises:
   coupling the first inner ring part to the second inner ring part with a disposable spacer; and
   cutting the opening along a joint between the first inner ring part and the second inner ring part and through the disposable spacer.

\* \* \* \* \*